United States Patent [19]
Yamakawa et al.

[11] Patent Number: 5,757,961
[45] Date of Patent: May 26, 1998

[54] IMAGE PROCESSING METHOD AND APPARATUS FOR OBTAINING A ZOOM IMAGE USING CONTOUR INFORMATION OF A BINARY IMAGE

[75] Inventors: Junichi Yamakawa; Yoshihiro Ishida; Akihiro Katayama, all of Kawasaki, Japan

[73] Assignee: Canon Kabushiki Kaisha, Tokyo, Japan

[21] Appl. No.: 475,451

[22] Filed: Jun. 7, 1995

Related U.S. Application Data

[63] Continuation of Ser. No. 74,677, Jun. 10, 1993, abandoned.

[30] Foreign Application Priority Data

| Jun. 11, 1992 | [JP] | Japan | 4-152461 |
| Jun. 17, 1992 | [JP] | Japan | 4-157713 |
| Jul. 29, 1992 | [JP] | Japan | 4-202777 |

[51] Int. Cl.$^6$ ................................ G06K 9/48
[52] U.S. Cl. ........................ 382/197; 382/199
[58] Field of Search ................ 382/242, 246, 382/232, 197, 198, 199, 201, 243, 298; 395/170

[56] References Cited

U.S. PATENT DOCUMENTS

| 4,956,869 | 9/1990 | Miyatake et al. | 382/197 |
| 5,093,870 | 3/1992 | Watanabe | 382/298 |
| 5,579,405 | 11/1996 | Ishida et al. | 382/197 |

FOREIGN PATENT DOCUMENTS

| 2007058 | 6/1983 | Germany . |

OTHER PUBLICATIONS

Chen et al. "The C–Chain Code –A New Method for Coding 3D Curves," Signals, Systems & Computer, 1991 25th Asilomar Conference, pp. 472–475.

Lu, et al. "Highly Efficient Coding Schemes for Contour Lines Based on Chain Code Representations," IEEE Transactions on Communications, vol. 39, No. 10, pp. 1151–1154, Oct. 1991.

"On Bit Reduction of Chain Coded Line Drawings", Sundar Raj, et al. Pattern Recognition Letters, vol. 4, No. 2, Apr. 1986, Amesterdam N.L. pp. 99–102.

"Encoding of Arbitrary Curves Based on the Chain–Code Representation", Kaneko, et al., IEEE Transactions on Communications, vol. 33, No. 7, Jul. 1985, New York, NY, pp. 697–706.

Soviet Inventions Illustrated, Section EI, Week 8448, 16 Jan. 1985, Derwent Publications Ltd. London, GB, Class T04, AN 84-299679 (abstract of SU-A-1 084 837, Apr. 7, 1984).

*Primary Examiner*—Leo Boudreau
*Assistant Examiner*—Bhavesh Mehta
*Attorney, Agent, or Firm*—Fitzpatrick, Cella, Harper & Scinto

[57] ABSTRACT

Contour vectors are detected by an outline detecting unit based upon a pixel of interest and pixels adjacent thereto read in a raster scanning sequence. A vector-data creating unit receives the contour vector and input data, calculates the difference between starting-point coordinates of continuous vectors, fits the value of the difference in a data packet whose number of digits conforms to the value of the difference and stores the data packet. The data packet is additionally provided with a code representing the length of the packet. An outline smoothing/zooming unit returns the stored difference value to ordinary coordinate expression and performs smoothing or zooming processing. A binary-image reproducing unit converts the contour vector into raster representation, and the resulting data is outputted. The acquisition unit and the extraction unit or creating unit eliminate unnecessary vectors and perform smoothing by an outline (vector sensing/elimination) smoothing and zooming unit. By virtue of this arrangement, the amount of contour-line data is reduced to reduce the memory capacity needed. Further, in a case where contour points of a binary image are delivered to immediately following processing, it is possible to greatly reduce the load of subsequent processing.

8 Claims, 48 Drawing Sheets

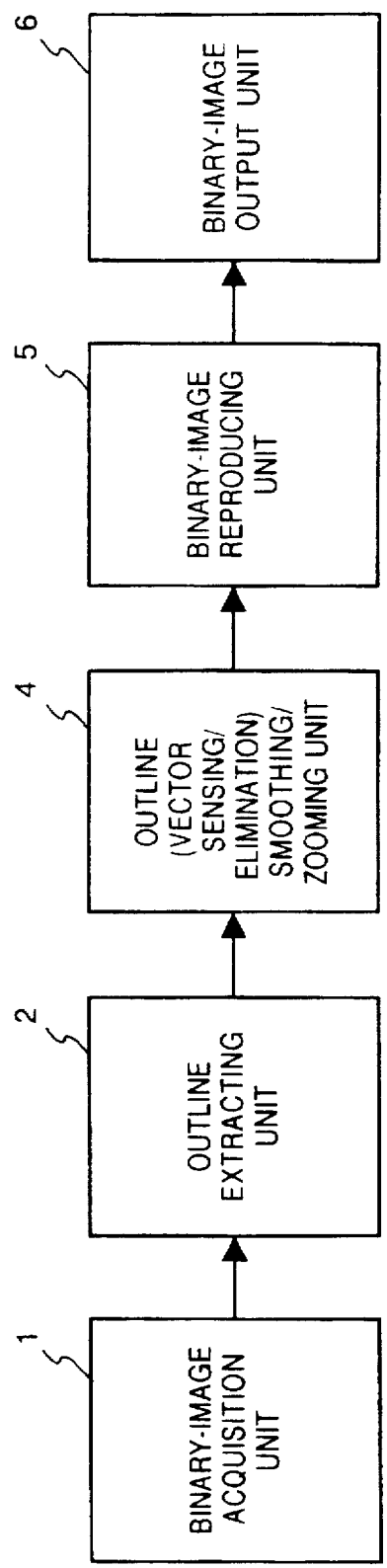

FIG. 4
EXAMPLE OF COARSE-CONTOUR VECTOR LOOPS REPRESENTING IMAGE
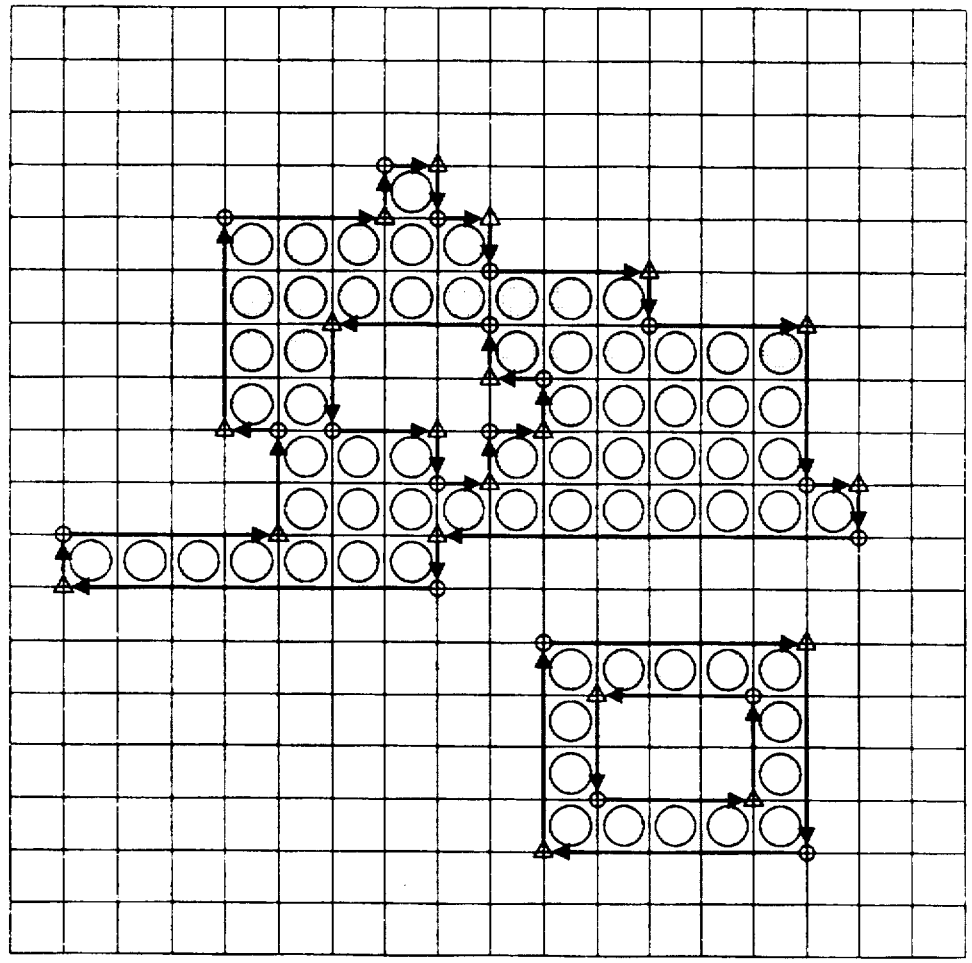
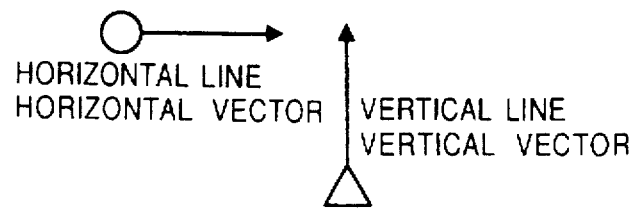

FIG. 13
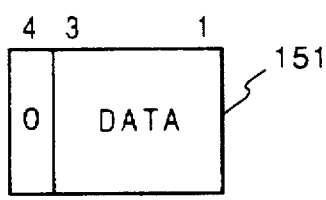
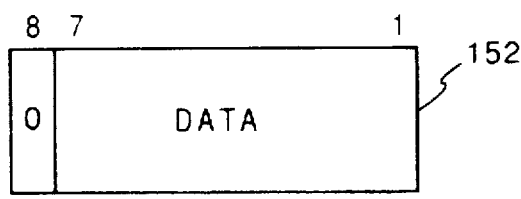
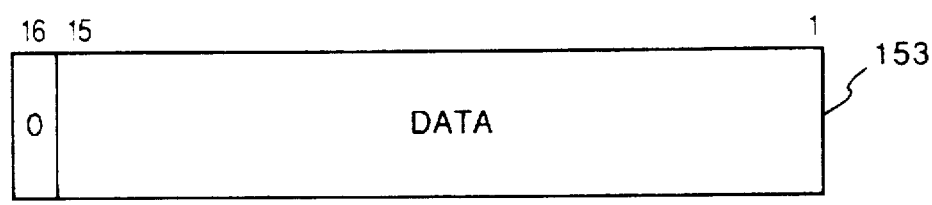
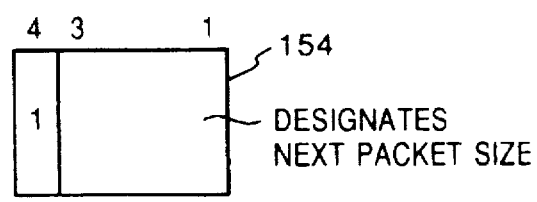
DESIGNATES NEXT PACKET SIZE (x0, y0)         (x0, y0)
(x1, y0)         (x1)
(x1, y1)         (y1)
(x2, y1)    →    (x2)
(x2, y2)         (y2)
(x3, y2)         (x3)
(x3, y3)         (y3)
(x4, y3)         (x4)

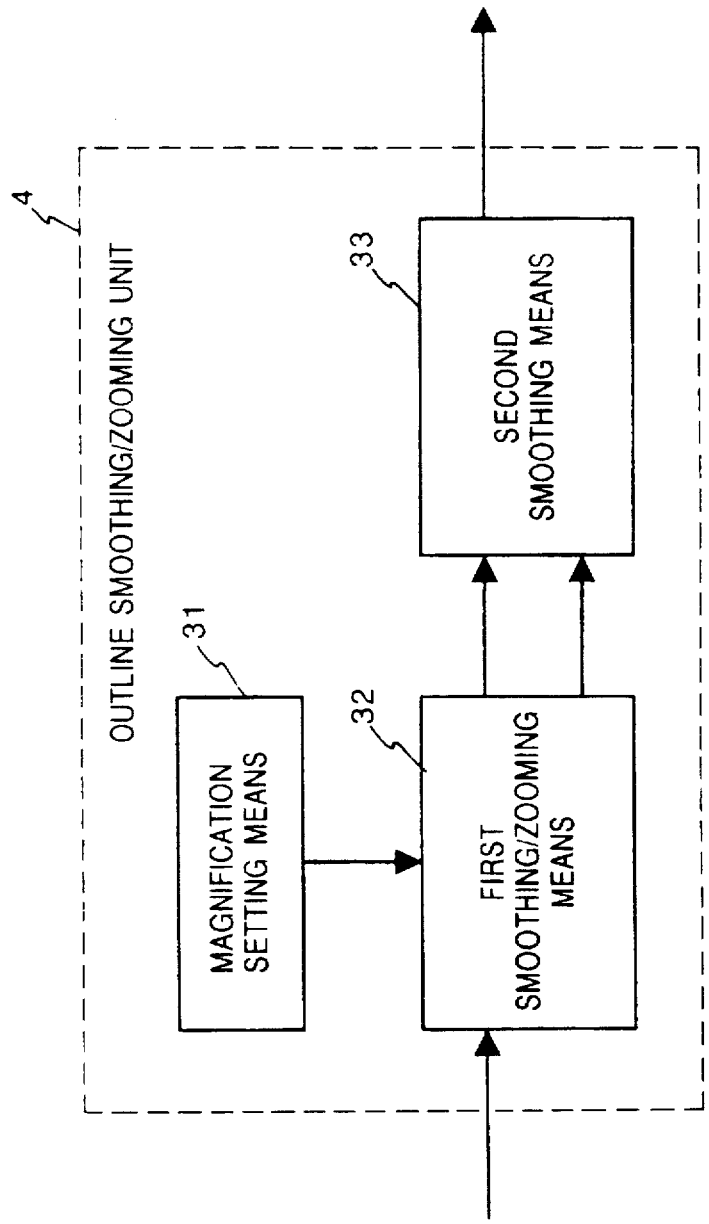

IMAGE PROCESSING METHOD AND APPARATUS FOR OBTAINING A ZOOM IMAGE USING CONTOUR INFORMATION OF A BINARY IMAGE

This application is a continuation of Ser. No. 08/074,677, filed on Jun. 10, 1993 now abandoned.

BACKGROUND OF THE INVENTION

This invention relates to zoom processing of a binary image and, more particularly, to an image processing method and apparatus for obtaining a zoom image of a high picture quality using the contour information of a binary image.

A conventional image processing apparatus presently available is adapted to read in an image, extract the contour of the image and store the read image in the form of outline vectors that express the contour. AN outline vector is expressed by the coordinates of starting and end points on a screen, and therefore one vector is an item of fixed-length data comprising the coordinates of two points.

Accordingly, in the aforementioned example of the prior art, the capacity of a memory needed to store the outline vectors that constitute an image increases in proportion to the number of the outline vectors. If there are a large number of vectors to be stored, the memory capacity necessary in order to store the outline vectors is required to be very large. This is one shortcoming of the prior art.

The applicant has previously proposed an apparatus of this type in Japanese Patent Application No. 3-345062 (filed on Dec. 26, 1991) and Japanese Patent Application No. 4-169581 (filed on Jun. 26, 1992).

According to these proposals, a binary image per se is not subjected to zoom processing when it is desired to zoom the binary image and then output the same. Rather, contour information indicative of the binary image is extracted and the zoomed image is produced based upon the extracted contour information, thereby making it possible to obtain a high-quality image.

More specifically, in Japanese Patent Application No. 3-345062, an outline vector is extracted from a binary image. This is followed by creating an outline vector zoomed smoothly at a desired magnification (arbitrary) in the state of the extracted outline vector representation and reproducing the binary image from the outline vector zoomed smoothly in this manner. The purpose of this processing is to obtain a high-quality digital binary image zoomed at the desired magnification (which is arbitrary).

The proposal of Japanese Patent Application No. 4-169581 is an improvement upon Japanese Patent Application No. 3-345062 described above. This arrangement is so adapted that a zoomed image having a low magnification will not tend to thicken. More specifically, in an outline extracting unit described in Japanese Patent Application No. 3-345062, a boundary exactly midway between a white pixel and a black pixel in an original image is adopted as the result of vector extraction. In Japanese Patent Application No. 4-169581, on the other hand, extraction is performed closer to the black pixels between pixels (the black-pixel area is made narrower than the white-pixel area) and outline smoothing is performed in conformity with this method.

In the examples of the prior art described above, contour points are extracted and defined in individual pixel units of the original image. As a result, a binary image having a satisfactorily high picture quality can be obtained even in a short-vector format in which all contour points are connected by straight lines. However, in case of a complicated original image of the type having a large number of slanted lines, a problem which arises is that the number of outline vectors becomes very large. An increase in the amount of data necessitates the consumption of a large amount of memory capacity. In addition, there are also occasions where the processing time needed for smoothing and reproduction is prolonged.

SUMMARY OF THE INVENTION

Accordingly, an object of the present invention is to provide an image processing method and apparatus whereby it is possible to reduce the memory capacity required to store the outline-vector data of an image.

Another object of the present invention is to provide an image processing method and apparatus whereby the memory capacity needed to store outline-vector data can be reduced while maintaining the quality of an image based upon outline-vector data, and in which it possible to reduce the processing load so as to raise processing speed.

A further object of the present invention is to provide an image processing method and apparatus in which, by improving upon the creation of vector data, the memory capacity needed to store outline-vector data can be reduced while maintaining the quality of an image, and high-speed processing is made possible by reducing the processing load.

Still another object of the present invention is to provide an image processing method and apparatus in which, by improving upon the smoothing processing of outline-vector data, the memory capacity needed to store outline-vector data can be reduced while maintaining the quality of an image, and high-speed processing is made possible by reducing the processing load.

Still another object of the present invention is to provide an image processing method and apparatus in which, by improving upon the creation and smoothing processing of vector data, the memory capacity needed to store outline-vector data can be reduced while maintaining the quality of an image, and high-speed processing is made possible by reducing the processing load.

According to the present invention, the foregoing objects are attained by providing techniques for creating variable-length data suitable for when vector data is created, and for eliminating vectors unnecessary at the time of smoothing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1A and 1B are diagrams illustrating the configuration of a digital binary image processing apparatus according to an embodiment of the present invention;

FIG. 4 is a diagram for describing the manner in which an outline is extracted from a raster-scanning type binary image;

FIG. 13 is a diagram showing a data format according to a third embodiment;

FIG. 21 is a diagram illustrating functional blocks for outline smoothing/zooming unit;

DESCRIPTION OF THE PREFERRED EMBODIMENTS

An image processing apparatus embodying the present invention will now be described with reference to the drawings.

<Example of configuration>

Figure 1A:
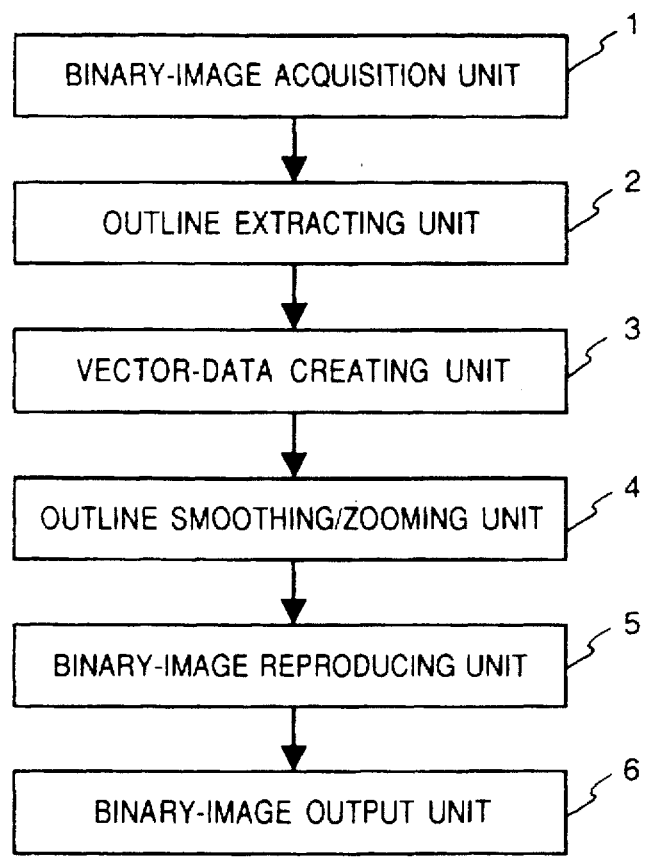

FIGS. 1A and 1B are diagrams illustrating the general configuration of an image processing apparatus according to this embodiment. A binary-image acquisition unit 1 reads in an image to undergo zoom processing and outputs a binary image having a raster-scanning type format. An outline extracting unit 2 extracts a coarse-contour vector (an outline vector before application of smoothing and zoom processing) from the binary image having the raster scanning format. On the basis of the coarse-contour vector data, which is given by coordinate values, a vector-data creating unit 3 calculates a difference between these coordinate values and creates variable-length data. An outline smoothing/zooming unit 4 applies smoothing and zooming processing to the outline vector. On the basis of the outline-vector data, a binary-image reproducing unit 5 reproduces a binary image, which is expressed by this data, as binary image data having the raster scanning format. A binary-image output unit 6 is for displaying the binary image of the raster-scanning type format, producing a hard copy thereof or outputting the image on a communication line or the like.

<Configuration of individual units>

(Binary-image acquisition unit)

The binary-image acquisition unit 1 is constituted by a well-known raster-scanning type binary-image output device for reading and binarizing an image by an image reader or the like and then outputting the image in a raster scanning format.

(Outline extracting unit)

The outline extracting unit 2 extracts a pixel of interest from the image in the order of the raster scanning line and detects the vectors of a pixel array in both horizontal and vertical directions based upon the pixel of interest and pixels adjacent thereto. The contour of the image is extracted based upon the connection of the vectors detected.

Figure 2:
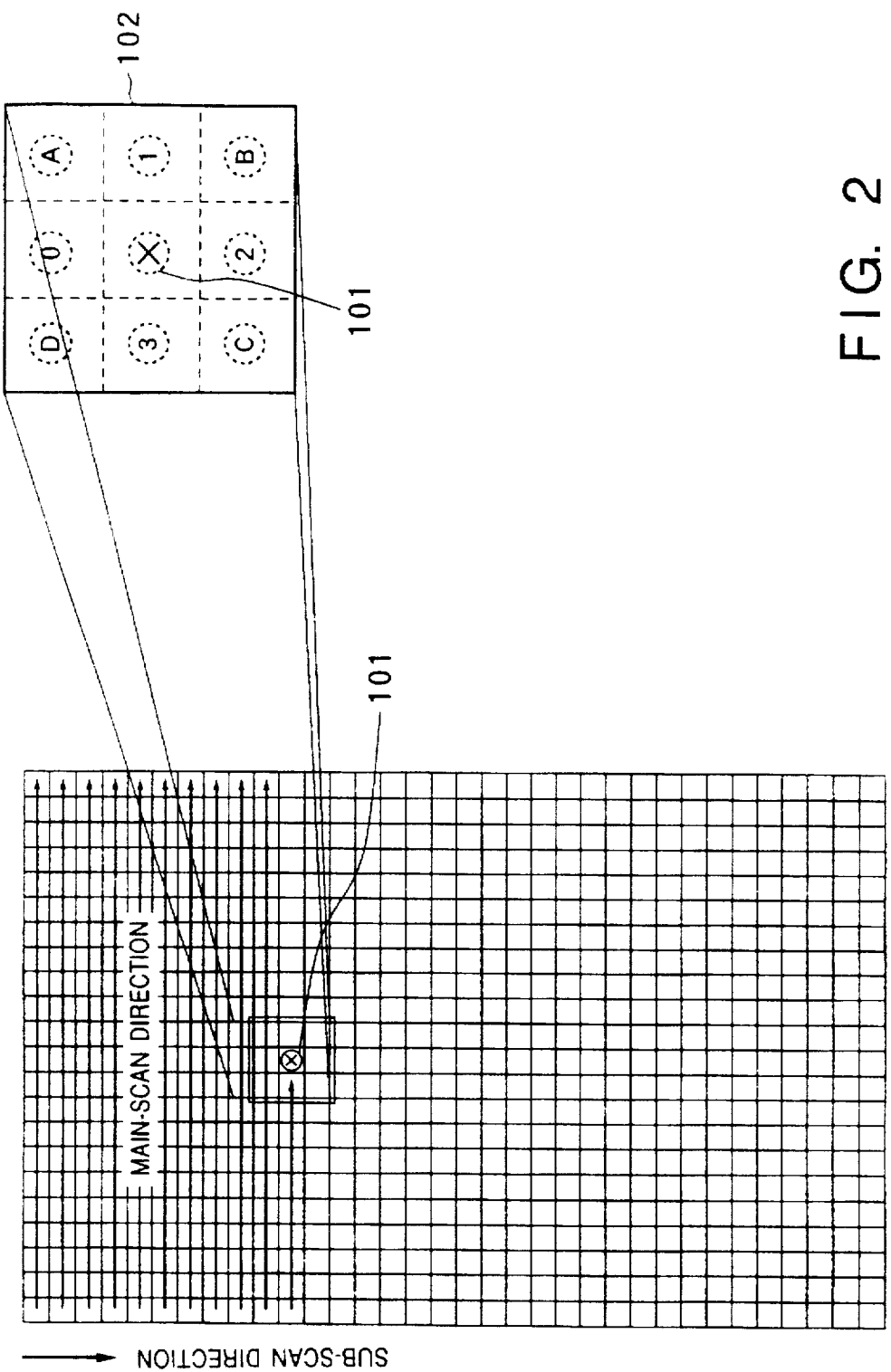
FIG. 2 is a diagram for describing the manner in which an outline is extracted from a raster-scanning type binary image.

FIG. 2 illustrates the scanning of raster-scanning type binary image data outputted by the binary-image acquisition unit 1, as well as the scanning of raster-scanning type binary image data inputted to the outline extracting unit 2. The binary image data outputted by the binary-image acquisition unit 1 enters the outline extracting unit 2 in a format of this kind. IQ FIG. 2, the mark obtained by enclosing "x" within the circle indicates a pixel of interest 101 of the binary image undergoing raster scanning. A nine-pixel area 102, which contains the eight pixels adjacent to the pixel of interest 101, is illustrated in enlarged form. The outline extracting unit 2 moves the pixel of interest in the order of the raster scan and, in dependence the state of each pixel in the nine-pixel area 102 (i.e., in dependence upon whether there is a change to a white pixel or black pixel) with regard to each pixel of interest, detects a contour-side vector (horizontal vector or vertical vector) present between the pixel of interest and the pixels adjacent thereto. If a contour-side vector exists, the coordinates of the starting point of this vector and data indicating the orientation thereof are extracted and a coarse-contour vector is extracted while updating the connection relationship between the contour-side vectors.

Figure 3:
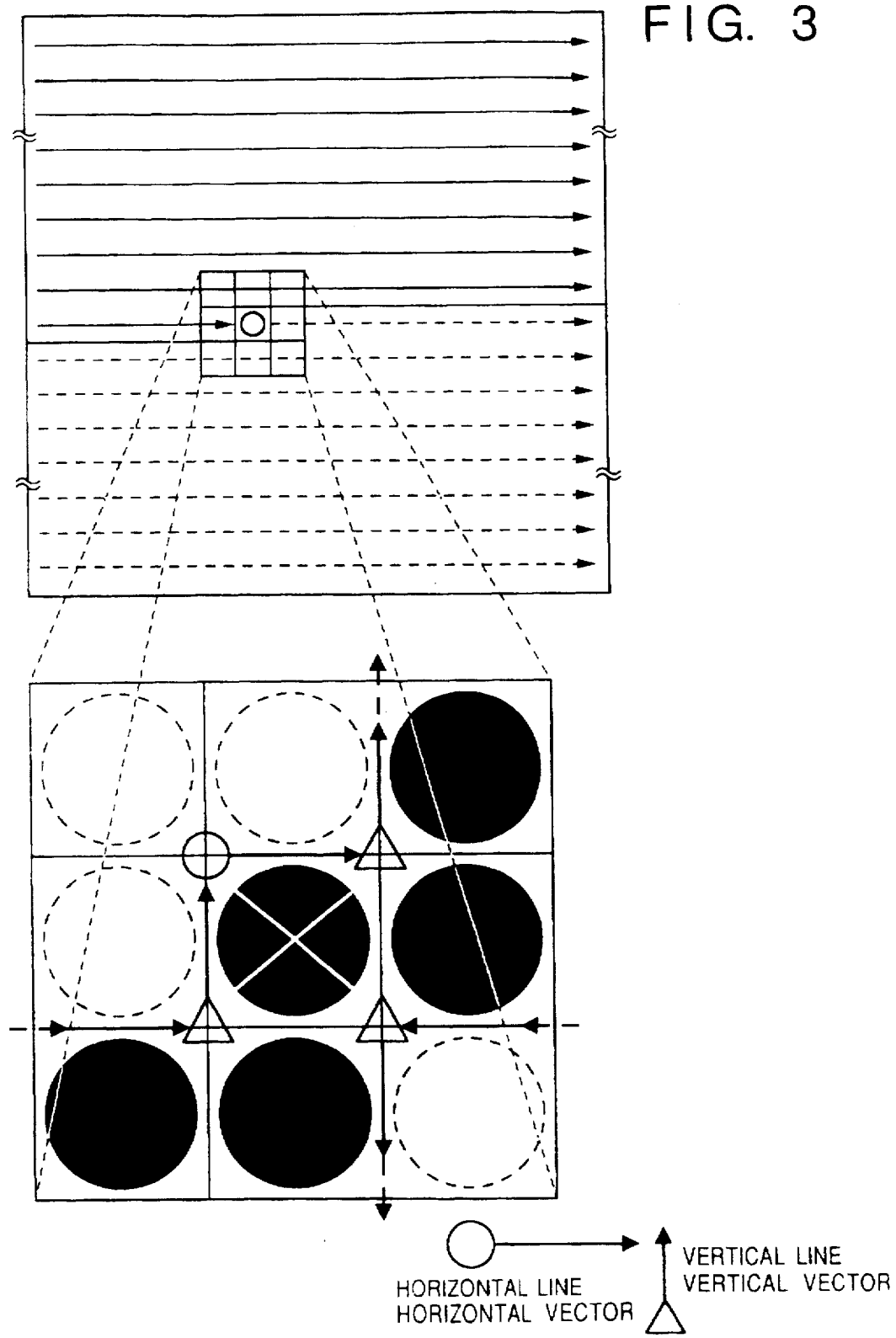
FIG. 3 is a diagram for describing the manner in which an outline is extracted from a raster-scanning type binary image.

FIG. 3 illustrates an example of extraction of a contour-side vector between a pixel of interest and pixels adjacent thereto. In FIG. 3, the triangular marks represent the starting points of vertical vectors, and the circular mark represents the starting point of a horizontal vector. FIG. 4 illustrates an example of a coarse-contour vector loop detected by the outline extracting means. In FIG. 4, each square indicates a pixel position in an input image. White squares signify white pixels. The circle marks filled with black signify black pixels. As in FIG. 3, the triangular marks represent the starting points of vertical vectors and the small circular marks represent the starting points of horizontal vectors. Coarse-contour vector loop, in which areas of connected black pixels are connected with their horizontal and vertical vectors alternating, as shown in the example of FIG. 4, are extracted, in such a manner that the right side becomes a black-pixel area in the direction the vectors advance. The starting point of each coarse-contour vector is extracted as an intermediate position of each pixel of the input image.

Even from a line portion of one pixel width in the original image, a coarse-contour loop having a reasonable width is extracted. The group of coarse-contour vector loops thus extracted is outputted by the outline extracting unit 2 in the data format of the kind illustrated in FIG. 5.

Figure 5:
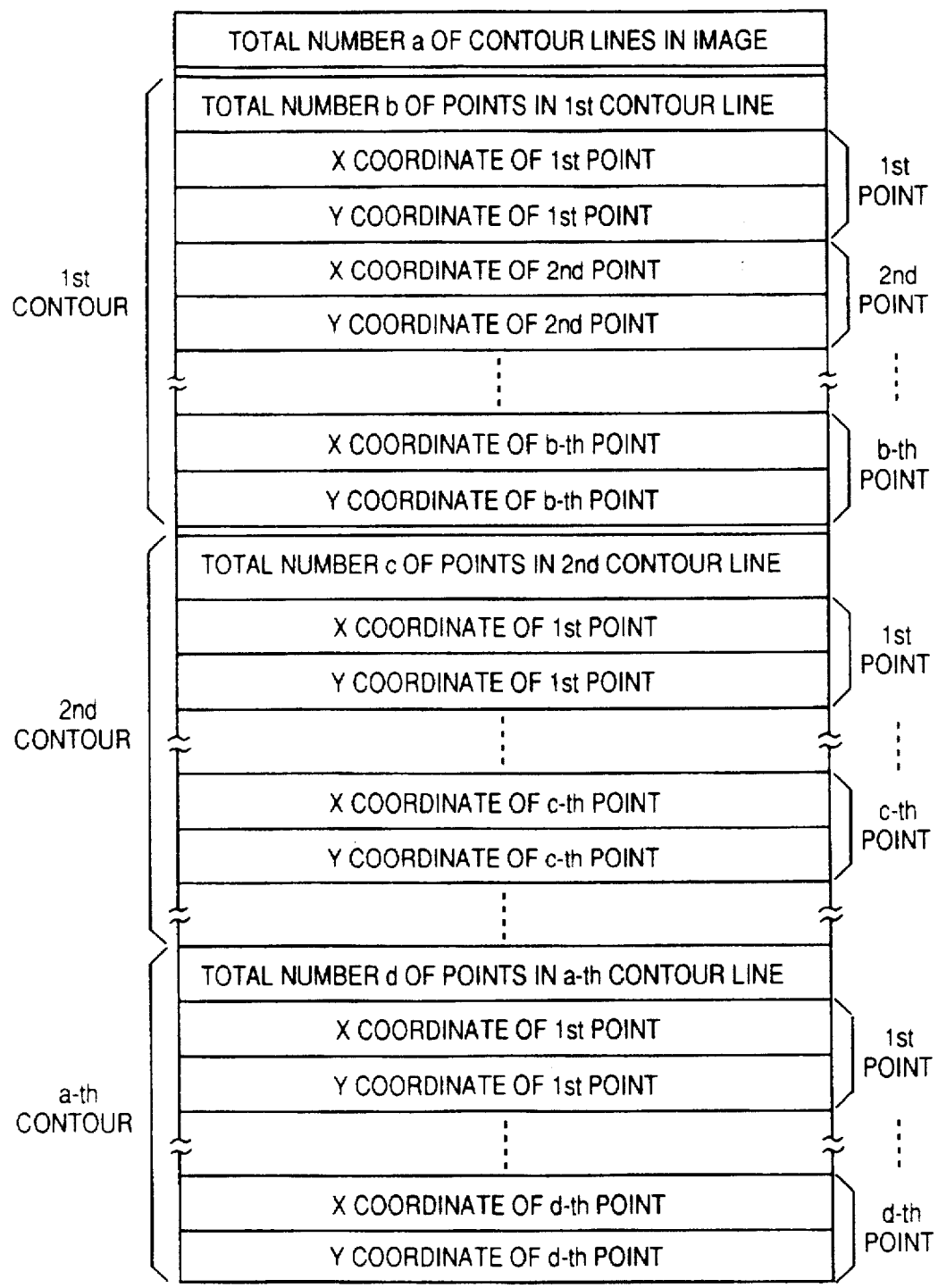
FIG. 5 illustrates outline data outputted by an outline extracting unit.

The data illustrated in FIG. 5 comprises a total number a of coarse-contour loops extracted from an image and a group of coarse-contour loop data from a first contour loop to an a-th contour loop. The data of each coarse contour loop is composed of the total number of starting points of contour-side vectors present in the coarse-contour loops (this number can be considered to be the total number coarse-side vectors) and a row of values (starting points of horizontal vectors and starting points of vertical vectors arranged in alternating fashion) of starting-point coordinates (x- and y-coordinate values) of each of the contour-side vectors arranged in the order in which they construct the loop.

(Vector-data creating unit)

(EXAMPLE 1)

Figure 6:
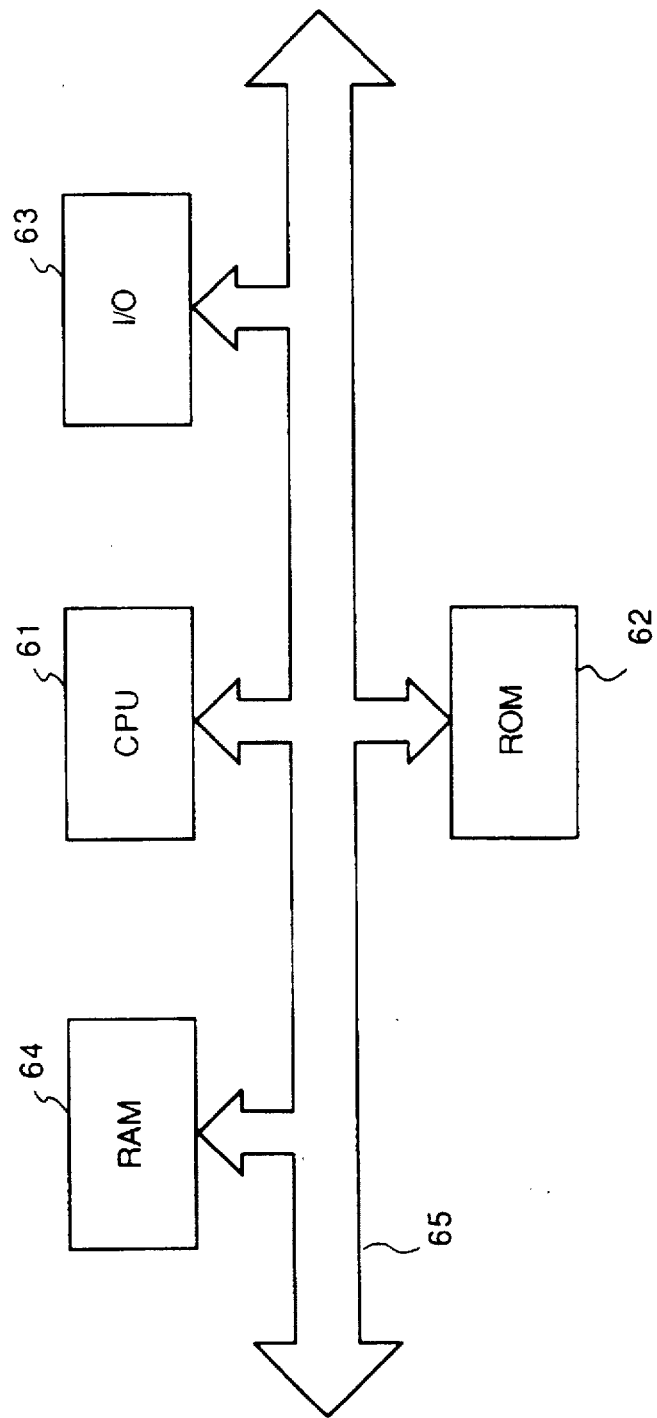
FIG. 6 is a block diagram showing a vector-data creating unit.

The coarse-contour vector data outputted by the outline extracting unit 2 enters the vector-data creating unit 3, which calculates the difference value between end-point and starting-point coordinates from the coordinate values of the vector representing the outline and creates outline-vector data by expressing this value in variable length. FIG. 6 shows an example of a hardware arrangement for realizing the vector-data creating unit. As shown in FIG. 6, a CPU 61 is connected to a ROM 62, an I/O port 63 and a RAM 64 by a bus 65. The output of the outline-extracting unit 2 is stored in the RAM 64 in the data format depicted in FIG. 5. The CPU 61 operates in accordance with a procedure illustrated by the flowchart of FIG. 7 and executes processing for creating vector data.

The processing for creating the vector data will be described with reference to FIG. 7. At step S1, starting-point coordinate data of fixed length is created in the data format of FIG. 5, with the coordinates of the first point of a contour line of interest serving as a starting point. The data created is stored in the RAM 64. The starting-point coordinate data is 32-bit fixed-length data, as illustrated in FIG. 8. The 32nd bit, which is the most significant, and the 16th bit are not used. The 15 bits from the 17th to the 31st bit constitute the X coordinate, and the 15 bits from the 1st to the 15th bit constitute the Y coordinate. Accordingly, coordinate values (x,y) are represented by 15-bit unsigned integers.

At step S2, the coordinate values of the starting point of the vector of interest are subtracted from the coordinate values of the end point thereof to obtain the respective coordinate difference values. If ordinary coordinate representation also is considered to be a difference from the origin of the coordinate system, it will be readily understood that the difference between coordinates of mutually adjacent points is a value smaller than in ordinary coordinate representation. Consequently, coordinate representation based upon a difference is handled as variable-length data conforming to the number of digits of the difference value.

Figure 9:
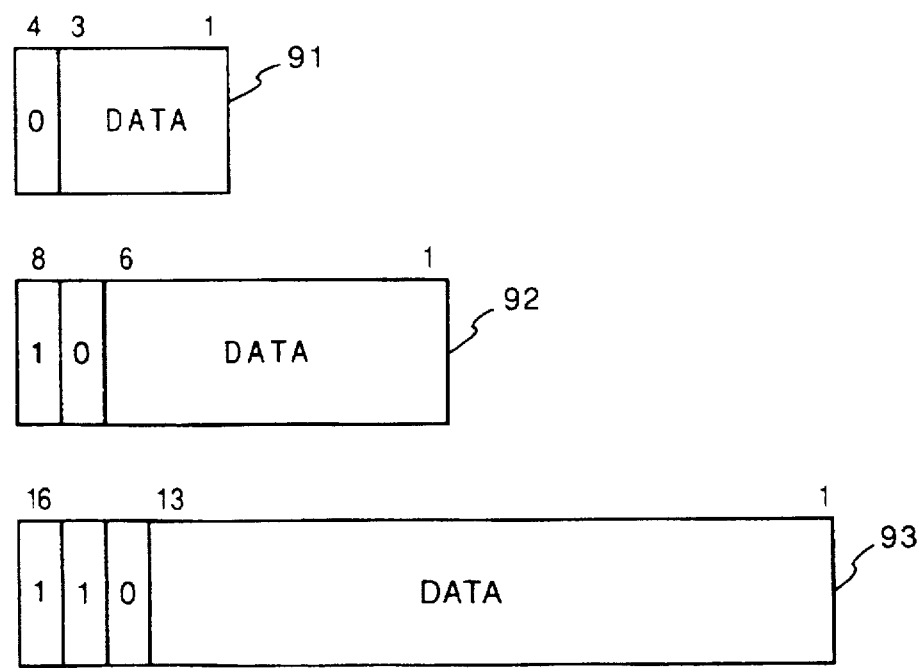
FIG. 9 is a diagram showing the format of vector data.
Figure 10:
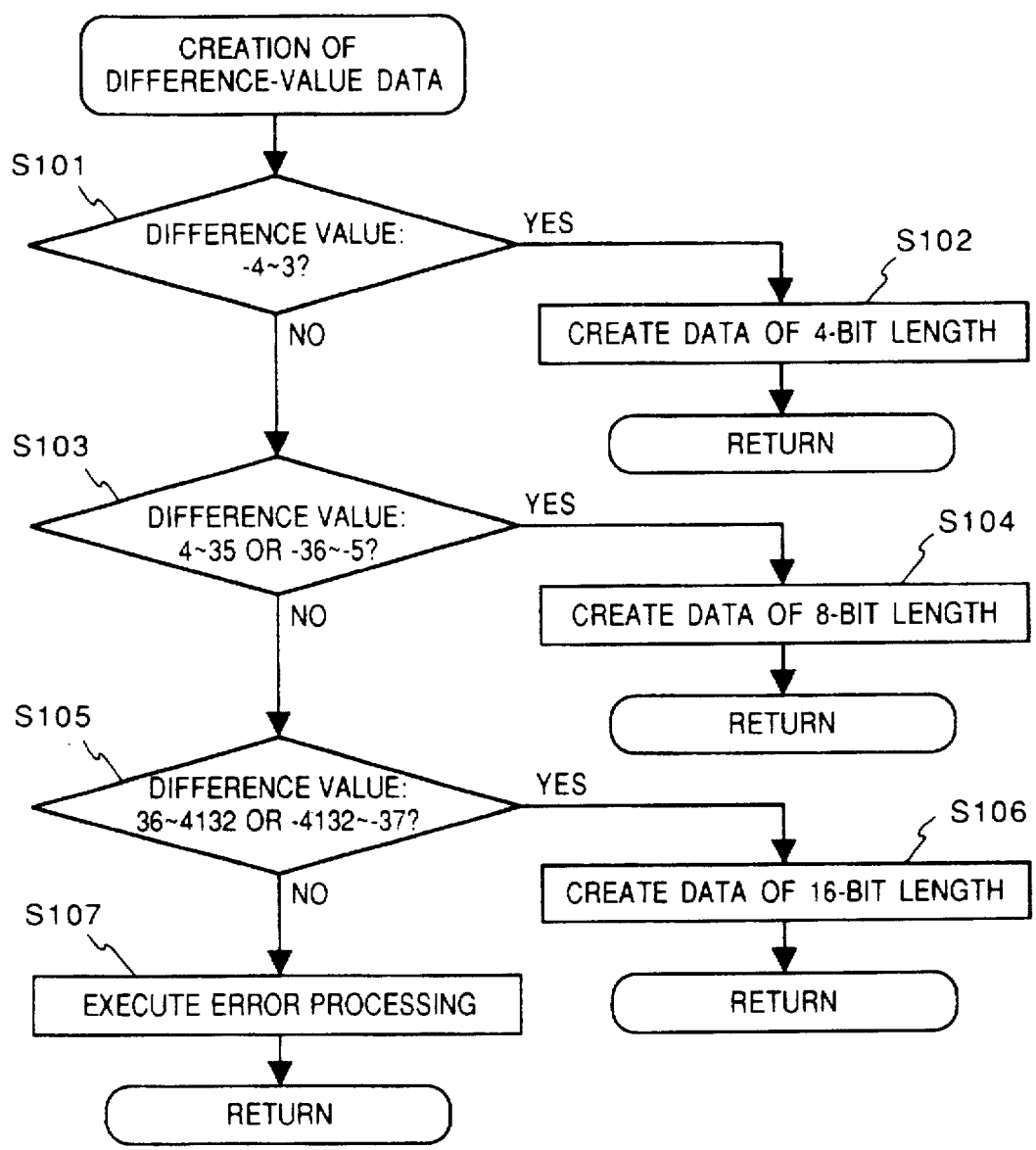
FIG. 10 is a flowchart illustrating processing for creating difference-value data.

FIG. 9 illustrates data packets for storing data indicative of coordinate difference values. A packet 91 of 4-bit length uses the three lower order bits in a difference value, a packet 92 of 8-bit length uses the six lower order bits in a difference value, and a packet 93 of 16-bit length uses the 13 lower order bits in a difference value The most significant bit of the packet 91 of 4-bit length, the two higher order bits of the packet 92 of 8-bit length and the three higher order bits of the packet of 16-bit length are portions indicating the respective packet sizes. At the time of decoding, packet size can be uniquely decided from the higher order bits representing packet size. The size of a data packet is decided with respect to the coordinate difference values. However, the numbers capable of being expressed by each packet size are of eight types with the 4-bit length, 64 types with the 8-bit length and 8192 with the 16-bit length. Therefore, the packet used is decided as shown in FIG. 10. FIG. 10 is a flowchart giving the details of step S3 in FIG. 7.

In FIG. 10, when the coordinate difference value is greater than −4 and less than 3 (hereinafter written −4~3) (YES at step S101), the packet 91 of 4-bit length is created (step S102); when the difference value is 4~35 or −36~−5 (YES at step S103), the packet 92 of 8-bit length is created (step S104); when the difference value is 36~4131 or −4132~−37 (YES at step S105), the packet 93 of 16-bit length is created (step S106). The packet created is written in the RAM 64. In a case where a value will not fit in a packet, this is processed as an error (step S107). This concludes the calculation of coordinate difference value at step S3.

The vector of interest is incremented by one at step S4, and it is determined at step S5 whether a vector in the contour line has ended. If it has not ended, the processing from step S2 to step S4 is repeated to create the coordinate difference-value data for every vector.

When processing regarding one contour ends, processing is made to proceed for a new contour line at step S6 and it is determined at step S7 whether processing has ended for all contour lines. If processing has not ended, the processing of steps S1 to S6 is repeated for the new contour lines.

A contour vector expressed by coordinate difference values is thus created. It will suffice to store this data as a sequence of coordinates for each contour in the same manner as the table shown in FIG. 5. In this case, the starting point of each contour in the table would be expressed by ordinary coordinate values, and points following the starting point would be expressed by coordinate difference values.

Figure 11:
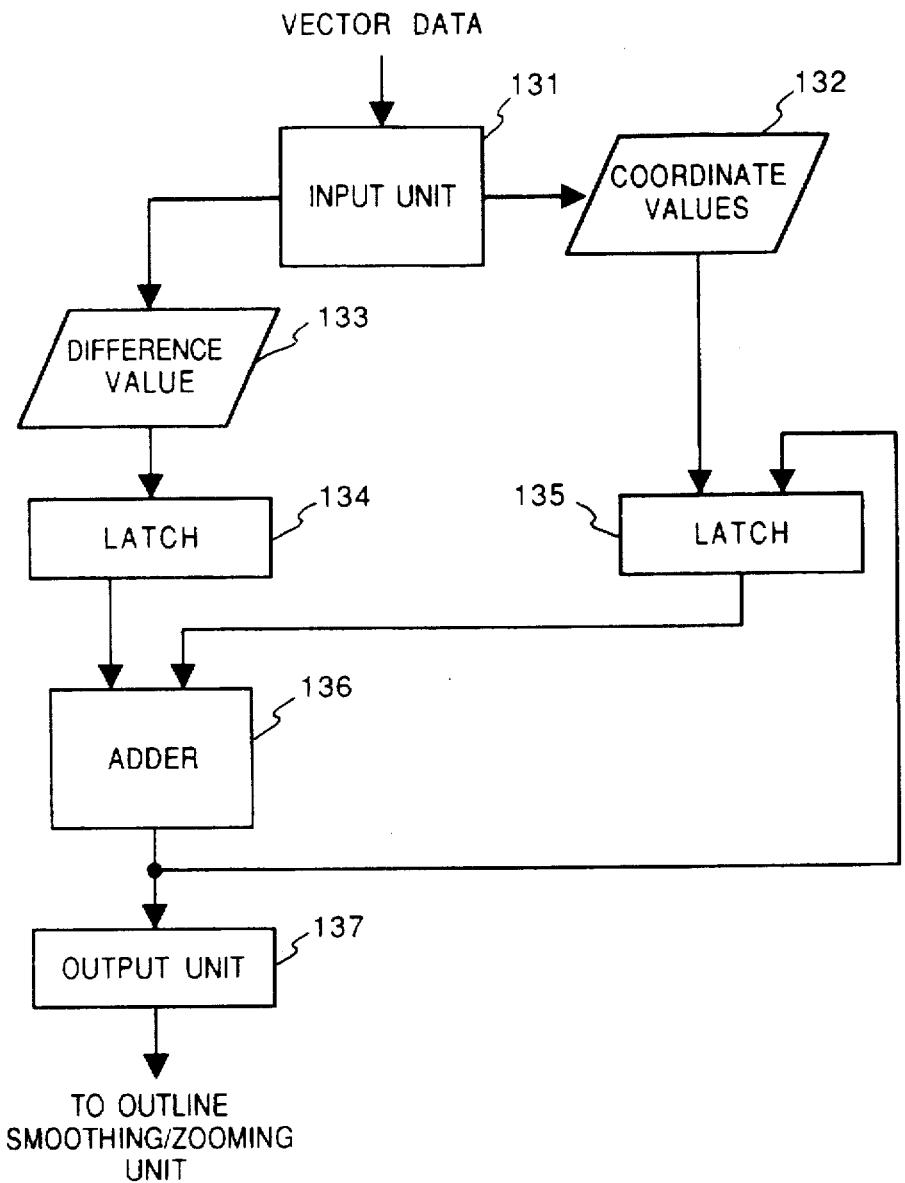
FIG. 11 is a block diagram of processing for obtaining coordinates from vector data.

In the outline smoothing/zooming unit 4, processing for obtaining the necessary coordinates values is executed sequentially based upon the contour starting-point coordinates and outline-vector coordinate difference values outputted by the vector-data creating unit 4, and smoothing/zooming processing is executed after representation is restored to ordinary coordinate representation. FIG. 11 is a block diagram of processing for returning representation based upon coordinate difference values to ordinary coordinate representation.

In FIG. 11, the output of the vector-data creating unit 3 enters an input unit 131, a contour starting-point coordinate value 132 is held in a latch 135, and a coordinate difference value 133 is held in a latch 134. The values in the latches 135 and 134 are added by an adder 136, and a coordinate value is outputted by an output unit 137. The value in latch 135 also is updated to the value obtained by the adder 136. In this case, if 0 is used as the initial value of the coordinate difference value, then the coordinate value 132 per se is outputted as the starting point. Of course, this processing is capable of being realized by having the CPU 61 execute a program in the arrangement of FIG. 6.

(EXAMPLE 2)

In the vector-data creating means set forth in the description of the foregoing embodiment, the difference values of both the x and y components of coordinates are used. However, since a coarse contour vector is composed solely of a horizontal or vertical vector, the data may be made vector data using the coordinates solely of the components of the coordinate values that change. In this case, however, it will be necessary to create vector data of each of x and y by smoothing processing.

Figure 19:
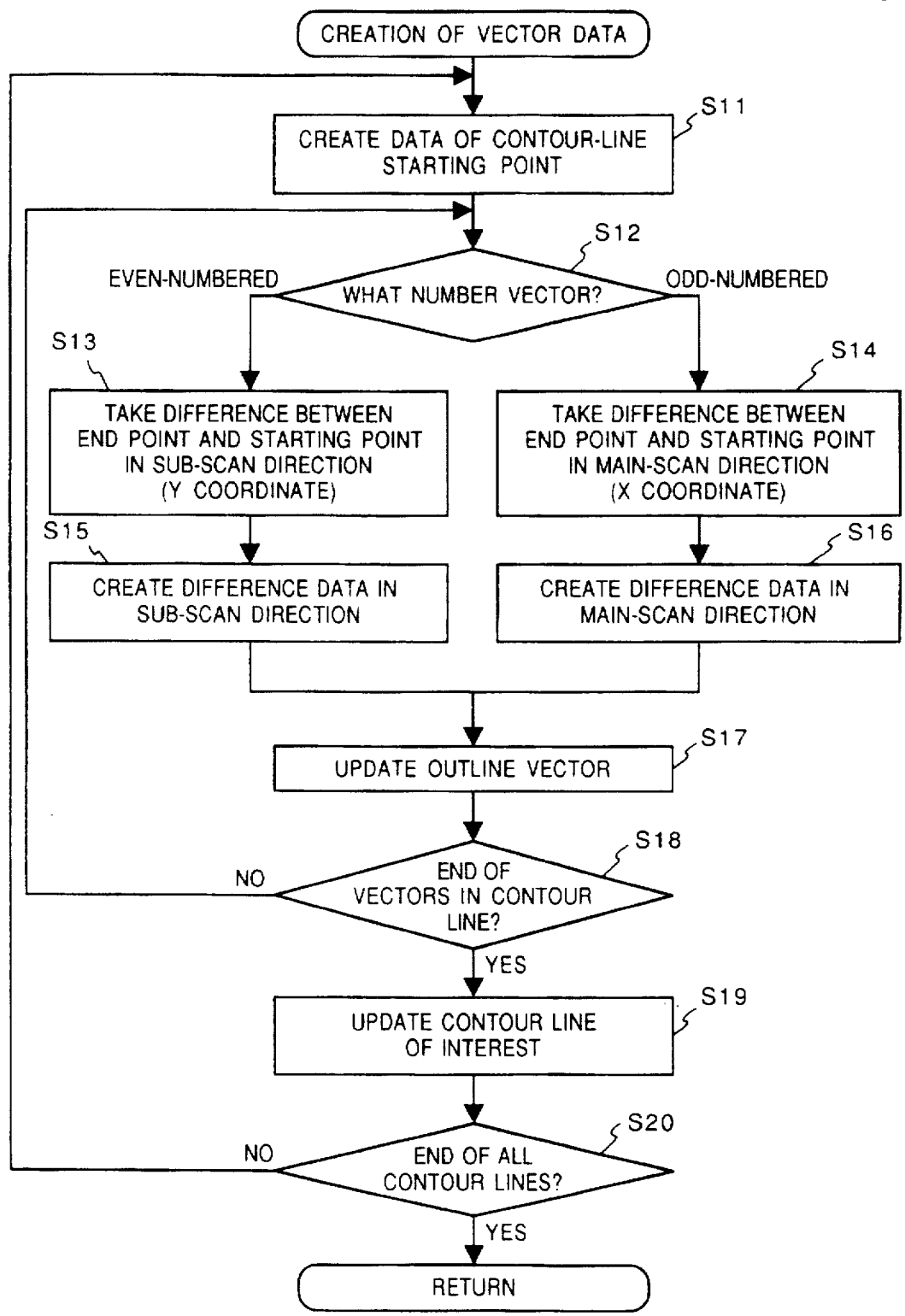
FIG. 19 is a flowchart illustrating an overview of vector-data creation processing according to a second embodiment.

A second example of vector-data creation processing will be described with reference to FIG. 19. At step S11, starting-point coordinate data of fixed length is created in the data format of FIG. 5, with the coordinates of the first point of a contour line of interest serving as a starting point. The data created is written in the RAM 64. The starting-point coordinate data is 32-bit fixed-length data, as illustrated in FIG. 8. The 32nd bit, which is the most significant, and the 16th bit are not used. The 15 bits from the 17th to the 31st bit constitute the X coordinate, and the 15 bits from the 1st to the 15th bit constitute the Y coordinate. Accordingly, coordinate values (x,y) are represented by 15-bit unsigned integers.

Figures 20A, 20B:
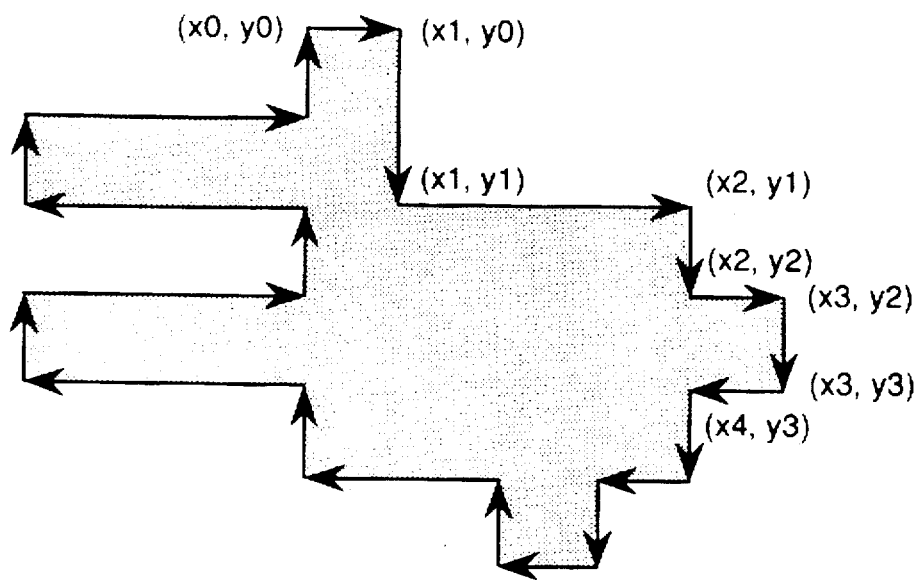
FIGS. 20A and 20B are diagrams showing a coarse contour in the second embodiment.

At steps S12, S13, S14, the difference between the coordinate values of starting and end points of the outline vector of interest are obtained. The processing for odd-numbered vectors differs from that of even-numbered vectors for the following reason: An outline vector extracted by the outline extracting unit 2 of FIG. 1 comprises solely a horizontal vector or a vertical vector, as shown in FIG. 20A. If the first vector is a horizontal vector (solely an x component), the difference value of the coordinate (y coordinate) in the sub-scan direction of the odd-numbered vector and the difference value of the coordinate (x coordinate) in the main-scan direction of the even-numbered vector will always be 0. Accordingly, only a difference value in a direction in which the value will not become 0 should be held. For example, the result of representing the starting and end points of the group of contour vectors in FIG. 20A by coordinates is in the left column of FIG. 20B. When this is expressed by taking the differences in the main- and sub-scan directions alternately for the odd-numbered vectors and even-numbered vectors, the result is the data in the right column of FIG. 20B. Thus, whether a vector is a vector solely of an x or y component is recognized and a difference is calculated only with regard to components that are not 0.

At steps S15 and S16, difference-value data is created with regard to the difference values of coordinates in each of the main- and sub-scan directions.

The outline vector of interest is incremented by one at step S17, and steps S12 through S17 are repeated until the vectors within the contour line are found to be completed at step S18.

The contour line of interest is incremented at step S19, and steps S11 through S19 are repeated until the processing of all contour lines ends at step S20.

(EXAMPLE 3)

In the description of the foregoing embodiment, the vector data has a format which encompasses values indicating packet sizes of a plurality of types. In a case where packet size is changed, a format may be adopted in which a mark indicating the next packet size is inserted. In such case, the data packet used in step S3 of FIG. 7 and in steps S15, S16 in FIG. 19 would be composed of three types of data packets, namely a packet 151 of 4-bit length, a packet 152 of 9-bit length and a packet 153 of 16-bit length, as illustrated in FIG. 13. In a case where the next packet size of data is different, a marker 154 of 4-bit length would be inserted in front of this packet. The most significant bit of each data packet is used as a flag for distinguishing between difference-value data and the marker. Other portions are used as data.

Figure 14:
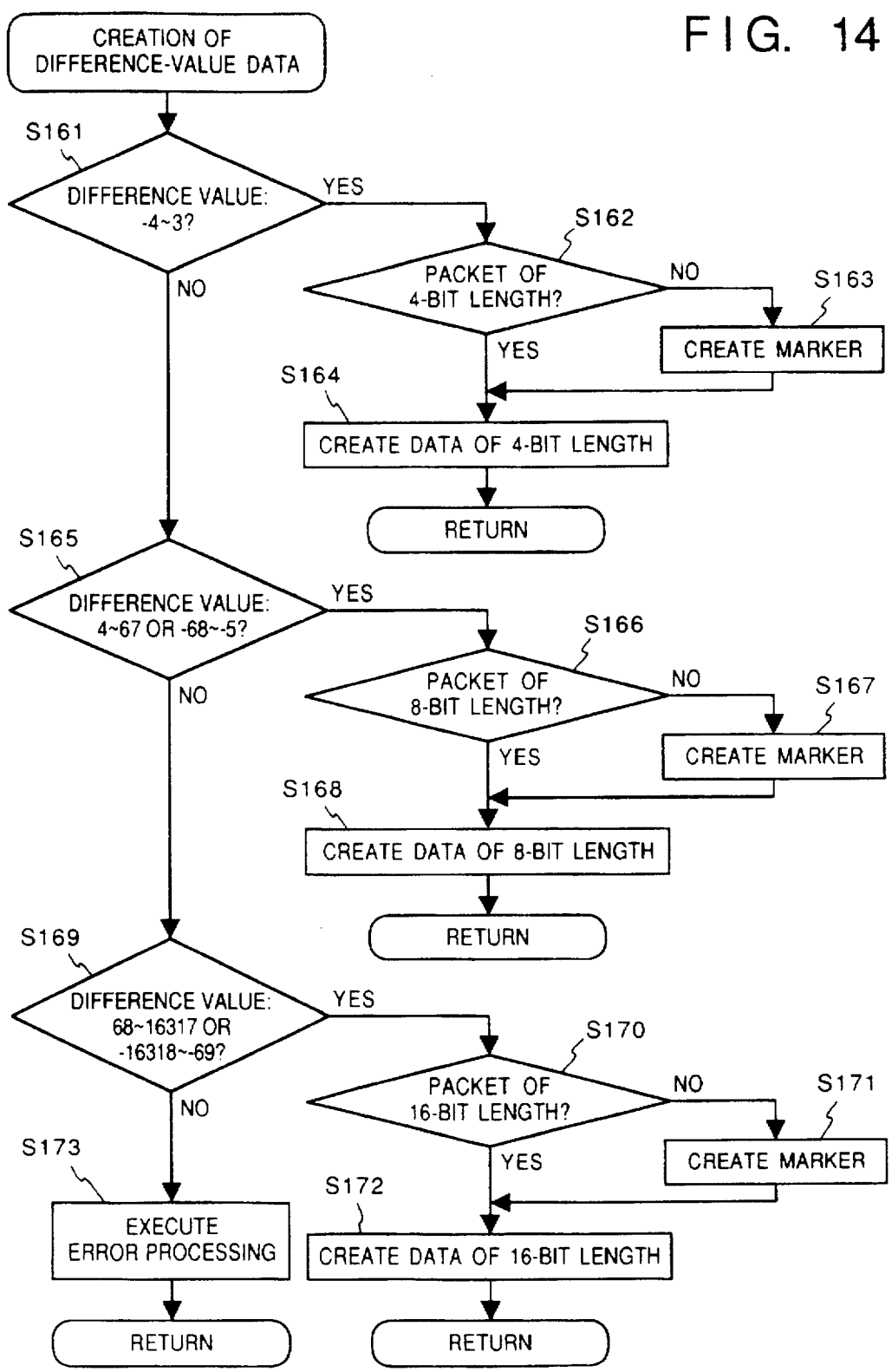
FIG. 14 is a flowchart illustrating processing for creating difference-value data according to the third embodiment.

Processing for creating difference-value data at this time is illustrated in FIG. 14. The packet size is decided and the data is created in dependence upon the difference values. However, in a case where a packet whose size is different from the packet size of the immediately preceding data, a marker designating the packet size used is created.

In FIG. 14, when the coordinate difference value is greater than −4 and less than 3 (written −4~3) (YES at step S161), it is determined at step S162 whether the data packet created just before is the packet 151 of 4-bit length. If the answer is NO, then the marker 154 indicating that the next packet size is of the 4-bit length is created at step S163. Thereafter, the packet 151 of 4-bit length is created (step S164).

When the coordinate difference value is 4~67 or −68~−5 (YES at step S165), it is determined at step S166 whether the data packet created just before is the packet 152 of 8-bit length. If the answer is NO, then the marker 154 indicating that the next packet size is of the 8-bit length is created at step S167. Thereafter, the packet 152 of 8-bit length is created (step S168).

When the coordinate difference value is 68~16317 or −16318~−69 (YES at step S169), it is determined at step S170 whether the data packet created just before is the packet 153 of 16-bit length. If the answer is NO, then the marker 154 indicating that the next packet size is of the 16-bit length is created at step S171. Thereafter, the packet 153 of 16-bit length is created (step S172). The packet created is written in the RAM 64. In a case where a difference value will not fit in a packet, this is processed as an error (step S173).

(EXAMPLE 4)

Figure 15:
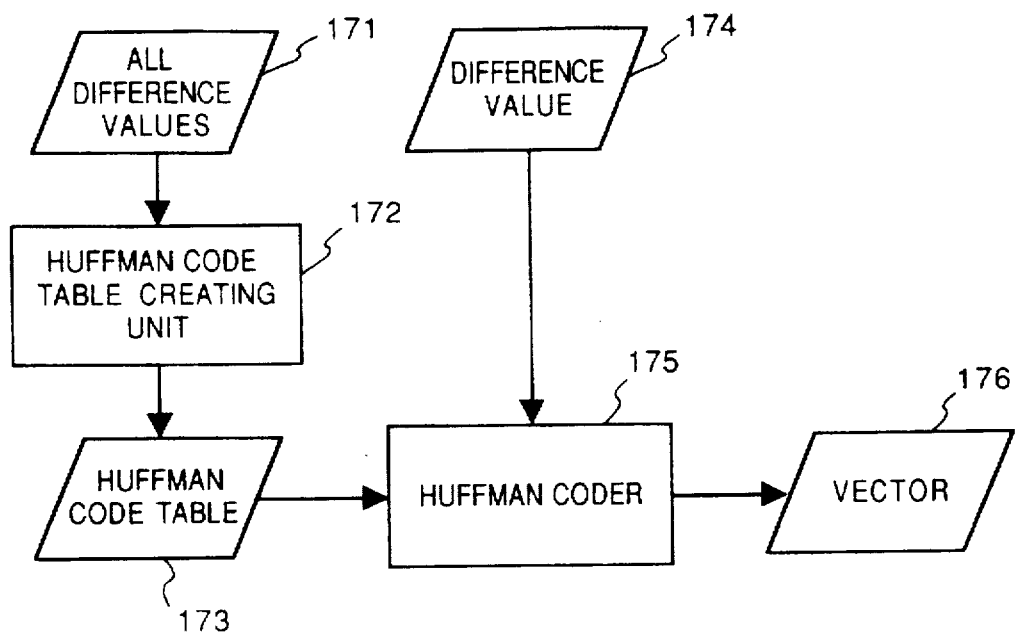
FIG. 15 is a block diagram showing processing for creating vector data according to a fourth embodiment.

In the vector-data creating unit 3 described in the foregoing embodiment, it is permissible to allocate a Huffman code from a distribution of difference values of outline vectors when the coordinate difference values are converted into vector data, perform Huffman coding and adopt the Huffman codes as vector data. In this case, the creation of the difference-value data at step S3 in FIG. 7 and steps S15, S16 in FIG. 19 is carried out using a configuration of the kind shown in FIG. 15.

Based upon all of the difference-value data 171 of outline vectors, a Huffman code table 173 is created by a Huffman-code creating unit 172, coordinate difference values of each outline vector are coded by a Huffman coder 175 using the code table 173, and resulting vector data 176 is outputted.

(EXAMPLE 5)

Figure 16:
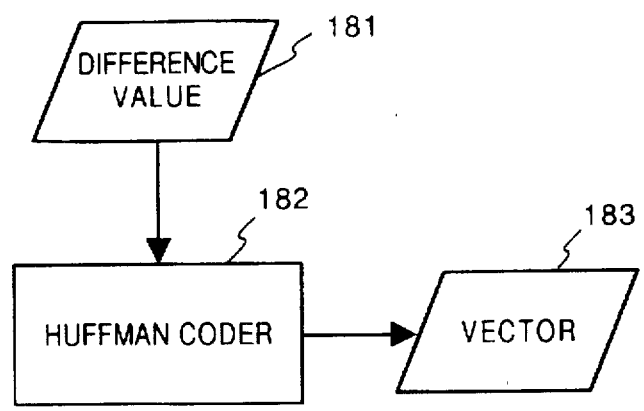
FIG. 16 is a block diagram showing processing for creating vector data according to a fifth embodiment.

In Example 4, a Huffman code is allocated from a distribution of difference values of outline vectors. However, coding may be performed using a Huffman code table prepared in advance. In this case the processing for creating difference-value data at step S3 in FIG. 7 and steps S15, S16 in FIG. 19 is performed by the configuration shown in FIG. 16. A Huffman coder 182, which possesses an internal Huffman code table (or a plurality thereof) prepared in advance, allocates Huffman codes to a difference value 181 of each outline, performs coding and outputs resulting vector data 183.

(EXAMPLE 6)

Figure 17:
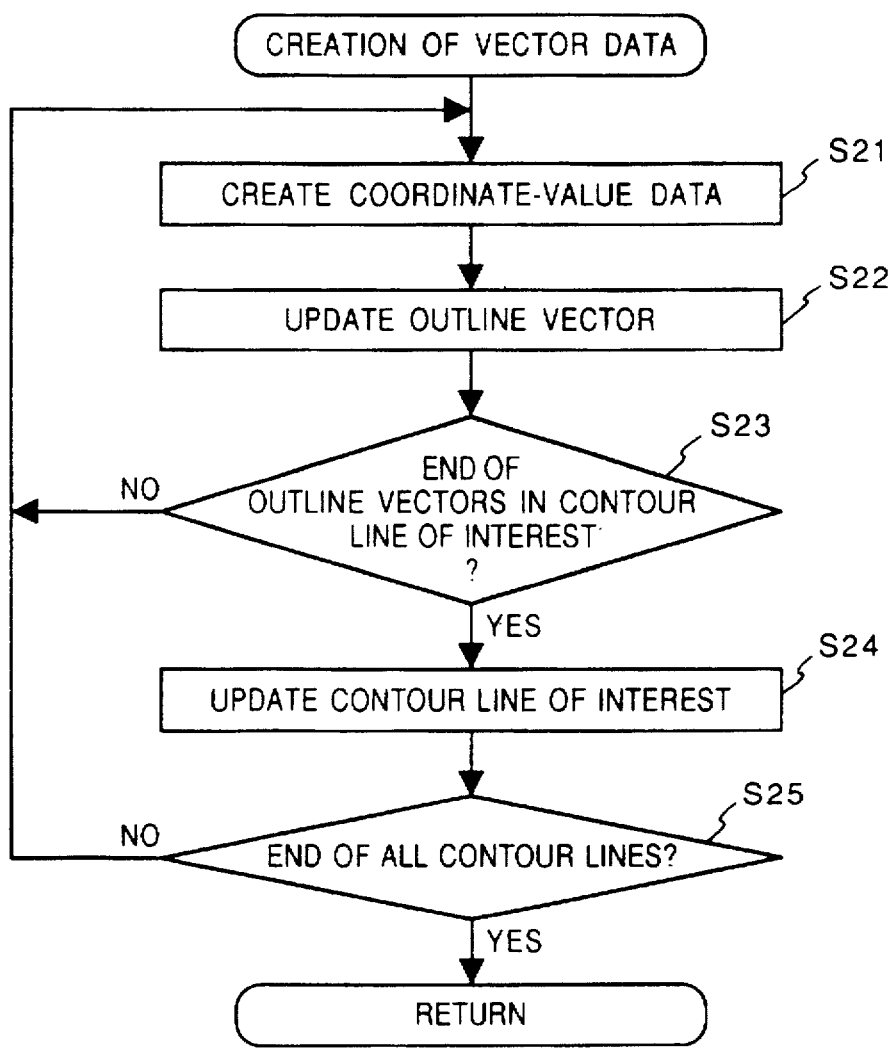
FIG. 17 is a flowchart showing processing for creating vector data according to a sixth embodiment.
Figure 18:
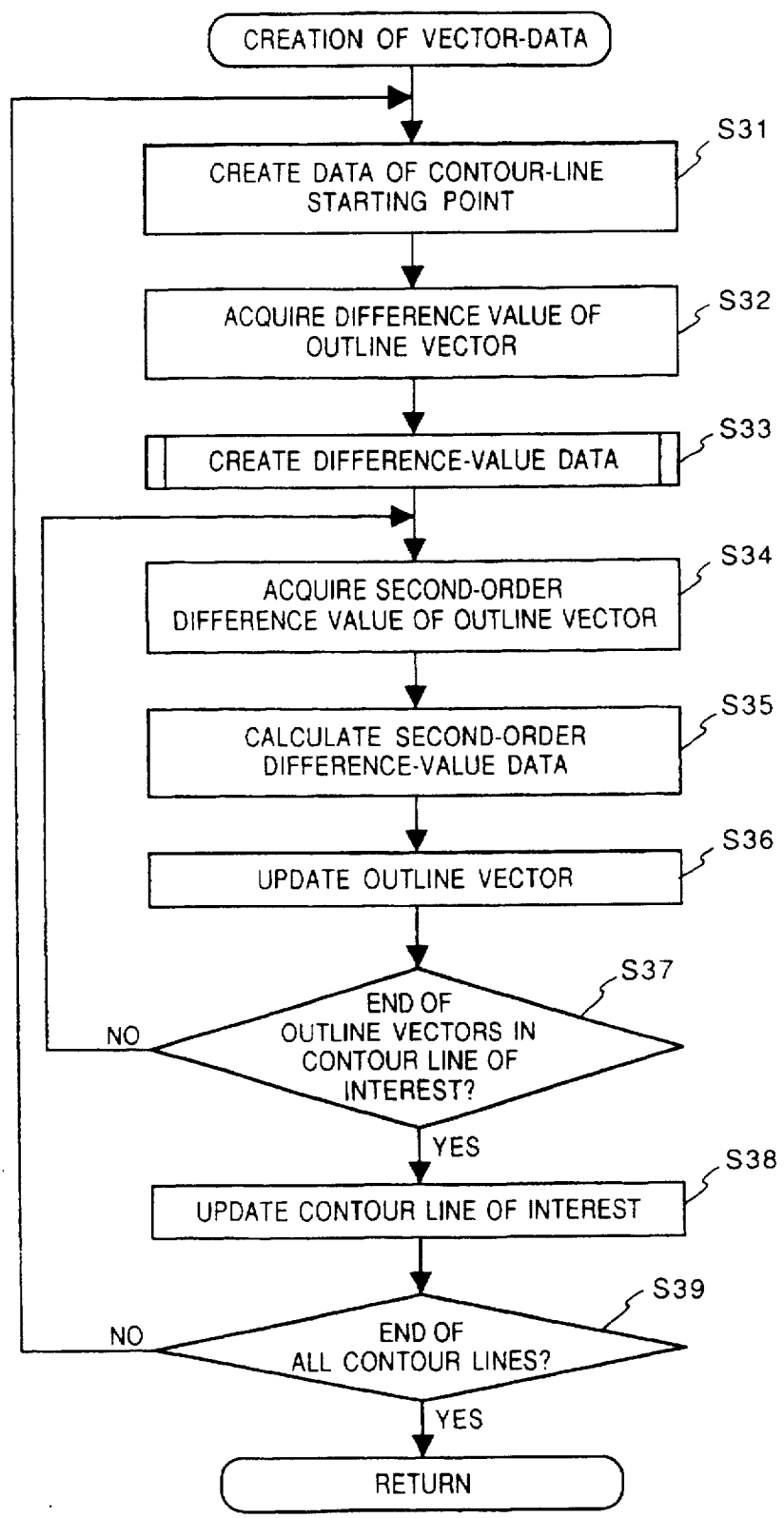
FIG. 18 is a flowchart showing processing for creating vector data according to a seventh embodiment.

In the foregoing embodiment, the vector data is created from difference values of coordinate values indicative of outline vectors. However, the vector data may be handled as vector data in which the coordinate values per se are in the form of variable-length data. In this case the processing for creating vector data in FIGS. 7 and 19 is changed as shown in FIG. 17.

It will suffice if the data format created in the processing of step S21 is variable-length data and the methods described in Examples 1 through 5 are applied to the coordinate values of each vector. The coordinate values of each vector are stored in conformity with the number of digits and in conformity with the shortest packet needed for representation. The packets used may be those described in FIG. 9 or FIG. 13. Steps S22~S25 involve the same processing as steps S4~S7 in FIG. 7 or steps S17~S20 in FIG. 19.

(EXAMPLE 7)

The contour vector data may be dealt with as vector data in which two-step difference values of the coordinates of outline vectors are in the form of variable-length data. In this case the processing for creating vector data in the examples of FIGS. 7 and 19 is changed as shown in FIG. 19. Since the creation of two-step difference-value data outputted by the vector-data creation processing requires contour starting-point coordinate values and a first vector difference value of a contour line, these items of data area created at steps S31 and S33 in FIG. 19. As for the data format in the processing of step S31, step S1 of FIG. 7 may be adopted or the earlier examples may be adopted. As for the data format in the processing of step S33, any of the techniques of Examples 1 through 5 are applicable. With regard to the data format in the processing of step S35, the methods in Examples 1~5 can be applied to two-step difference values of the coordinates values of each vector. In a case where this example is applied to the embodiment of FIG. 19, steps S32, S33 are replaced by steps S12~S16.

Figure 7:
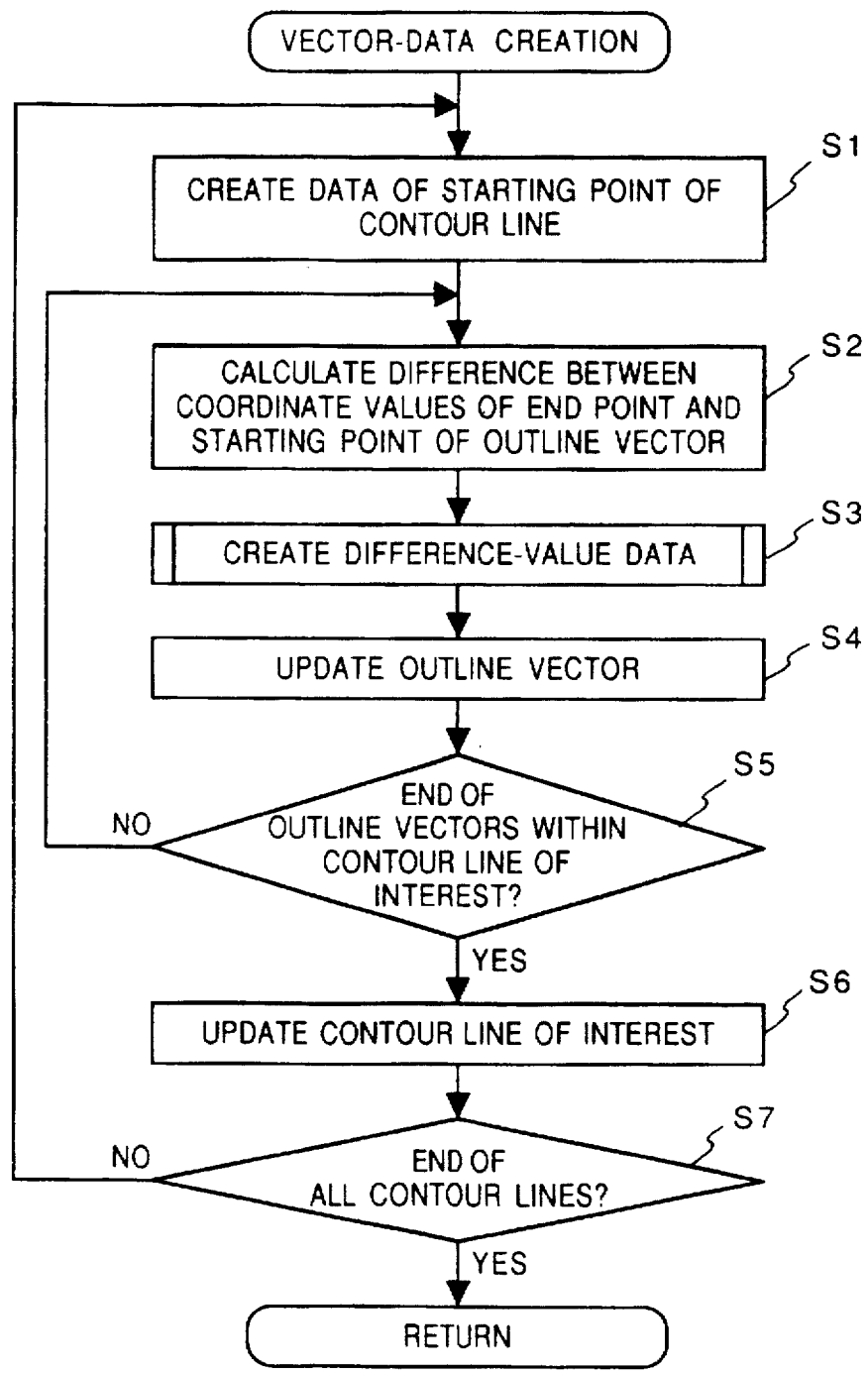
FIG. 7 is a flowchart illustrating an overview of vector-data creation processing.
Figure 8:
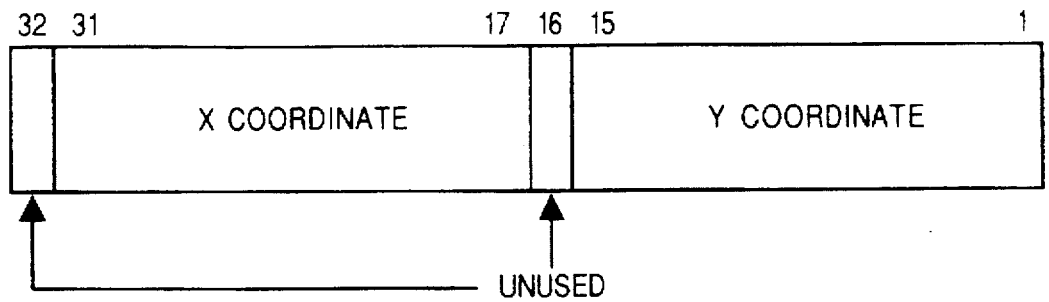
FIG. 8 is a diagram showing the data format of the starting point of a contour line.

First, it will suffice if the processing of steps S31~S33 is the same as that of steps S1~S3 in the flowchart of FIG. 7. A difference value of the created difference value is calculated at step S34. Next, at step 35, the starting points, the initial coordinate difference value and the subsequently created second-order difference value are stored in memory and vector data expressed by the second-order difference value is created. With regard to the second-order value also, a data packet conforming to this value is prepared and the data can be compressed. The degree to which the data is reduced depends upon the original image data. A data compressing effect can be achieved if the second-order difference of continuous contour vectors is small. That is, this effect can be achieved with respect to an image having a smooth contour. The processing of steps S36~S39 is the same as that of steps S4~S7 in FIG. 7 or steps S17~S20 in FIG. 19.

(EXAMPLE 8)

Figure 47:
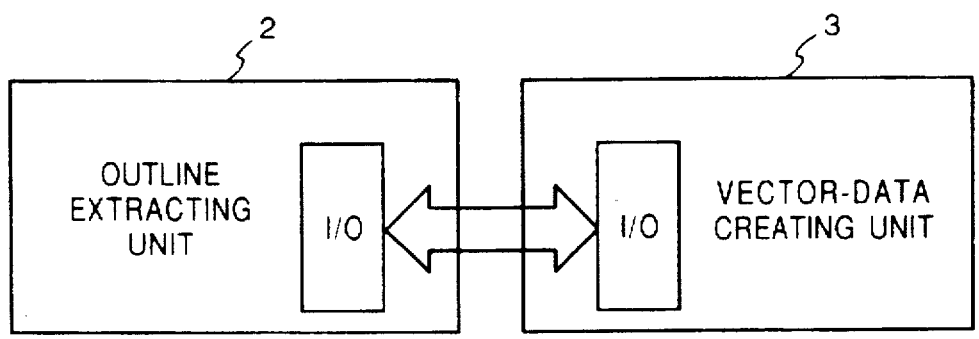
FIG. 47 is a diagram showing the interfaces of an outline extracting unit and outline smoothing/zooming unit in an eighth embodiment of the invention.

In the above-described embodiment, coarse-contour data extracted by the outline extracting unit 2 is inputted to the vector-data creating unit 3 after being outputted to the RAM 64 of FIG. 6. However, rather than exchanging data via a memory, an arrangement may be adopted in which the outline extracting unit 1 and vector-data creating unit 3 perform the exchange of data sequentially by communication between I/O units, as shown in FIG. 47. More specifically, the vector-data creating unit 3 does not merely input all of the data of the format shown in FIG. 5 after the data is arranged but also accepts, on each occasion, the processed data from the outline extracting unit 2 via the I/O in the order of the total number a of contours in the image, the total number b of points in the first contour line, the x coordinate of the first point, the y coordinate of the first point, . . . , and the vector-data creating unit 3 uses the coordinate values of the accepted points to advance the creation of vector data in concurrence with the acceptance of the ensuing contour-point coordinates.

As described above, vector data creation according to the foregoing embodiment is capable of reducing the memory capacity needed to store the outline-vector data of an image.

(Outline smoothing/zooming unit)

(EXAMPLE 1)

The coarse-vector data (see FIG. 5) outputted by the outline extracting unit 2 or vector-data creating unit 3 enters the outline smoothing/zooming unit 4 shown in FIG. 1. The unit 4 smooths the data and executes processing for zooming the data to the desired magnification in the format of the outline-vector data (coordinated values). FIG. 21 is a diagram illustrately functional blocks for the outline smoothing/zooming unit 4. In FIG. 21, numeral 31 denotes zoom magnification setting means and numeral 32 designates first smoothing/zooming means. The first smoothing/zooming means 32 subjects the entered coarse-contour data to smoothing and zooming processing at the magnification set by the magnification setting means 31. The results of processing are further subjected to smoothing by the second smoothing means 33 to obtain a final output.

The magnification setting means 31 may deliver a value set in advance by a dip switch, dial switch or the like to the first smoothing/zooming means, or it may take on a format supplied externally via an I/F (interface). This is means for applying information regarding amount of magnification independently in the main-scan (horizontal) direction and sub-scan (vertical) direction to the image size provided as an input.

The first smoothing/zooming means obtains magnification information from the magnification setting means 31 and performs smoothing/zooming processing.

Figure 22:
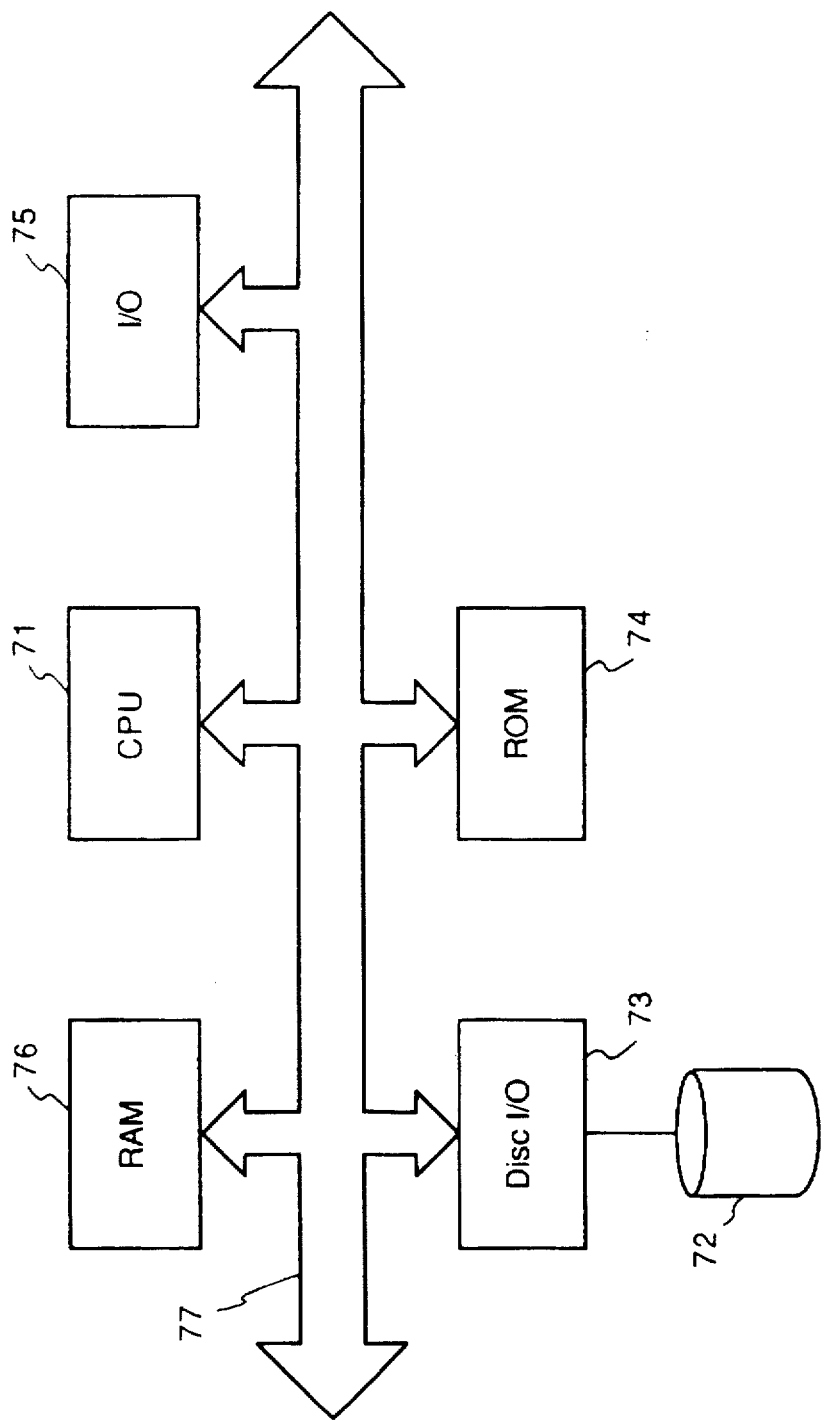
FIG. 22 is a block diagram illustrating outline smoothing/zooming means and outline (vector sensing/elimination) smoothing and zooming unit.

FIG. 22 illustrates an example of a hardware configuration for realizing the outline smoothing/zooming means. In FIG. 22, numeral 71 denotes a CPU, 72 a disk device, 73 a disk I/O, 74 a ROM storing the operating processing procedure of the CPU 71, 75 an I/O port, 76 a RAM (random-access memory) and 77 a bus interconnecting these blocks.

The output of the outline extracting unit 2 or vector data creating unit 3 in FIG. 1 is stored as a file (coarse-contour vector data) in the disk device 72 in the data format shown in FIG. 5.

Figure 23:
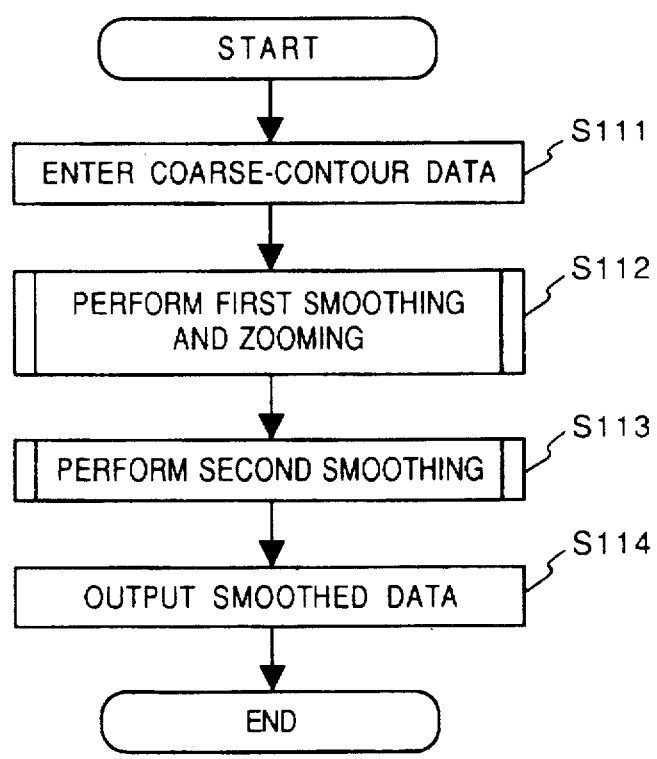
FIG. 23 is a flowchart showing an overview of processing for outline smoothing and zooming.

The CPU 71 operates in accordance with the procedure given in FIG. 23 and executes outline smoothing/zooming processing.

First, at step S111, the coarse-contour data stored in the disk device 72 is read out and written in a working memory area (not shown) within the RAM 76 via the disk I/O 73. This is followed by first smoothing and zooming processing at step S112.

First smoothing processing is carried-out in closed-loop units of the coarse-contour data. The contour sides (horizontal or vertical vectors) each item of coarse-contour data are taken one at a time, and each contour side-vector of interest is divided into patterns by combinations lengths and orientations of mutually continuous side vectors up to at most three vectors before and after each contour-side vector (that is, up to a total of seven side vectors, namely three in front of the side of interest, the side of interest itself and three after the side of interest). In each case, contour points after first smoothing, which are the results of first smoothing with regard to the side of interest, are defined. The coordinate values of the contour points after first smoothing and added information (hereinafter referred to as "angular-point information"), which indicates whether a contour point is the point of an angle, are outputted. The point of an angle mentioned here refers to a point situated at a meaningful angle. Points at angles resulting from portions caused by noise or some other factor or by notches are excluded. Contour points (hereinafter referred to as "angular points") after first smoothing judged to be points at angles are treated as points not smoothed by subsequent second smoothing, i.e., the positions thereof are treated as immovable points.

Contour points (hereinafter referred to as "non-angular points") after first smoothing judged not to be points at angles are smoothed further by second smoothing.

Figure 24:
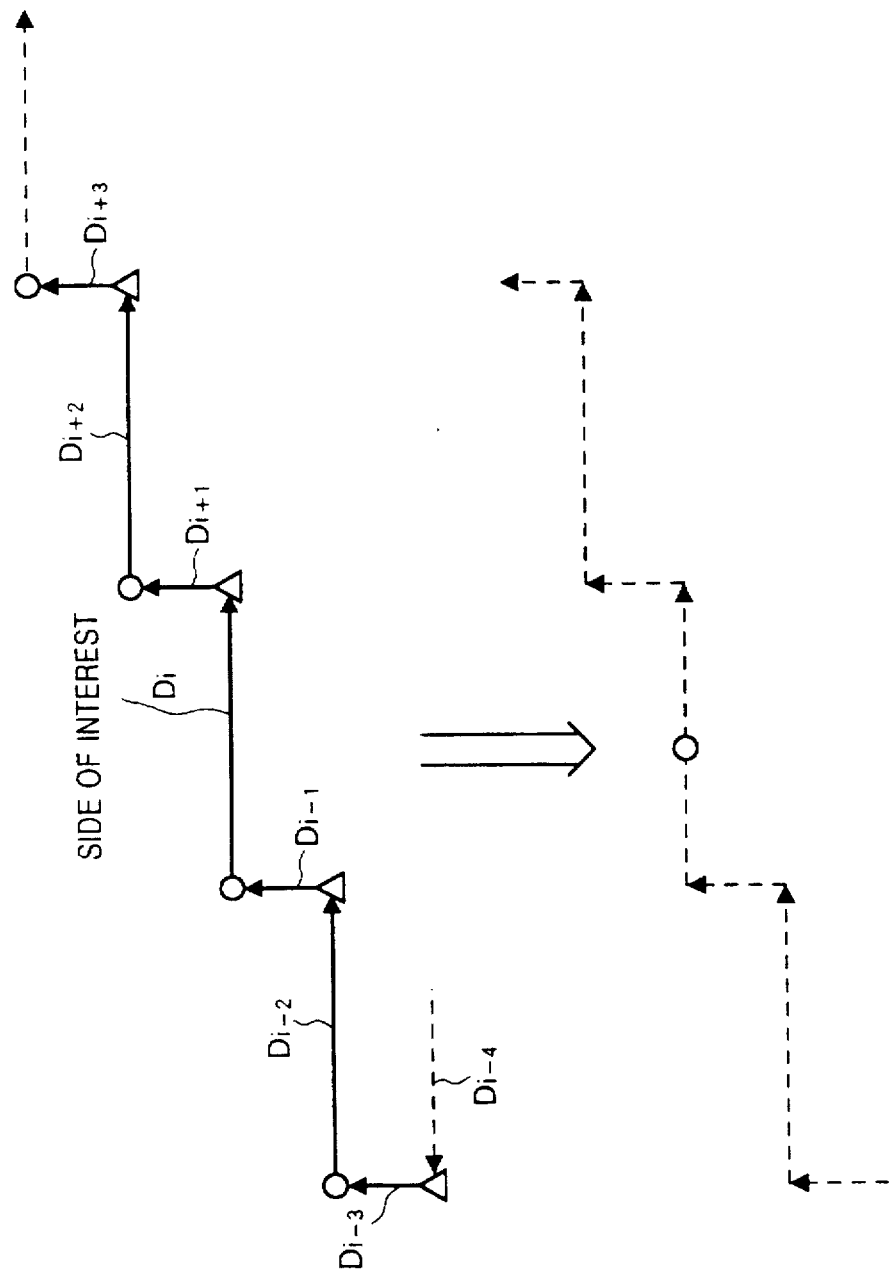
FIG. 24 is a diagram for describing a first smoothing processing operation.

FIG. 24 illustrates this. Specifically, FIG. 24 illustrates the condition of a coarse-contour side vector $D_i$ of interest, three side vectors $D_{i-1}$, $D_{i-2}$, $D_{i-3}$ in front of the coarse-contour side vector $D_i$ of interest and three side vectors $D_{i+1}$, $D_{i+2}$, $D_{i+3}$ after the coarse-contour side vector $D_i$ of interest, and the conditions of contour points after first smoothing defined with regard to the side of interest $D_i$.

The details of first smoothing processing are as described above. The items of data after first smoothing are successively constructed in a prescribed area of the RAM 76. The CPU 72 executes second smoothing processing at step S113 in FIG. 23 when the processing of step S112 is concluded.

In second smoothing, the data that has been subjected to first smoothing is entered and this data is processed. More specifically, contour-point data that has been subjected to second smoothing is outputted upon entering the number of closed loops, the number of contour points of each closed loop, a coordinate-data string of contour points, which have been subjected to first smoothing, of each closed loop, and an additional-information data string of contour points, which have been subjected to first smoothing, of each closed loop.

Figure 25:
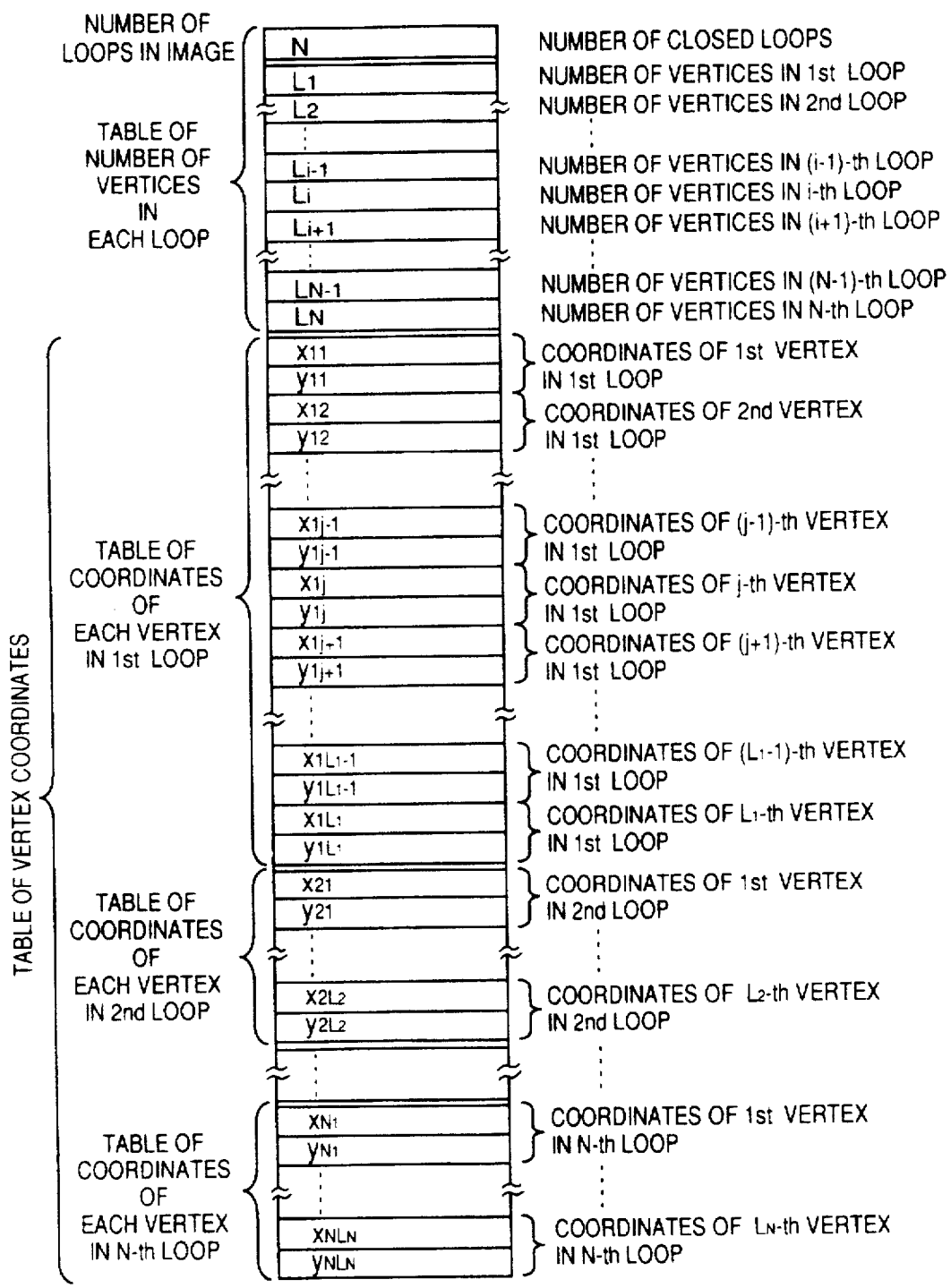
FIG. 25 is a diagram showing the format of contour data from first smoothing onward.

As shown in FIG. 25, the contour data that has been subjected to second smoothing is composed of the number of closed loops, a table of the number of contour points of each closed loop and a coordinate data string of contour points, which have been subjected to second smoothing, of each closed loop.

An overview of second smoothing processing will be described with reference to FIG. 26. In second smoothing, processing is executed in closed-loop units in the same manner as in first smoothing, and processing proceeds from one contour point to another in each contour loop.

In a case where a contour point of interest is an angular point with regard to each contour point, the coordinates of the entered contour point are themselves made contour-point coordinate data, which has been subjected to second smoothing, with respect to the contour point of interest. In other words, no change is made.

In a case where a contour point of interest is a non-angular point, coordinates decided by a weighted mean of contour-point coordinates before and after the non-angular point and coordinates of the contour point of interest are made contour-point coordinate data, which has been subjected to second smoothing, with respect to the contour point of interest. More specifically, let $Pi(x_i,y_i)$ represent an input contour point of interest, which is a non-angular point, let $P_{i-1}(x_{i+1},y_{i+1})$ represent the immediately preceding contour point in the input contour loop of $P_i$, let $P_{i+1}(x_{i+1},y_{i+1})$ represent the immediately following contour point, and let $Qi(x'i,y'i)$ represent a contour point, which has been subjected to second smoothing, with respect to the input contour point $P_i$ of interest. In such case, the following calculations are performed:

$$x'_i = k_{i-1} \cdot x_{i-1} + k_i \cdot x_i + k_{i+1} \cdot x_{i+1}$$

$$y'_i = k_{i-1} \cdot y_{i-1} + k_i \cdot y_i + k_{i+1} \cdot y_{i+1}$$

where $k_{i-1} = k_{i+1} = \frac{1}{4}$, $k_i = \frac{1}{2}$.

Figure 26:
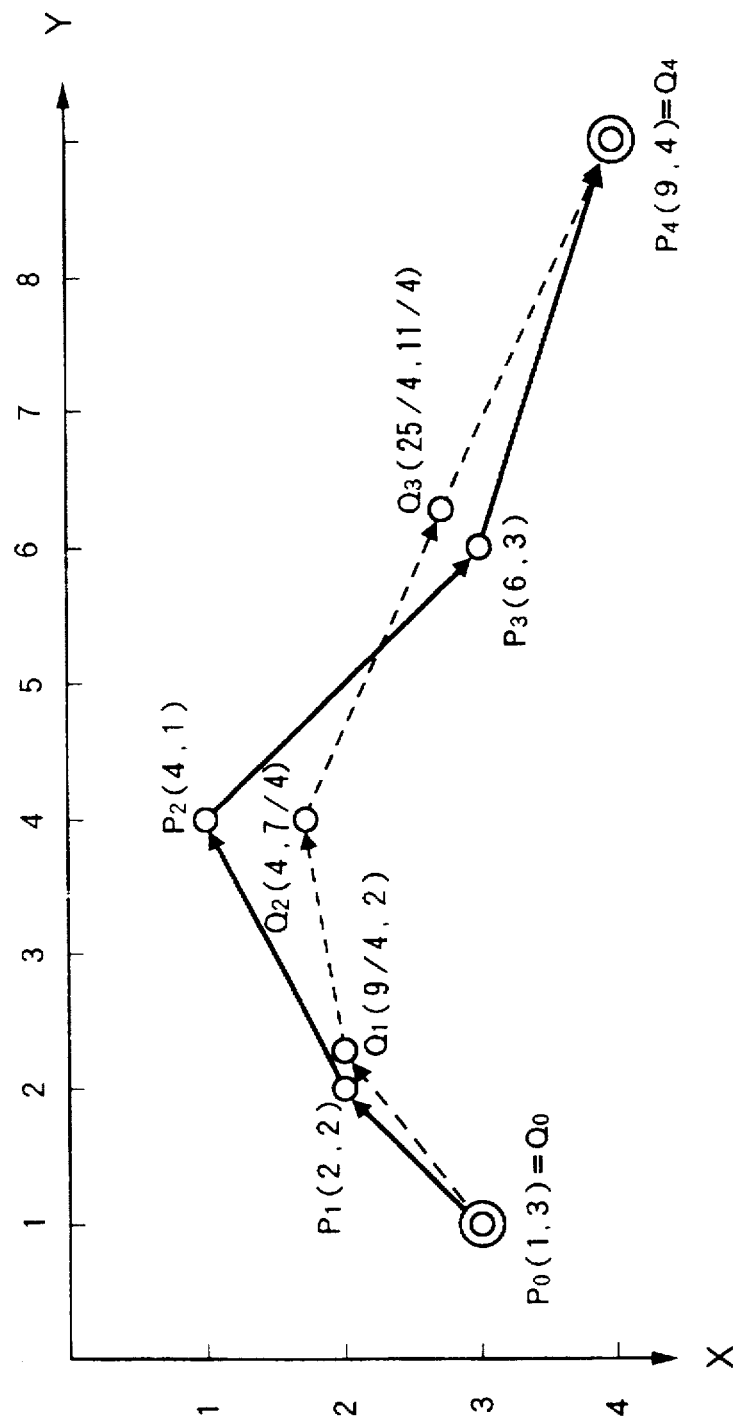
FIG. 26 is a diagram for describing the contents of second smoothing processing.

In FIG. 26, points $P_0$, $P_1$, $P_2$, $P_3$, $P_4$ are part of an input continuous contour point sequence that has been subjected to first smoothing, in which $P_0$ and $P_4$ are angular points and $P_1$, $P_2$ and $P_3$ is a non-angular point. The results of processing at this time are indicated at points $Q_0$, $Q_1$, $Q_2$, $Q_3$, $Q_4$. Since $P_0$ and $P_4$ are angular points, the coordinate values of these points directly become the coordinate values of $Q_0$ and $Q_4$, respectively.

Further, point $Q_1$ has the values calculated from $P_0$, $P_1$, $P_2$ in accordance with the foregoing equations as its coordinates. Similarly, point $Q_2$ has the values calculated from $P_1$, $P_2$, $P_3$ in accordance with the foregoing equations as its coordinates, and point $Q_3$ has the values calculated from $P_2$, $P_3$, $P_4$ in accordance with the foregoing equations as its coordinates.

The CPU 71 executes second smoothing processing with respect to contour data, which has been subjected to first smoothing, in a prescribed area of the RAM 76. Processing proceeds loop by loop in order from the first loop, then to the second loop and third loop, etc., and second smoothing processing is concluded in response to the end of processing of all loops. In the processing of each loop, processing proceeds in order from the first point, then to the second and third points, etc. When the processing indicated by Equation (1) with regard to all contour points in a pertinent loop is concluded, the processing of this loop is terminated and processing proceeds to the next loop.

In a case where there are L-number of contour points within a loop, a point before the first point is an L-th point, and a point after the L-th point is a first point. In second smoothing, the total number of loops in the same as the input contour data that has been subjected to first smoothing, and data of the same number of contour points is generated without changing the number of contour points on each loop. The CPU 72 outputs the above-mentioned results in the format shown in FIG. 25 in a separate area of the RAM 76 or in the disk device 72 and then terminates second smoothing processing (step S3).

Next, the CPU 1 executes the processing of step S114, where the data obtained as a result of secondary smoothing is transferred to the binary-image reproducing means 4 via the I/O 75. This ends the series of processing steps shown in FIG. 23.

(EXAMPLE 2)

Figure 27:
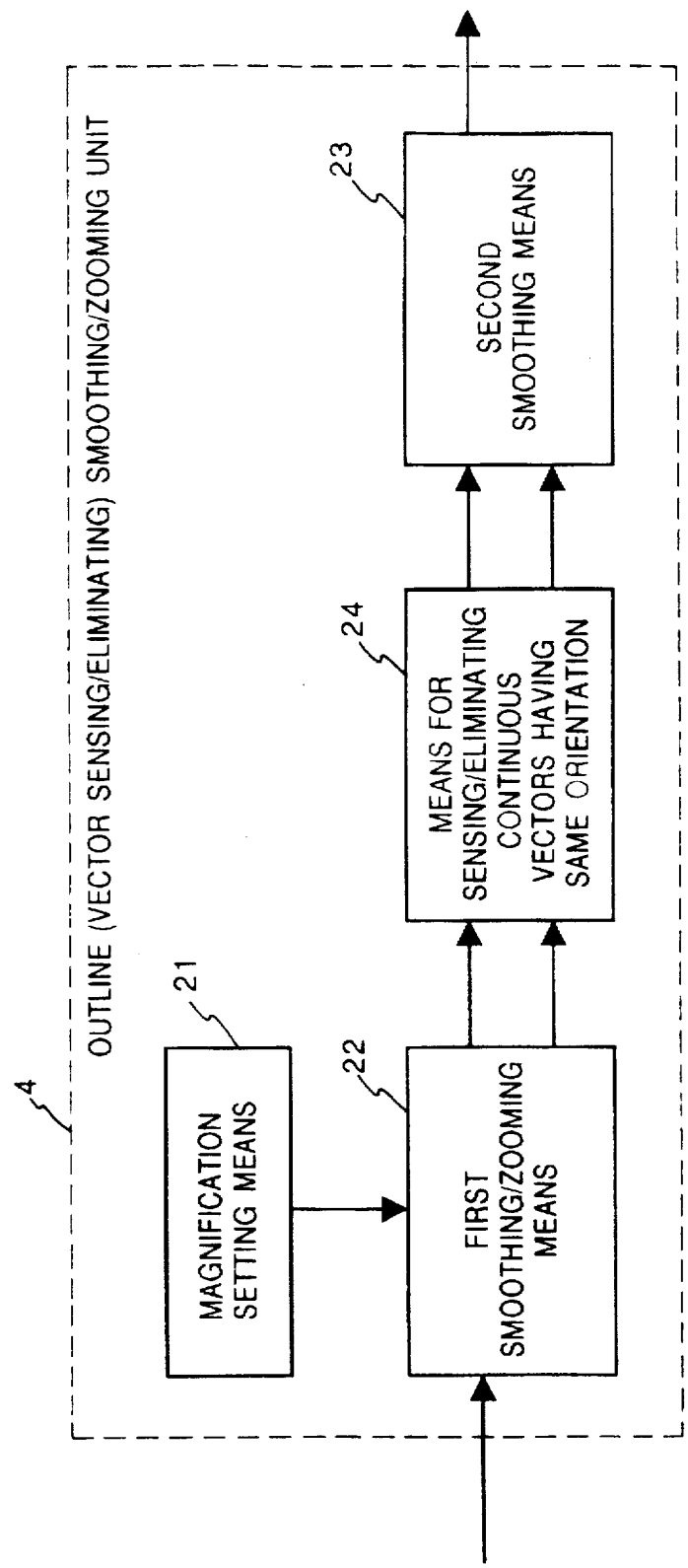
FIG. 27 is a diagram showing another example of functional blocks for outline smoothing/zooming unit.

FIG. 27 illustrates the detailed configuration of the outline smoothing/zooming unit 4 according to this embodiment. The unit 4 includes zoom magnification setting means 21, and first smoothing/zooming means 22 for subjecting the entered coarse-contour data to smoothing and zooming processing at a magnification set by the magnification setting means 21. The processed results are delivered to means 24 for sensing and eliminating continuous vectors having the same orientation. If continuous short vectors having the same slope are sensed and these short vectors are found to exist, these short vectors are connected to eliminate the number of vectors to be subjected to processing subsequently. The results of processing from the sensing/eliminating means 24 are subjected to further smoothing by second smoothing means 23 to obtain the final output.

The units 21, 22, 23 in FIG. 27 can be constructed in the same manner as the units 31, 32, 33 in the earlier patent applications mentioned above (see FIG. 21). Since the outline (vector sensing/elimination) smoothing and zooming unit 4 in FIG. 27 executes processing by program in the case of this embodiment, it basically can be realized by the arrangement of FIG. 22. As a manner of course, however, the program stored in the ROM 74 is difference.

Figure 28:
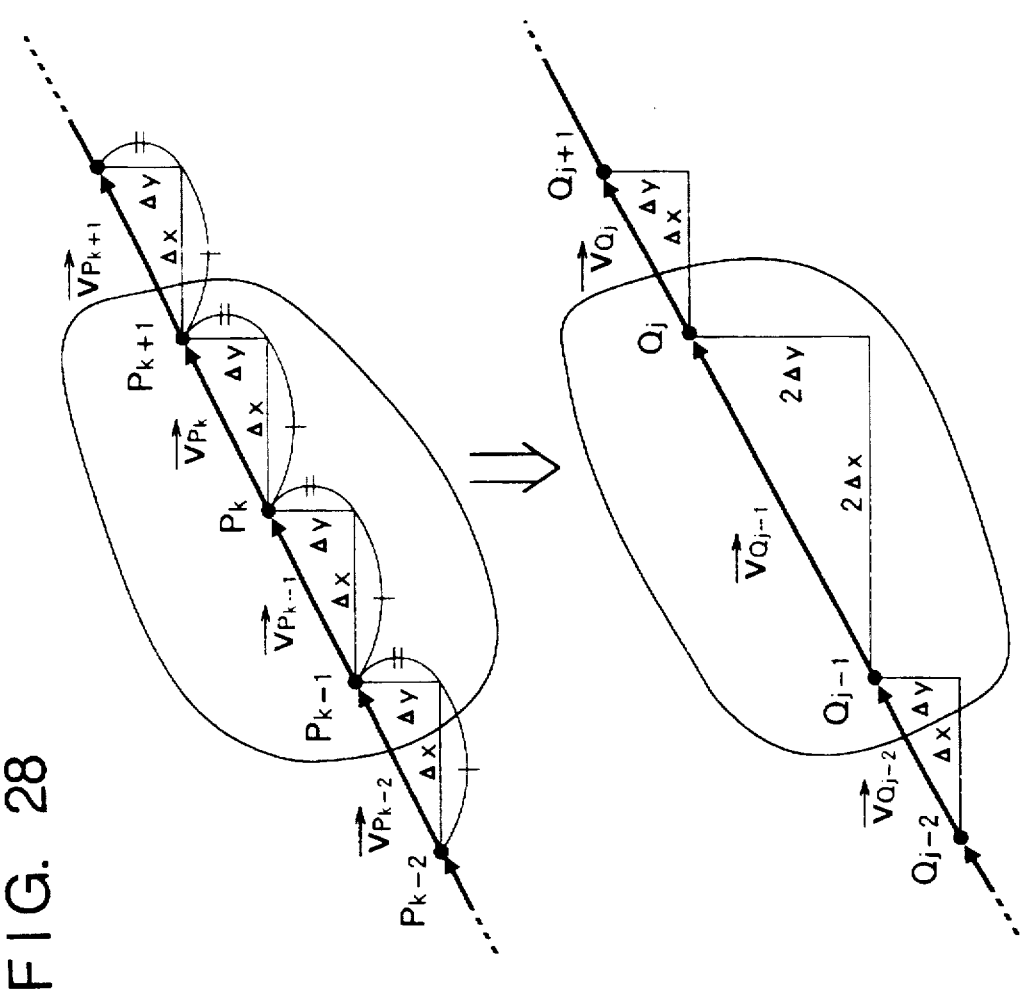
FIG. 28 is a diagram for describing the operating principle of means for sensing and eliminating continuous vectors having the same orientation.

The general operation of the means 24 for sensing and eliminating continuous vectors having the same orientation will be described with reference to FIG. 28. In FIG. 28, $P_{k-2}$, $P_{k-1}$, $P_k$, $P_{k+1}$, $P_{k+2}$ ... represent a mutually continuous contour-point sequence on the same contour vector loop constituting an input contour vector that has been subjected to first smoothing and zooming processing. In a case where the coordinates of each contour point $P_i$ ($i=_{k-2, k-1, k, k+1, k+2}$ ...) are expressed by $(x_{Pi}, y_{Pi})$, a short vector $v_{Pi}$ ($\Delta x_{Pi}, \Delta y_{Pi}$) defined by the contour points $P_i$ and $P_{i+1}$ can be expressed as follows:

$$\Delta x_{Pi} = x_{Pi+1} - x_{Pi}$$

$$\Delta y_{Pi} = y_{Pi+1} - y_{Pi}$$

In a case where $$x_{Pi-1} \times m = \Delta x_{Pi}$$

and $$y_{Pi-1} \times m = \Delta y_{Pi} \quad (1)$$

(where m represents a real constant) holds in the mutually continuous contour-point sequence $P_{i-1}$, $P_i$, $P_{i+1}$ on the same contour vector loop, $v_{Pi-1}$ defined by $P_{i-1}$ and $P_i$ and $v_P$ defined by $P_i$ and $P_{i+1}$ have the same slope.

In the contour-point sequence $P_{k-2}$, $P_{k-1}$, $P_k$, $P_{k+1}$, $P_{k+2}$ of FIG. 28, ... $Q_{j-2}$, $Q_{j-1}$, $Q_j$, $Q_{j+1}$ are outputted anew on the basis of $P_{k-2}$, $P_{k-1}$, $P_{k+1}$, $P_{k+2}$ ..., respectively, excluding the contour point $P_k$ of interest. More specifically, since $\Delta x_{Pk-1} = \Delta x_{Pk}$ and $\Delta y_{Pk-1} = \Delta y_{Pk}$ so that the condition indicated by Eq. (1) is satisfied, it can be sensed that $v_{Pk-1}$ and $v_{Pk}$ have the same slope. Accordingly, these are connected and treated as $v_{Qj-1}$, and the contour point $P_k$ of interest between $P_{k-1}$ and $P_{k+1}$ is eliminated and excluded from output.

Figure 29:
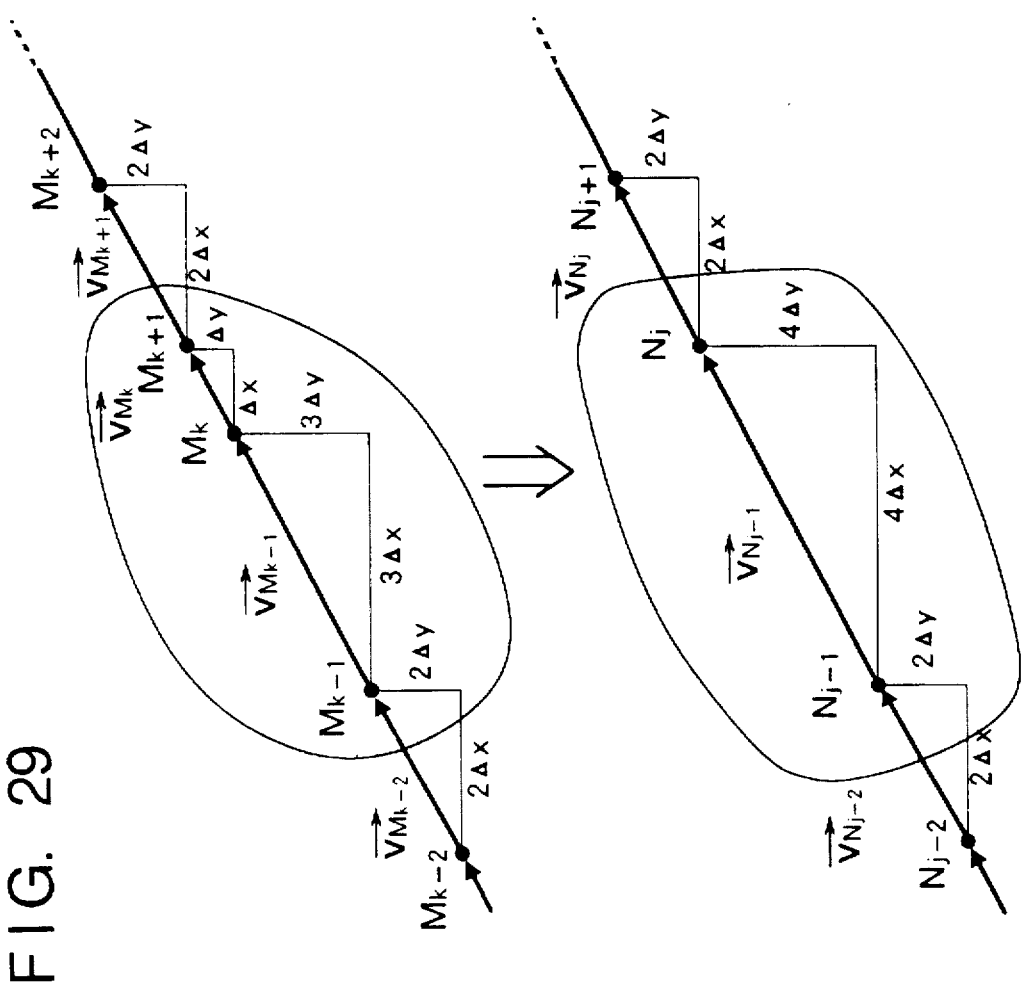
FIG. 29 is a diagram for describing the operating principle of means for sensing and eliminating continuous vectors having the same orientation.

In FIG. 29, as in FIG. 28, $M_{k-2}$, $M_{k-1}$, $M_k$, $M_{k+1}$, $M_{k+2}$ ... represent a mutually continuous contour-point sequence on the same contour vector loop constituting an input contour vector that has been subjected to first smoothing and zooming processing. Here also, $N_{j-2}$, $N_{j-1}$, $N_j$, $N_{j+1}$ are outputted anew on the basis of $M_{k-2}$, $M_{k-1}$, $M_{k+1}$, $M_{k+2}$ ..., respectively, excluding the contour point $M_k$ of interest.

More specifically, $\Delta x_{Mk-1} \times \frac{1}{3} = \Delta x_{Mk}$ and $\Delta y_{Mk-1} \times \frac{1}{3} = \Delta y_{Mk}$ so that the condition indicated by Eq. (1) is satisfied. Accordingly it is sensed that $v_{Mk-1}$ and $v_{Mk}$ have the same slope. $v_{Mk-1}$, $v_{Mk}$ are connected and treated as $v_{Nj-1}$, and the contour point $M_k$ between $M_{k-1}$ and $M_{k+1}$ is eliminated and excluded from output.

Thus, the foregoing describes the principle for eliminating one point in the middle of a contour-point sequence comprising three mutually continuous points on the same contour-vector loop.

Since the slopes of two contour vectors defined by three points are equal, a case arises in which the above-mentioned two vectors prior to elimination are replaced by a contour vector in which one point in the middle is eliminated, the slopes of the two vectors prior to elimination are equal and the length is equal to the sum of the lengths of these two vectors. The difference in the results of processing from this point onward will be described.

In other words, in a case where contour vectors having the same slope are continuous, how much continuity is necessary to eliminate points will now be considered.

Figure 30:
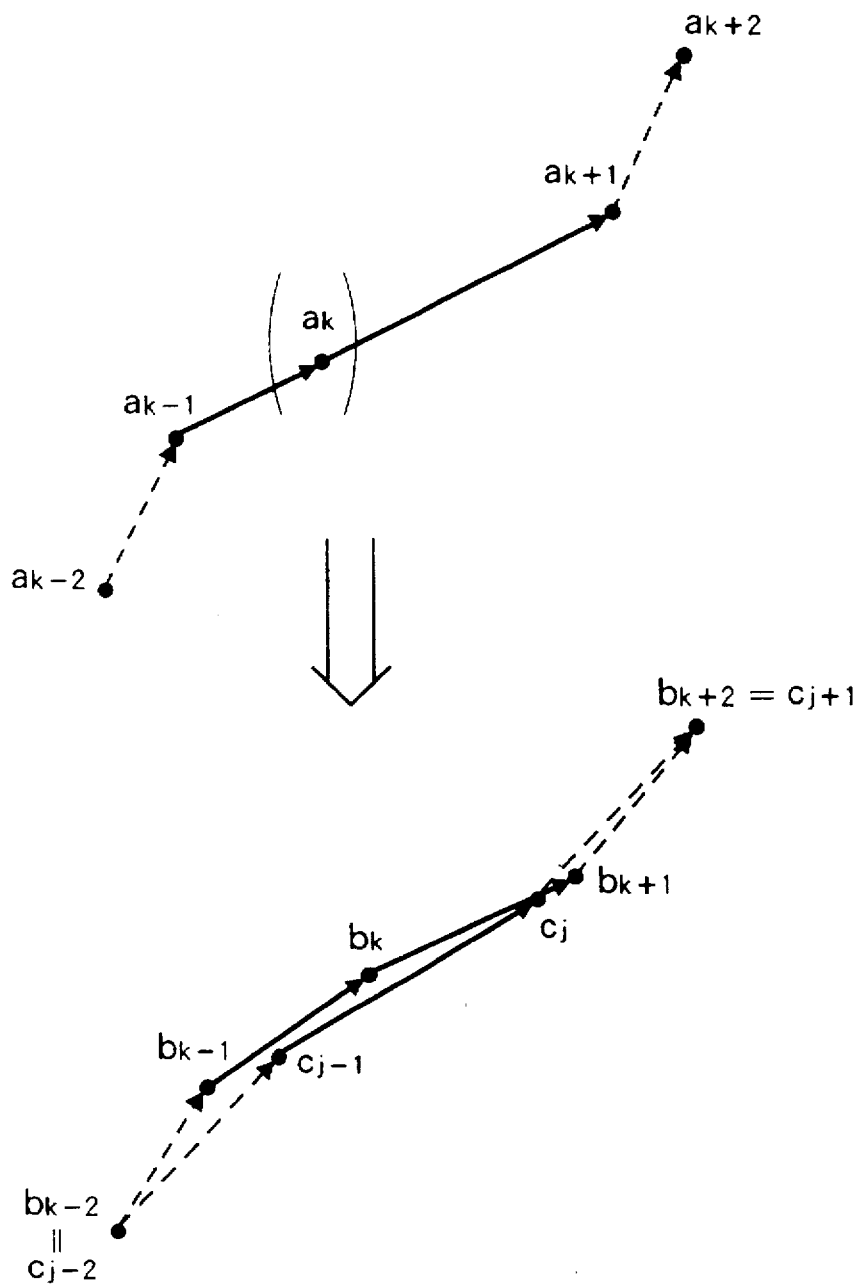
FIG. 30 is a diagram for describing the operating principle of means for sensing and eliminating continuous vectors having the same orientation.

In FIG. 30, $a_{k-2}, a_{k-1}, a_k, a_{k+1}, a_{k+2}$ ... represent a mutually continuous contour-point sequence on the same contour vector loop constituting a contour vector that has been subjected to first smoothing and zooming processing. In a case where $a_{k-2}, a_{k-1}, a_k, a_{k+1}, a_{k+2}$ ... is subjected to second smoothing as is (where $a_{k-2}$ and $a_{k+2}$ are angular points and $a_{k-1}, a_k, a_{k+1}$ are non-angular points), the contour-point sequence obtained after second smoothing is expressed by ... $b_{k-2}, b_{k-1}, b_k, b_{k+1}, b_{k+2}$ .... On the other hand, with regard to $c_{j-2}, c_{j-1}, c_j, c_{j+1}$, Equation (1) is established in the three points $a_{k-1}, a_k, a_{k+1}$. Therefore, this is a mutually continuous contour-point sequence constituted by ... $a_{k-2}, a_{k-1}, a_{k+1}, a_{k+2}, \ldots$, excluding $a_k$, and the contour-point sequence after second smoothing corresponding to this is expressed by ... $c_{j-2}, c_{j-1}, c_j, c_{j+1}, \ldots$.

Figure 31:
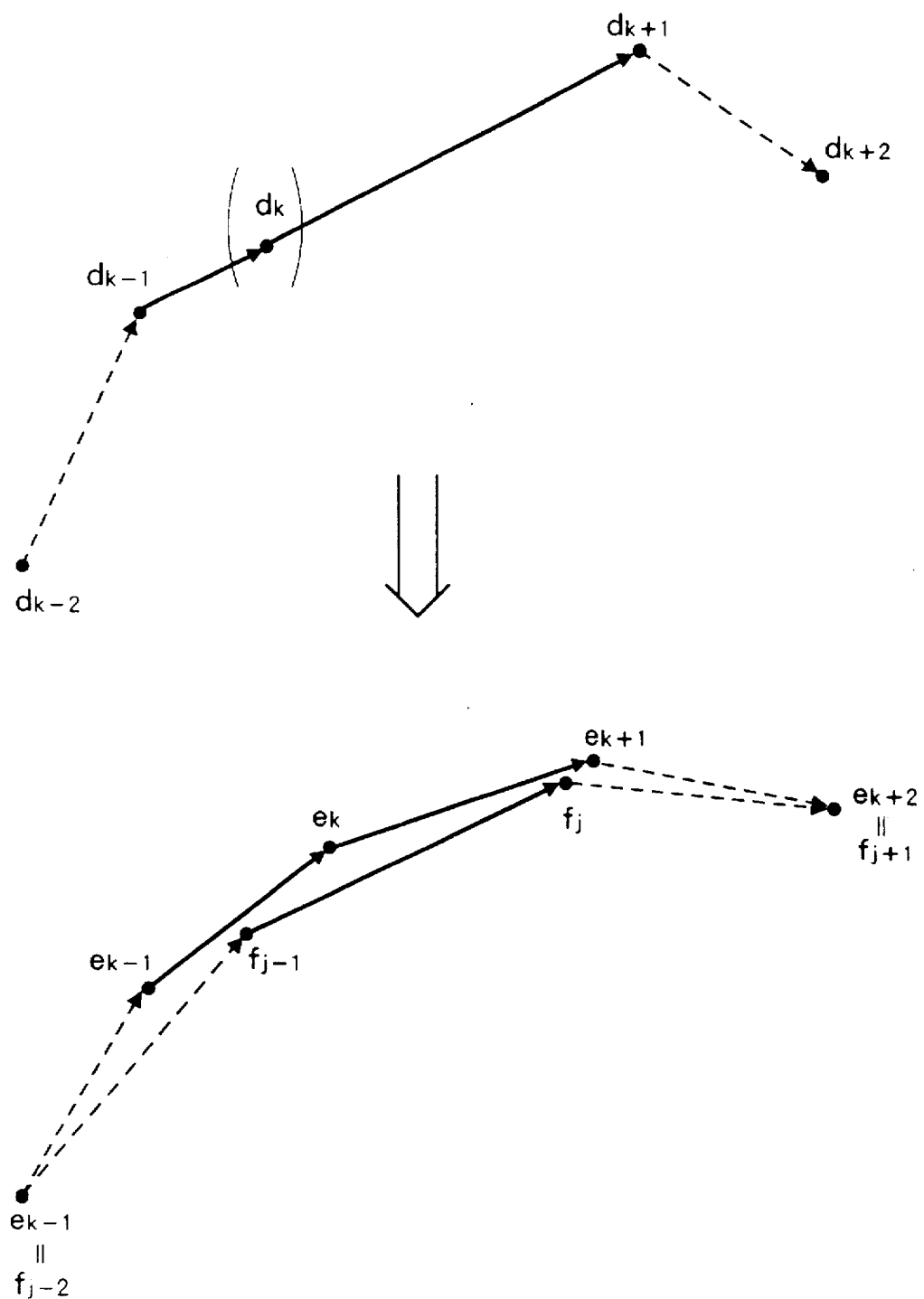
FIG. 31 is a diagram for describing the operating principle of means for sensing and eliminating continuous vectors having the same orientation.

In FIG. 31, $d_{k-2}, d_{k-1}, d_k, d_{k+1}, d_{k+2}$ ... represent one other mutually continuous contour-point sequence on the same contour vector loop constituting a contour vector that has been subjected to first smoothing and zooming processing. In a case where ... $d_{k-2}, d_{k-1}, d_k, d_{k+1}, d_{k+2}$ ... is subjected to second smoothing as is (where $d_{k-2}$ and $d_{k+2}$ are angular points and $d_{k-1}, d_k, d_{k+1}$ are non-angular points), the contour-point sequence obtained after second smoothing is expressed by ... $e_{k-2}, e_{k-1}, e_k, e_{k+1}, e_{k+2}$ ... On the other hand, with regard to $f_{j-2}, f_{j-1}, f_j, f_{j+1}$, Equation (1) is established in the three points $d_{k-1}, d_k, d_{k+1}$. Therefore, this is a mutually continuous contour-point sequence constituted by ... $d_{k-2}, d_{k-1}, d_{k+1}, d_{k+2}, \ldots$, excluding $d_k$, and the contour-point sequence after second smoothing corresponding to this is expressed by ... $f_{j-2}, f_{j-1}, f_j, f_{j+1}, \ldots$.

In FIG. 30, ... $b_{k-2}, b_{k-1}, b_k, b_{k+1}, b_{k+2}$ ... and ... $c_{j-2}, c_{j-1}, c_j, c_{j+1}, \ldots$ clearly differ in terms of the contour shape represented. Further, $e_{k-2}, e_{k-1}, e_k, e_{k+1}, e_{k+2}$ ... and ... $f_{j-2}, f_{j-1}, f_j, f_{j+1}, \ldots$ in FIG. 31 clearly differ in terms of the contour shape represented.

The reason for this difference is that while contour points which are non-angular points take on the weighted mean between the mutually continuous immediately preceding contour point and immediately following contour point on the same contour vector loop in second smoothing, as shown in FIG. 26, this immediately preceding or immediately following contour point is eliminated by the above-described contour-point elimination processing.

Figure 32:
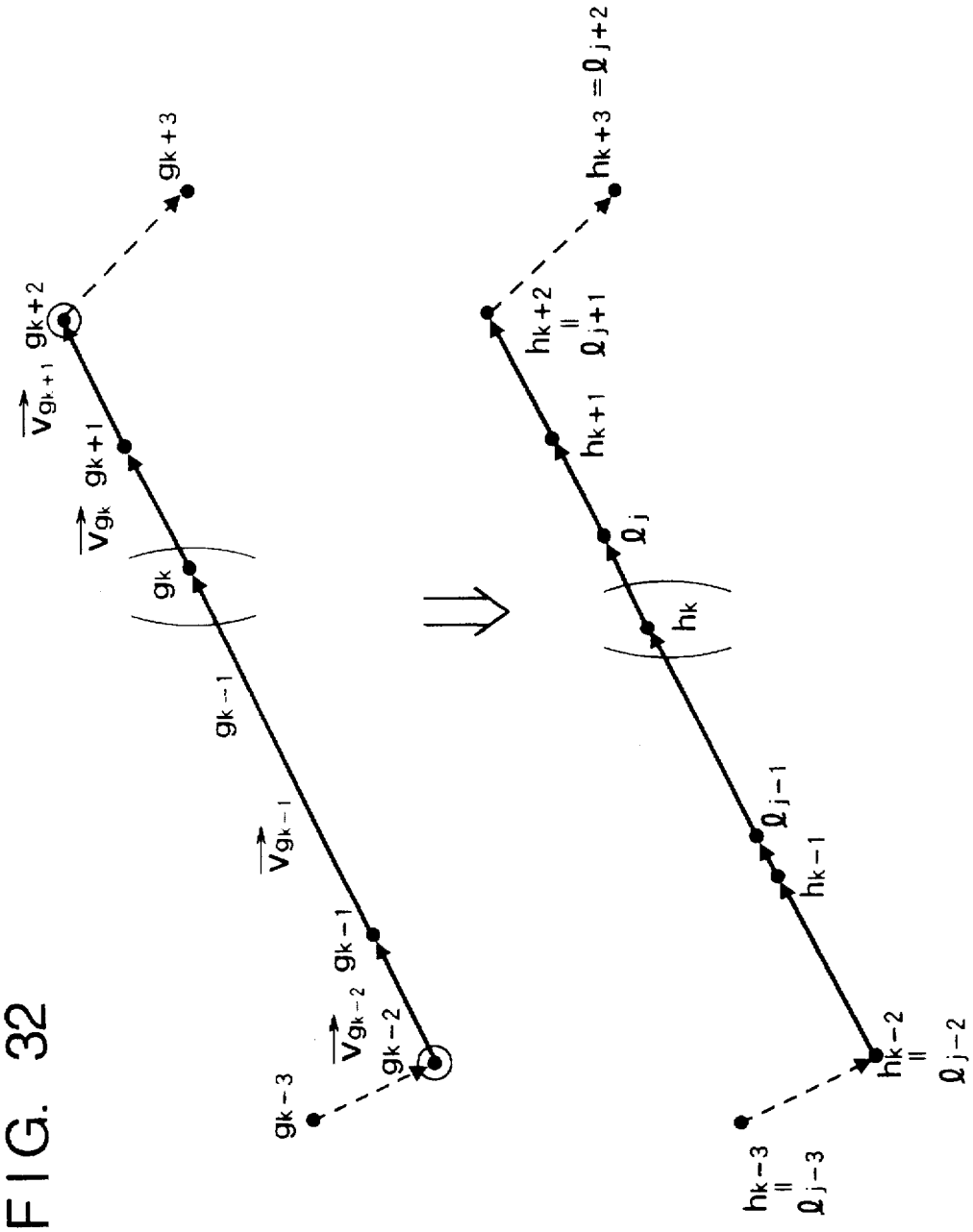
FIG. 32 is a diagram for describing the operating principle of means for sensing and eliminating continuous vectors having the same orientation.

In FIG. 32, ... $g_{k-3}, g_{k-2}, g_{k-1}, g_k, g_{k+1}, g_{k+2}, g_{k+3}$ ... represent a mutually continuous contour-point sequence on the same contour vector loop constituting a contour vector that has been subjected to first smoothing and zooming processing. In a case where ... $g_{k-3}, g_{k-2}, g_{k-1}, g_k, g_{k+1}, g_{k+2}, g_{k+3}, \ldots$ is subjected to second smoothing as is (where $g_{k-2}$ and $g_{k+2}$ are angular points and $g_{k-1}, g_k, g_{k+1}$ are contour points that are not angular points), the contour-point sequence obtained after second smoothing is expressed by ... $h_{k-3}, h_{k-2}, h_{k-1}, h_k, h_{k+1}, h_{k+2}, h_{k+3}, \ldots$. On the other hand, with regard to $l_{j-3}, l_{j-2}, l_{j-1}, l_j, l_{j+1}, l_{j+2}$, in a case where Equation (1) is established in all sets of three mutually continuous points $g_{k-2}, g_{k-1}, g_k; g_{k-1}, g_k, g_{k+1}; g_k, g_{k+1}, g_{k+2}$ in the five points $g_{k-2}, g_{k-1}, g_k, g_{k+1}, g_{k+2}$, this is a mutually continuous contour-point sequence constituted by ... $g_{k-3}, g_{k-2}, g_{k-1}, g_{k+1}, g_{k+2}, g_{k+3}, \ldots$, excluding $g_k$ at the center, and the contour-point sequence after second smoothing corresponding to this is expressed.

Figure 33:
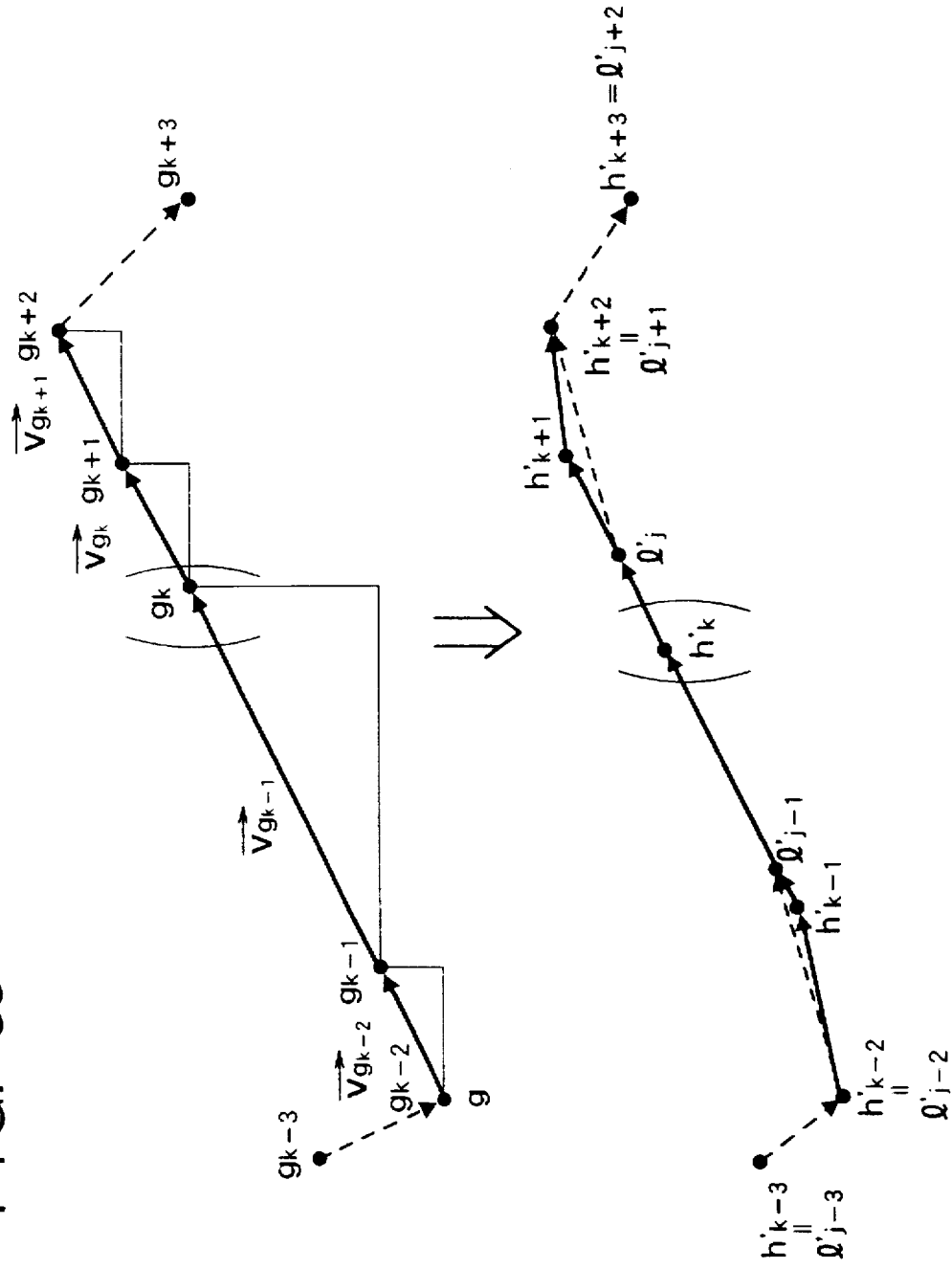
FIG. 33 is a diagram for describing the operating principle of means for sensing and eliminating continuous vectors having the same orientation.

As shown in FIG. 33, with regard to $g_{k-3}, g_{k-2}, g_{k-1}, g_{k+1}, g_{k+2}, g_{k+3}, \ldots$ a contour-point sequence after second smoothing obtained in a case where these points are treated as being contour points that are not angular points and are subjected to second smoothing as is in the same manner as $g_{k-2}, g_{k+2}$ and $g_{k-1}, g_k, g_{k+1}$, are expressed by $h'_{k-3}, h'_{k-2}, h'_{k-1}, h'_k, h'_{k+1}, h'_{k+2}, h'_{k+3}$.

On the other hand, with regard to $l'_{j-3}, l'_{j-2}, l'_{j-1}, l'_j, l'_{j+1}, l'_{j+2}, \ldots$, Equation (1) is established in all sets of three mutually continuous points $g_{k-2}, g_{k-1}, g_k; g_{k-1}, g_k, g_{k+1}; g_k, g_{k+1}, g_{k+2}$ in the five points $g_{k-2}, g_{k-1}, g_k, g_{k+1}, g_{k+2}$. Therefore, this is a mutually continuous contour-point sequence constituted by ... $g_{k-3}, g_{k-2}, g_{k-1}, g_{k+1}, g_{k+2}, g_{k+3}, \ldots$, excluding $g_k$ at the center, and the contour-point sequence after second smoothing corresponding to this is expressed.

When FIGS. 32 and 33 are compared, it is found that the state prior to second smoothing processing is such that the coordinate values of ... $g_{k-3}, g_{k-2}, g_{k-1}, g_{k+1}, g_{k+2}, g_{k+3}, \ldots$ are exactly equal. A difference is that whereas $g_{k-2}$ and $g_{k+2}$ are angular points in FIG. 32, $g_{k-2}$ and $g_{k+2}$ are non-angular points in FIG. 33. In the case of FIG. 32 in which $g_{k-2}$ and $g_{k+2}$ are angular points, there is complete agreement between a contour shape expressed by the contour-point sequence $h_{k-1}, h_k, h_{k+1}, h_{k+2}$ after second smoothing processing obtained from $g_{k-2}, g_{k-1}, g_{k+1}, g_{k+2}$ in which $g_k$ is not eliminated and a contour shape expressed by the contour-point sequence $l_{j-2}, l_{j-1}, l_j, l_{j+1}$ after second smoothing processing obtained from $g_{k-2}, g_{k-1}, g_{k+1}, g_{k+2}$ in which $g_k$ is eliminated. On the other hand, in the case of FIG. 33 in which $g_{k-2}$ and $g_{k+2}$ are non-angular points, with regard to a contour shape expressed by the contour-point sequence $h'_{k-2}, h'_{k-1}, h'_k, h'_{k+1}, h'_{k+2}$ after second smoothing processing obtained from $g_{k-2}, g_{k-1}, g_{k+1}, g_{k+2}$ in which $g_k$ is not eliminated and a contour shape expressed by the contour-point sequence $l'_{j-2}, l'_{j-1}, l'_j, l'_{j+1}$ after second smoothing processing obtained from $g_{k-2}, g_{k-1}, g_{k+1}, g_{k+2}$ in which $g_k$ is eliminated, there is complete agreement of the portions between $l'_{j-1}, l'_j$ but there is no agreement between $l'_{j-2}$ (=$h'_{k-2}$) and $l'_{j-1}$ and between $l'_j$ and $l'_{j+1}$ (=$h'_{k+2}$).

Figure 34:
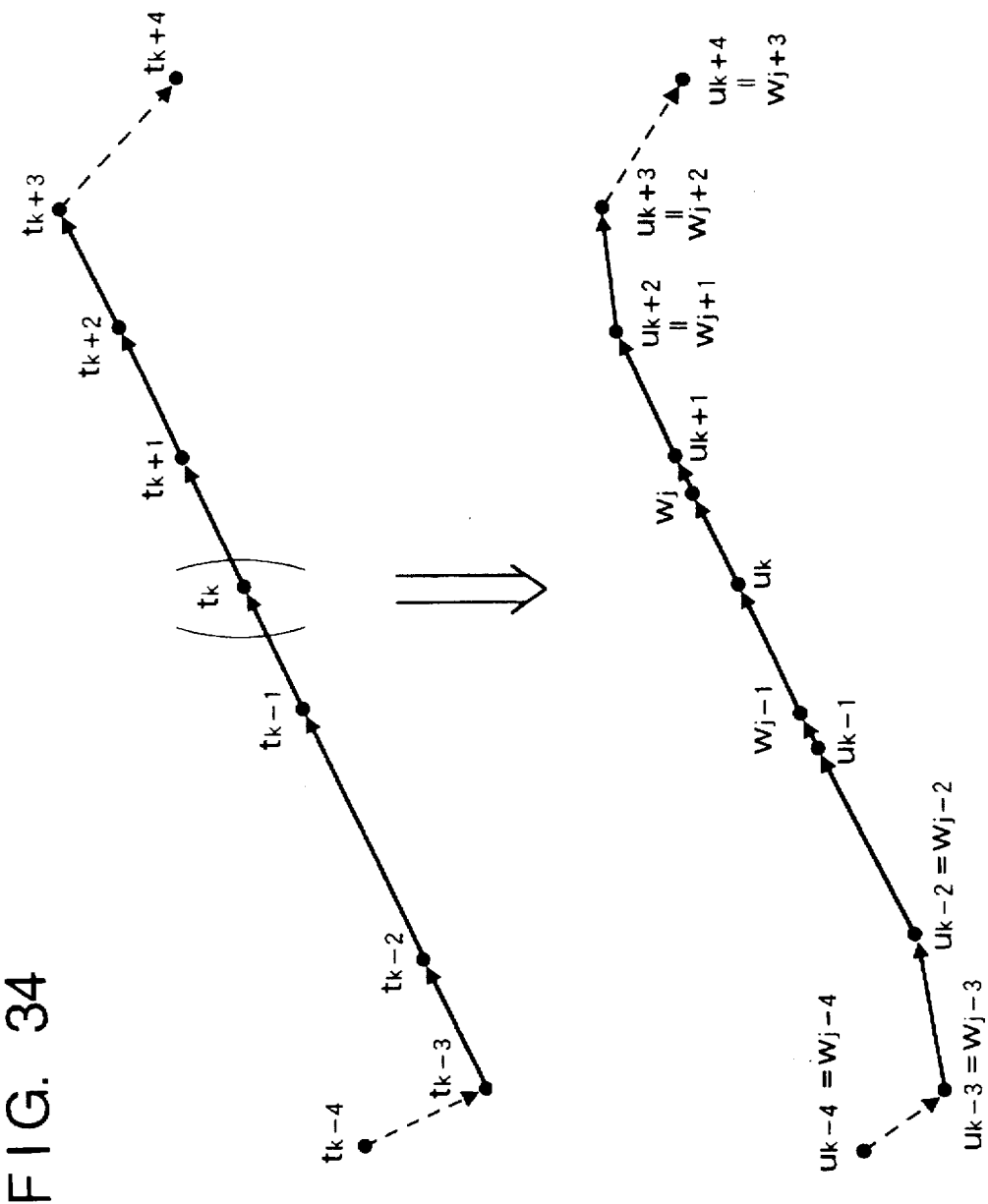
FIG. 34 is a diagram for describing the operating principle of means for sensing and eliminating continuous vectors having the same orientation.

In FIG. 34, ... $t_{k-4}, t_{k-3}, t_{k-2}, t_{k-1}, t_k, t_{k+1}, t_{k+2}, t_{k+3}, t_{k+4}, \ldots$ represent a mutually continuous contour-point sequence on the same contour vector loop constituting a contour vector that has been subjected to first smoothing and zooming processing. In a case where ... $t_{k-4}, t_{k-3}, t_{k-2}, t_{k-1}, t_k, t_{k+1}, t_{k+2}, t_{k+3}, t_{k+4}, \ldots$ is subjected to second smoothing as is (where $t_{k-3}, t_{k-2}, \ldots, t_{k+3}$ are all are non-angular points), the contour-point sequence obtained after second smoothing is expressed by ... $u_{k-4}, u_{k-3}, u_{k-2}, u_{k-1}, u_k, U_{k+1}, u_{k+2}, u_{k+3}, u_{k+4}, \ldots$. Further, with regard to $w_{k-4}, w_{k-3}, w_{k-2}, w_{k-1}, w_k, w_{k+1}, w_{k+2}, w_{k+3}$, in a case where Equation (1) is established in all sets of three mutually continuous points $t_{k-3}, t_{k-2}, t_{k-1}; t_{k-2}, t_{k-1}, t_k; t_{k-1}, t_k, t_{k+1}; t_k, t_{k+1}, t_{k+2}$ in the seven points $t_{k-3}, t_{k-2}, t_{k-1}, t_k, t_{k+1}, t_{k+2}, t_{k+3}$, this is a mutually continuous contour-point sequence constituted by ... $t_{k-4}, t_{k-3}, t_{k-2}, t_{k-1}, t_{k+1}, t_{k+2}, t_{k+3}, t_{k+4}, \ldots$, excluding $t_k$ at the center, and the contour-point sequence after second smoothing corresponding to this is expressed. In this case, there is complete agreement between the contour shape expressed by $u_{k-3}, u_{k-2}, u_{k-1}, u_k, u_{k+1}, u_{k+2}, u_{k+3}$ and the contour shape expressed by $w_{k-3}, w_{k-2}, w_{k-1}, w_k, w_{k+1}, w_{k+2}$.

In a contour-point sequence $z_{k-3}, z_{k-2}, z_{k-1}, z_k, z_{k+1}, z_{k+2}, z_{k+3}$ of seven mutually continuous points centered on contour point $z_k$ in a contour-point sequence that has been subjected to smoothing, it will readily be understood from the foregoing examples that if six short vectors defined by these seven points all have slopes that are equal, there will be no change in the shape of the contour obtained even if subsequent processing is performed based on the six points $z_{k-3}$, $z_{k-2}$, $z_{k-1}$, $z_{k+1}$, $z_{k+2}$, $z_{k+3}$, with $z_k$ being excluded. Further, it will readily be understood that if, in a case where $z_{k-2}$ or $z_{k+2}$ is an angular point, five short vectors defined by six points in a contour-point sequence of six mutually continuous points $z_{k-2}$, $z_{k-1}$, $z_k$, $z_{k+1}$, $z_{k+2}$, $z_{k+3}$ or $z_{k-3}$, $z_{k-2}$, $z_{k-1}$, $z_k$, $z_{k+1}$, $z_{k+2}$, respectively, centered on $z_k$ all have slopes that are equal, then there will be no change in the shape of the contour obtained even if subsequent processing is performed based on the five-point contour-point sequence $z_{k-2}$, $z_{k-1}$, $z_{k+1}$, $z_{k+2}$, $z_{k+3}$ or $z_{k-3}$, $z_{k-2}$, $z_{k-1}$, $z_{k+1}$, $z_{k+2}$, respectively, with $z_k$ being excluded. Further, it will readily be understood that if, in a case where $z_{k+2}$ and $z_{k-2}$ are both angular points, four short vectors defined by five points in a contour-point sequence of five mutually continuous points $z_{k-2}$, $z_{k-1}$, $z_k$, $z_{k+1}$, $z_{k+2}$ centered on $z_k$, then there will be no change in the shape of the contour obtained even if subsequent processing is performed based on the four-point contour-point sequence $z_{k-2}$, $z_{k-1}$, $z_{k+1}$, $z_{k+2}$, with $z_k$ being excluded.

The means 24 in FIG. 27 for sensing and eliminating continuous vectors having the same orientation will now be described. The vector sensing/eliminating means 24 is capable of being realized using the hardware of FIG. 22, and the operation thereof will be described with reference to the flowcharts of FIGS. 35–40. The operation of the outline (vector sensing/elimination) smoothing and zooming means 4 of FIG. 27 is illustrated by the flowchart of FIG. 35.

Figure 35:
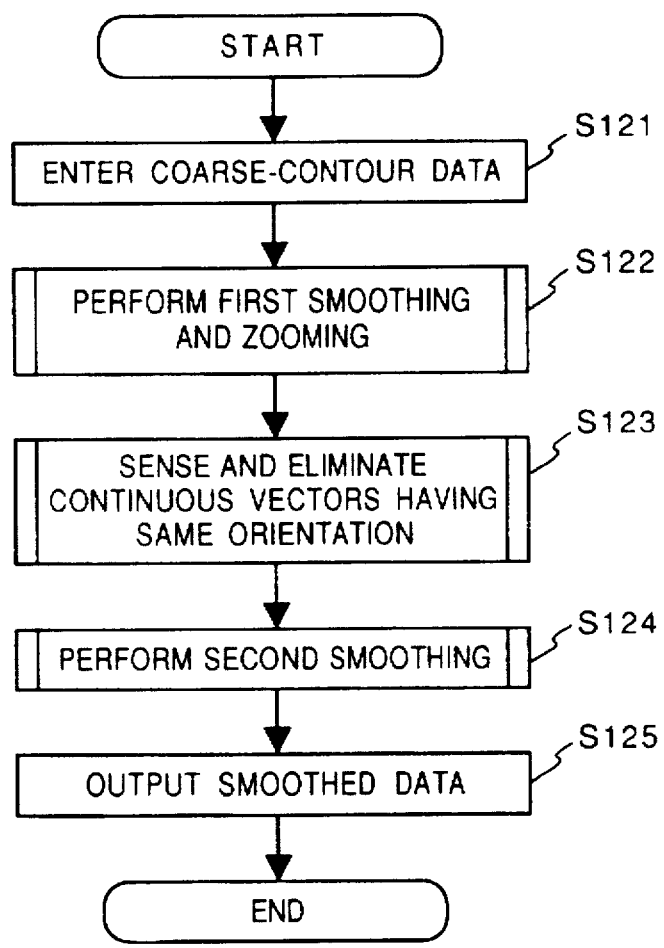
FIG. 35 is a block diagram illustrating outline smoothing/zooming means and outline (vector sensing/elimination) smoothing and zooming means.

At step S121 in FIG. 35, the CPU 71 reads out the coarse-contour data, which has been stored in the disk device 72, is read out and written in the working memory area of the RAM 76 via the disk I/O 73. This is followed by first smoothing and zooming processing at step S122, where the data resulting from first smoothing processing is preserved in the RAM 76. The details of processing are similar to those of step S112 in FIG. 23 and need not be described again. When the processing of step S122 is concluded, the CPU 72 performs processing for sensing and eliminating continuous vectors having the sample orientation. This is step S123 of the flowchart.

Figure 36:
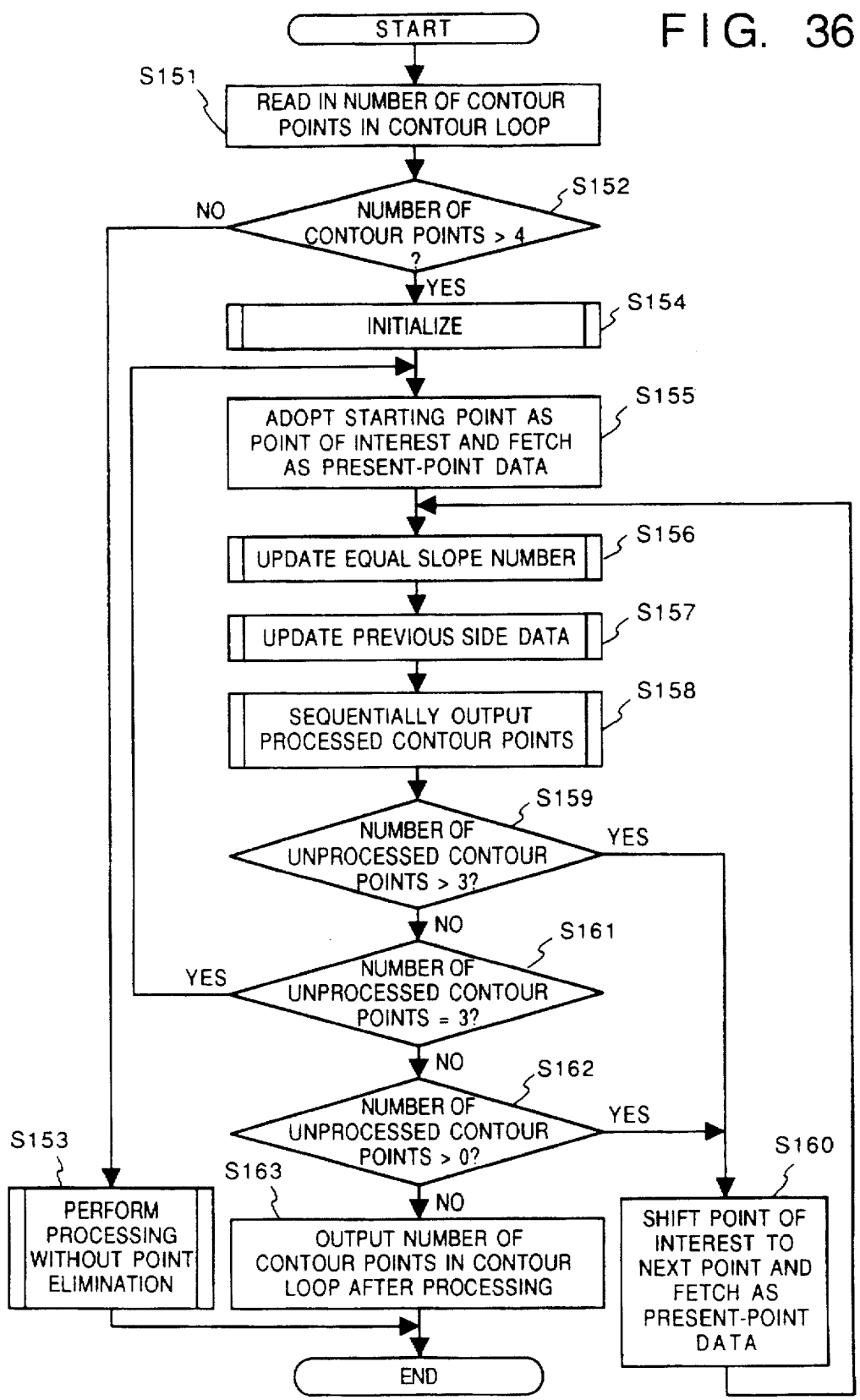
FIG. 36 is a flowchart illustrating the flow of processing for sensing and eliminating continuous vectors having the same orientation with regard to one contour loop.

The details of the processing of step S123 for sensing and eliminating continuous vectors having the sample orientation are illustrated in FIG. 36. The processing for sensing and eliminating continuous vectors is performed upon entering the data that has been subjected to first smoothing. More specifically, contour-point data that has been subjected to processing for sensing and eliminating continuous vectors is outputted upon entering the number of closed loops, the number of contour points of each closed loop, a coordinate data string of contour points, which have been subjected to first smoothing, of each closed loop, and an additional-information data string of contour points, which have been subjected to first smoothing, of each closed loop. As shown in FIG. 25, the contour data that has been subjected to processing for sensing and eliminating continuous vectors is composed of the number of closed loops, a table of the number of contour points of each closed loop and a coordinate data string of contour points, which have been subjected to processing for sensing and eliminating continuous vectors, of each closed loop.

The processing for sensing and eliminating continuous vectors is executed in contour-loop units, just as in first smoothing, and processing proceeds from one contour point to the next in each closed loop.

The description will be given with reference to the flowchart of FIG. 36. Since the flowchart of FIG. 36 describes the contents of processing of one closed-loop portion, processing proceeds while repeating the flow of FIG. 36 a number of times corresponding to the number of closed loops contained in input data that has been subjected to first smoothing.

Figure 41:
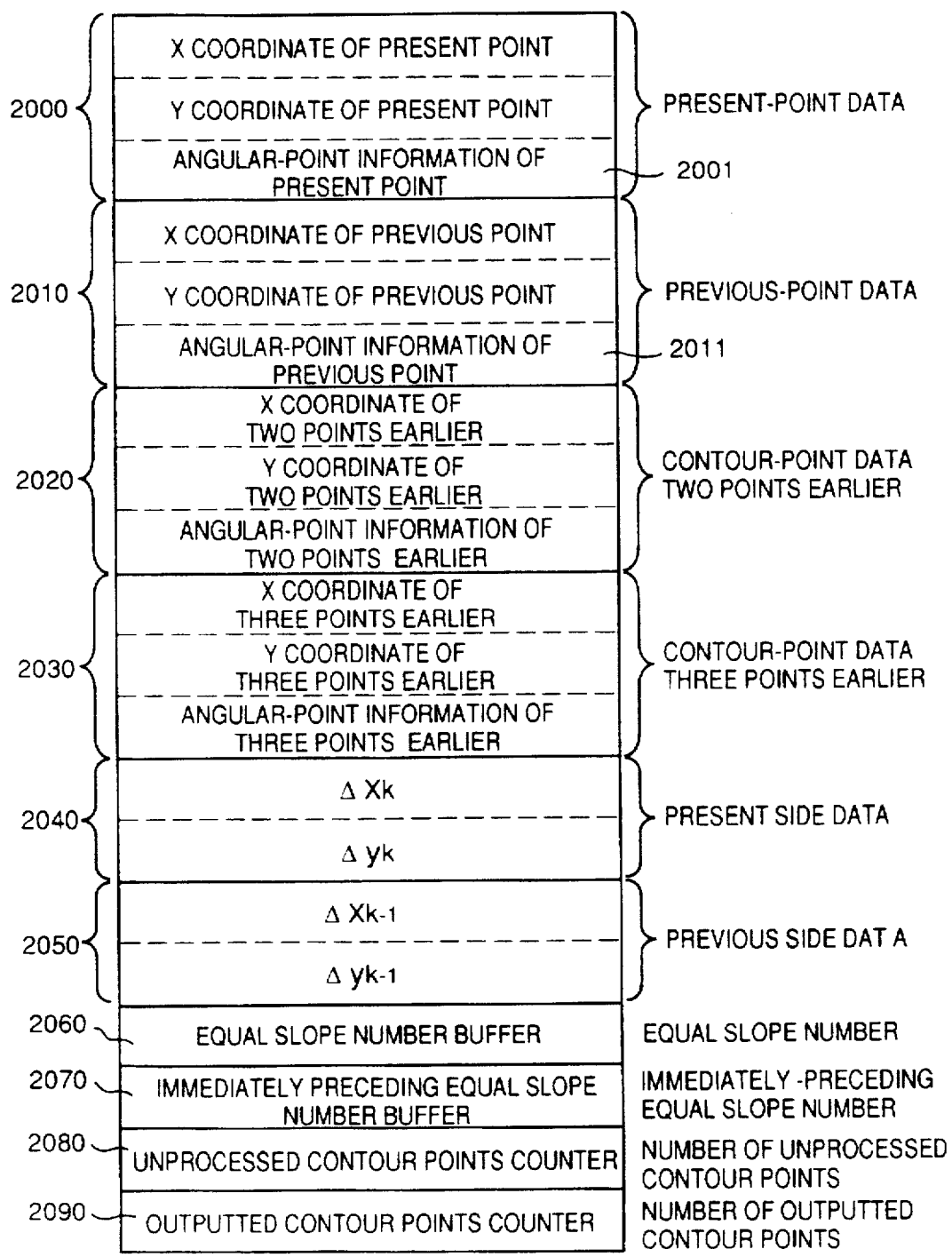
FIG. 41 is a diagram showing the contents of a work area needed in processing for sensing and eliminating continuous vectors having the same orientation.

At step S151, the CPU 71 reads in the number of contour points of a contour loop of interest from the RAM 76 and stores the number of points in a working area 2080 of the RAM 76 shown in FIG. 41. Next, at step S152, the CPU 71 determines whether the number of contour points within a contour loop is greater than 4. If the answer is YES, then the program proceeds to step S154. If the answer is NO, the program proceeds to step S153. If there are four contour points, this signifies a rectangle and means that vectors having the same orientation do not exist. Accordingly, at step S153, it is construed that a contour point to be eliminated does not reside on the contour-vector loop currently being processed, all contour-point data is outputted as is with regard to the loop of interest, and processing regarding this contour loop is terminated.

When the program proceeds to step S154, initialization necessary for advancing the processing of a series of contour points on the contour loop is performed. The details of this processing will be described with reference to FIG. 37.

In the initializing routine shown in FIG. 37, an initial value of 5 is set (step S201) in an area 2060 (available in the RAM 76 and referred to as an equal-slope buffer hereinafter) (FIG. 41) for holding an equal-slope number, which indicates the condition of connectivity of contour vectors having equal slopes.

Though the meaning of the equal-slope number will be apparent from the description given below, suffice it to say that this is a number for counting how many vectors having the same slope are contiguous.

At step S202, contour-point data three points ahead of the starting point in this loop are fetched as previous-point data. More specifically, let the loop of interest be an i-th loop, and Li represent the total contour points in the loop. Data $x_iL_{i-2}$, $y_iL_{i-2}$ and the angular-point information thereof (information indicating whether a point is an angular point or not) are copied to a starting-point data storage area in an area 2000 shown in FIG. 41. At step S203, data $x_{iL_{i-1}}$, $y_{iL_{i-1}}$ of an $L_{i-1}$-th vertex and the angular-point information thereof are similarly copied to the starting-point data storage area 2000. In this manner preliminary preparations for reading out the two immediately preceding items of contour data, which are referred to in order to perform processing with regard to the first contour point, are carried out.

At step S204, present-side-slope data $\Delta x_k$, $\Delta y_k$ is generated by performing the calculations indicated by the equations $$\Delta x_k = x_k - x_{k-1}$$

$$\Delta y_k = y_k - y_{k-1} \qquad (2)$$

from the coordinates of a vertex in a previous-point-data storage area 2010 (the coordinates are expressed by $x_{k-1}$, $y_{k-1}$ for the sake of convenience, and therefore we have $x_{k-1} = x_i L_{i-1}$ and $y_{k-1} = y_i L_{i-1}$) and the coordinates of a vertex in a starting-point data storage area 2000 (the coordinates are expressed by $x_k$, $y_k$ for the sake of convenience, and therefore we have $x_k = x_i L_i$ and $y_k = y_i L_i$). The data $\Delta x_k$, $\Delta y_k$ is held in a present-side-data storage area 2040 in FIG. 41.

At step S205, the present-side data is taken and made the previous-side data, thereby updating the previous-side data.

The details of this processing will be described with reference to the flowchart of FIG. 38.

Figure 38:
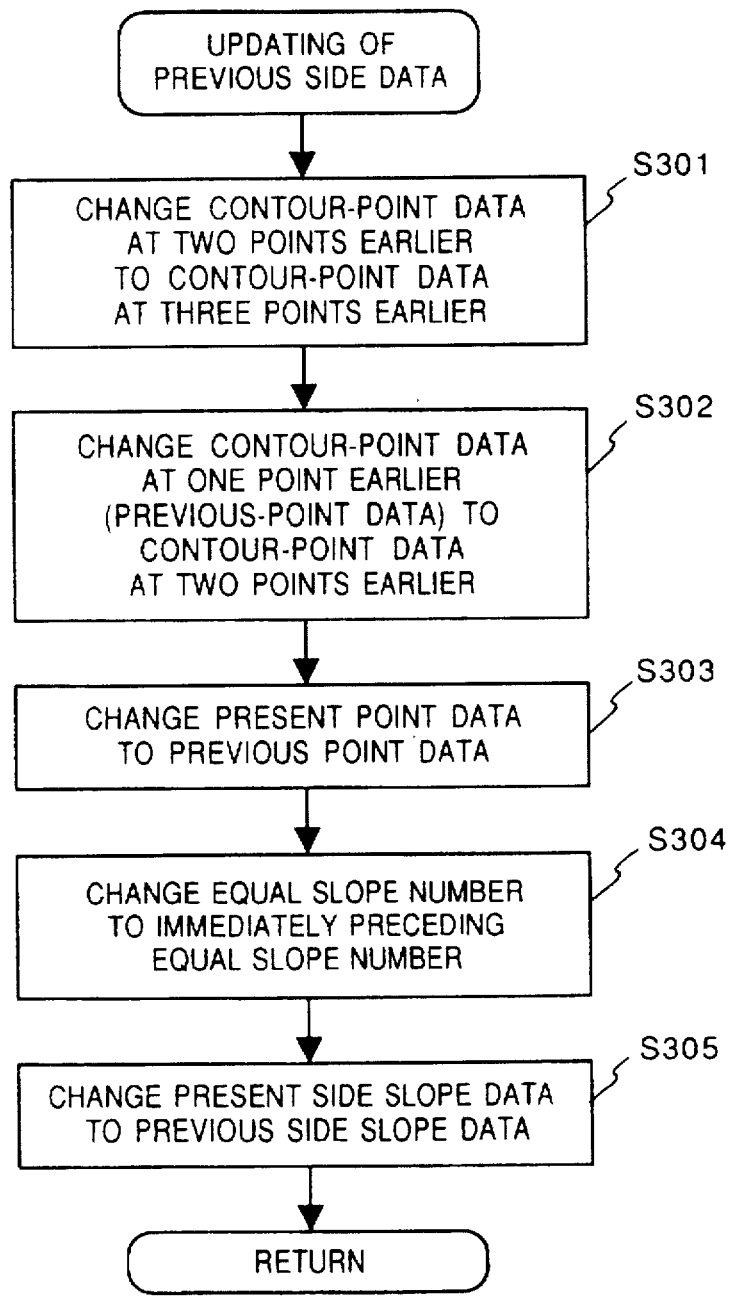
FIG. 38 is a flowchart illustrating in detail the flow of processing for sensing and eliminating continuous vectors having the same orientation with regard to one contour loop.

At step S301 in FIG. 38, with regard to a present point 2020 secured in RAM 76 of FIG. 41, the contents of the area holding the coordinates of a contour point two points earlier as well as angular-point data on the contour loop are similarly copied to an area holding the data of a contour point three contour points earlier illustrated in area 2030 of FIG. 41. At step S302, the contents of the storage area 2010 for the previous-point data are copied to the data area 2020 for the contour point that prevailed two points earlier. The contents of the present-point-data storage area 2000 are copied to the previous-point-data storage area 2010 at step S303. Next, at step 304, the contents of the equal-slope number buffer 2060 are copied to an immediately-preceding equal-slope number buffer secured in a temporary storage area of the RAM 76 shown at 2070 in FIG. 41. This is followed by step S305, at which the contents held in the present-side-data storage area 2040 are copied to the previous-side-data storage area in the RAM 76 shown at 2050 in FIG. 41, the series of processing steps for updating previous-side data is terminated and a return is effected to the main routine. In other words, the contour data is shifted one item of data at a time.

When the previous-side data is updated at step S205, the program proceeds to step S206. At step S206, the data $x_iL_i$, $y_iL_i$ of the $L_i$-th vertex and the angular-point information thereof are read in, just as at steps S202 and S203, and this is copied to the present-point-data area indicated at 2000 in FIG. 41. The equal-slope number is updated at step S207. The contents of this processing will be described in detail with reference to the flowchart illustrated in FIG. 39.

Figure 39:
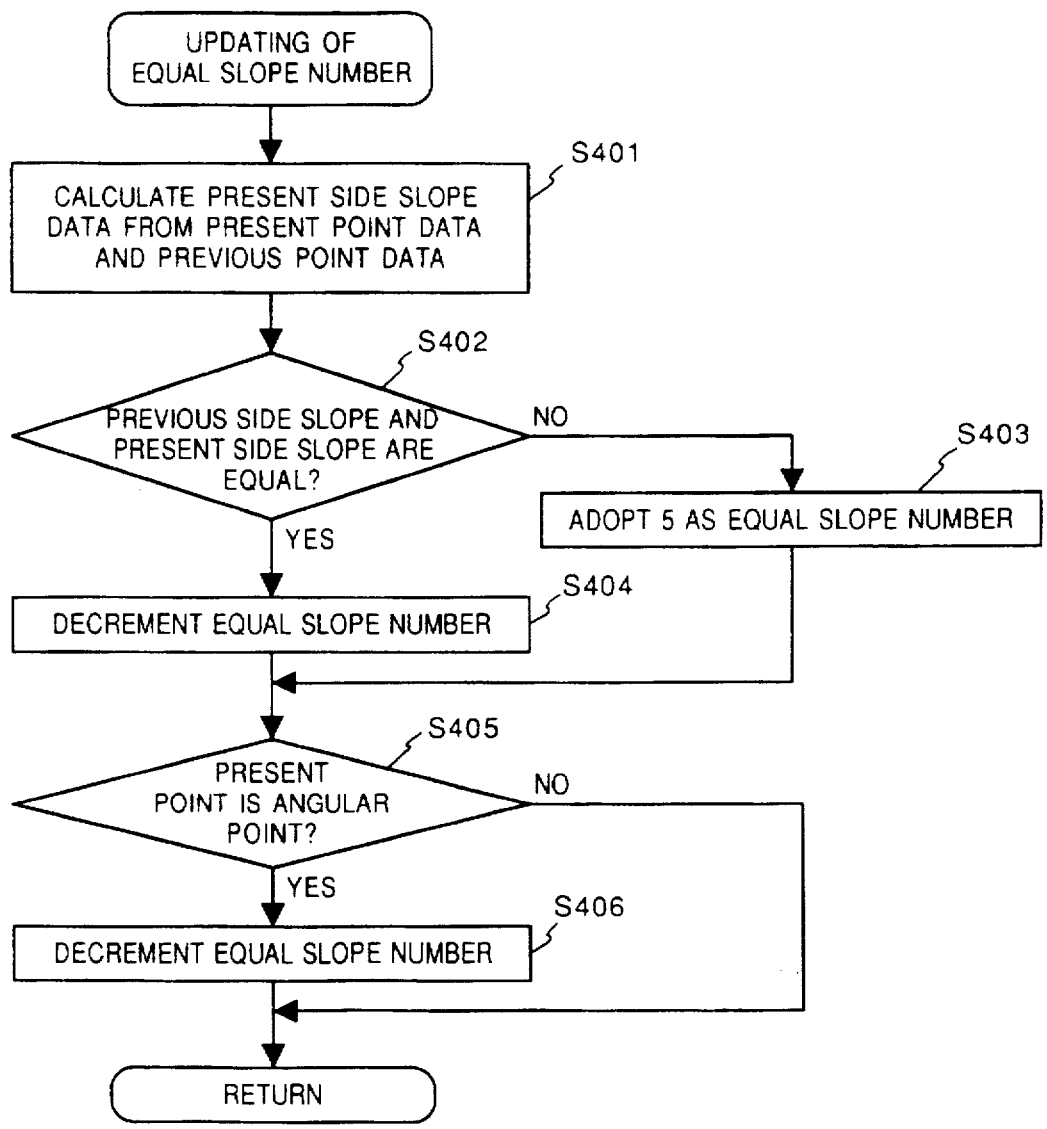
FIG. 39 is a flowchart illustrating in detail the flow of processing for sensing and eliminating continuous vectors having the same orientation with regard to one contour loop.

At step S401 in FIG. 39, present-side-slope data is calculated from the present-point data and previous-point data in accordance with Equation (2) in the same manner as at step S204, and the calculated data is stored in the present-side-data storage area 2040 of RAM 76 shown in FIG. 41. At step S402, whether or not the present-side data and previous-side data held respectively in the areas 2040 and 2050 in RAM 76 are equal is performed in the manner of Equation (1), i.e., it is determined whether $$\Delta x_{k-1} \times m = \Delta x_k \qquad (3)$$

$$\Delta y_{k-1} \times m = \Delta y_k$$

(where m is a real number). In a case where Equation (3) holds, it is judged that the slope of the present side and the slope of the previous side are equal and the program proceeds to step S404. In a case where Equation (3) does not hold, it is judged that the slopes are not equal and the program proceeds to step S403.

At step S403, the equal-slope number is returned to 5 and the program returns to step S405. Next, at step S404, the equal-slope number is rewritten as a value obtained by subtracting 1 from the value at this moment. This is followed by step S405, at which it is determined whether the present point is an angular point by referring to the area 2001 storing the angular-point information of the present point in FIG. 41. In case of an angular point, the program proceeds to step S406. In case of a non-angular point, a return is effected directly to the main routine. Next, at step S406, the equal-slope number is rewritten as a value obtained by subtracting 1 from the value at this moment.

In the routine of FIG. 39 described above, the equal-slope number is reduced by 1 if the slopes of the previous side and present side are equal. The equal-slope number is reset to 5 if the slopes of the previous side and present side are different. Moreover, if the present point is an angular point, 1 is subtracted again.

Figure 37:
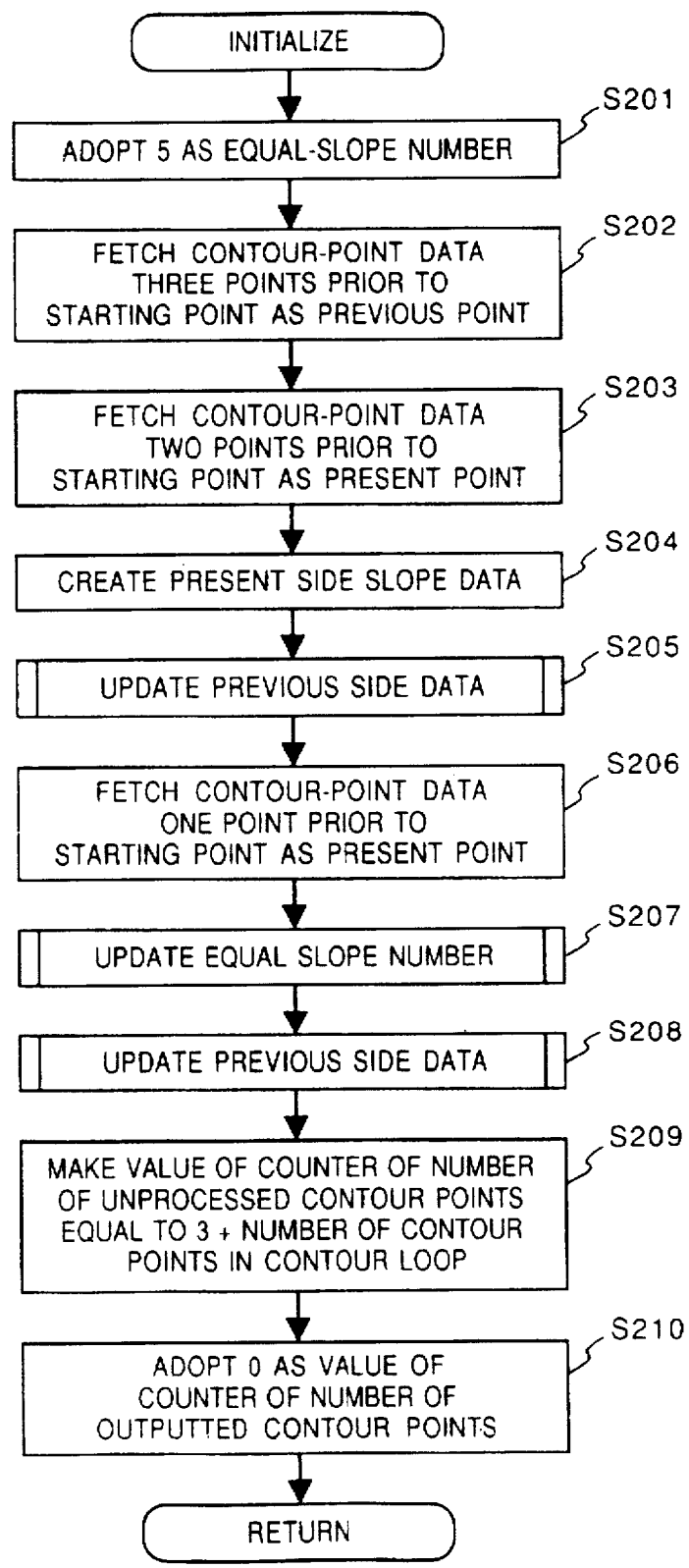
FIG. 37 is a flowchart illustrating in detail the flow of processing for sensing and eliminating continuous vectors having the same orientation with regard to one contour loop.

When the equal-slope number is updated at step S207 in FIG. 37, the program proceeds to step S208. At this step, the routine illustrated in FIG. 38 is called in the same manner as at step S205, whereby the present-side data at this time is taken and made the previous-side data, thereby updating the previous-side data. The program then proceeds to step S209, at which the value of an unprocessed contour-point number counter 2080 in FIG. 41 is initialized based upon a value obtained by adding 3 to the number of contour points in the contour loop. This results from the fact that in this embodiment, reference is made to neighboring contour points which are three points earlier before and after the contour point of interest. Next, at step S210, the value of a counter 2090 (FIG. 41) for counting the number of contour points already outputted is initialized to 0, the series of processing steps for initialization described above is terminated and a return is effected to the main routine.

The processing of step S154 in FIG. 36 is concluded.

Next, the program proceeds to step S155. Here a starting point (first point) on a contour loop is adopted as a point of interest, and coordinate values xi, yi and angular-point information are copied in the present-point-data area 2000 in FIG. 41. At step S156, the equal-slope number updating routine described in FIG. 39 is called and it is determined whether the slopes of the previous side and present side are equal. If they are equal, the equal-slope number is reduced by 2 or 1 in dependence upon whether the present point is an angular point or not, respectively. If they are unequal, the equal-slope number is reset to 4 or 5 in dependence upon whether the present point is an angular point or not, respectively. At step S157, the previous-side data updating routine described in FIG. 38 is called and the present-side data at this point is time is taken as the previous-side data to update the previous-side data. The program then proceeds to step S158, at which the already processed contour points are sequentially outputted. The contents of this processing will be described in detail with reference to the flowchart of FIG. 40.

Figure 40:
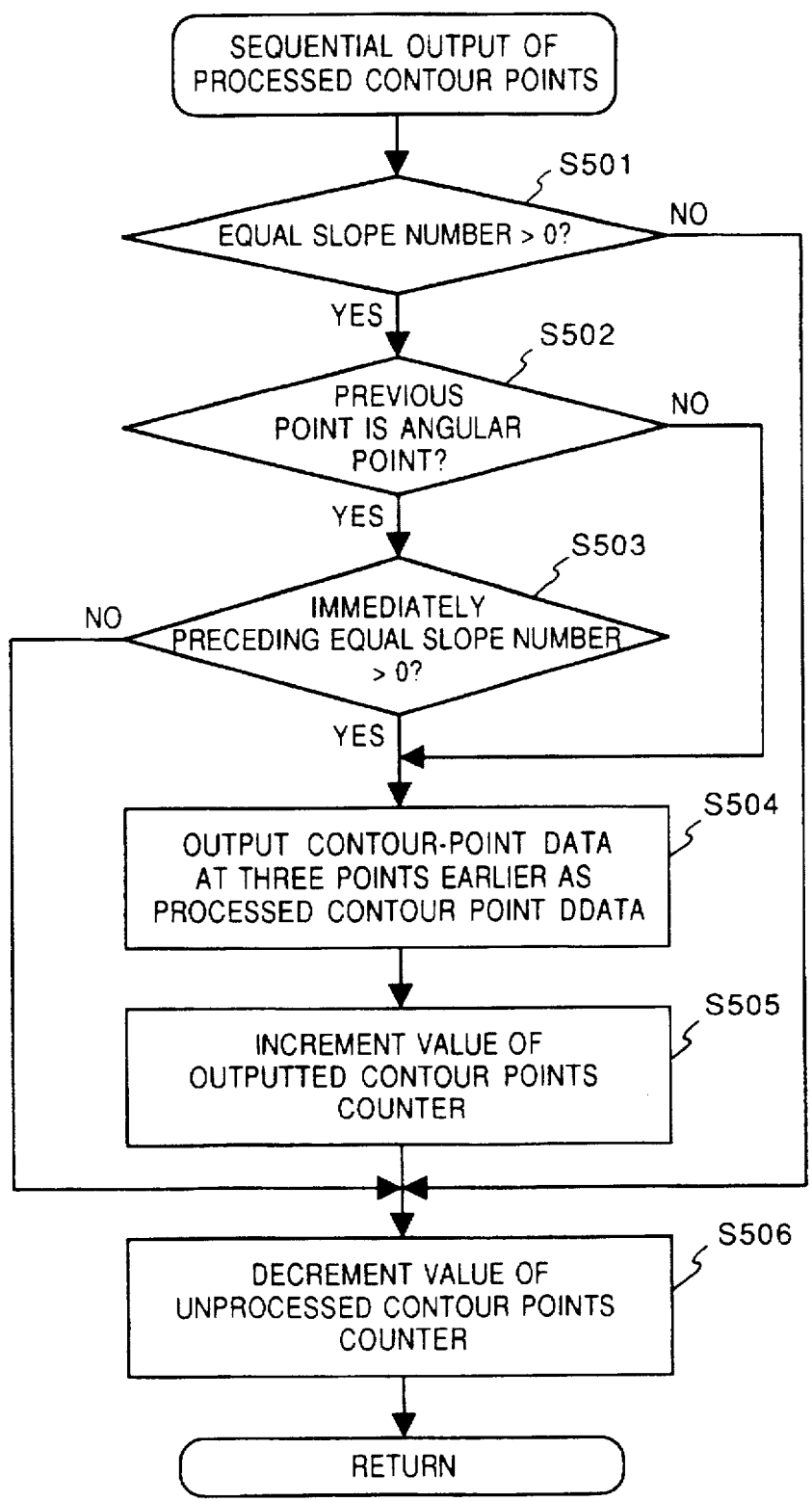
FIG. 40 is a flowchart illustrating in detail the flow of processing for sensing and eliminating continuous vectors having the same orientation with regard to one contour loop.

At step S501 in FIG. 40, it is determined whether the equal-slope number held in the equal-slope number buffer 2060 in FIG. 41 is positive or not. The program proceeds to step S502 if it is positive and to step S506 if it is not positive. Next, at step S502, it is determined whether the previous point is an angular point by referring to the angular-point information 2011 of the previous point in FIG. 27. The program proceeds to step S503 if the previous point is an angular point and to step S504 if it is no an angular point. It is determined at step S503 whether the immediately preceding equal-slope number held in the immediately-preceding equal-slope number buffer 2070 is positive or not. The program proceeds to step S504 if it is positive and to step S506 if it is not positive. The contour-point data 2030 prevailing three points earlier in FIG. 41 is outputted as processed contour-point data at step S504. The value of the number of contour points already outputted held in the counter 2090 in FIG. 41 is incremented by 1. At step S506, the number of unprocessed contour points held in the unprocessed contour-point number counter 2080 in FIG. 41 is decremented by 1 and a return is effected to the main routine.

In the routine of FIG. 40 described above, a case in which the equal-slope number is 0 or negative at the prevailing point in time means that even if a contour point is eliminated, the shapes obtained after subsequent smoothing will be equal, in comparison with the case in which the contour point is not eliminated. Accordingly, the contour-point data three points ahead of the point of interest (present point) is not outputted. In other words, this data is eliminated.

In the equal-slope number at the prevailing point in time is positive, this is not judged and the contour-point data three points earlier than the point of interest (the present point) is outputted as one point of contour points after the processing for sensing and eliminating continuous vectors having the same direction. However, even in this case, if the equal-slope number is 0 or negative at a point in time when the point preceding the point of interest is an angular point and, moreover, this previous point is a point of interest (i.e., at a point in time prevailing one point earlier), a point two points prior to this angular point, namely a point three points prior to the present point, is judged to be a contour point capable of being eliminated and no output is produced.

When the processing of step S158 is concluded, the program proceeds to step S159, at which it is determined whether the value of the unprocessed contour-point number 2080 in FIG. 41 is greater than 3. The program proceeds to step S160 if it is greater (i.e., if the point of interest still is not the final point on the contour loop), and to step S161 if it is not greater. At step S160, the point of interest is moved to the next point on the contour loop, this point is adopted as the present point, the coordinate values thereof and the angular-point information are copied to the present-point data area 2000 in FIG. 41 and the program returns to step S156. At step S161, it is determined whether the value of the unprocessed contour-point number 2080 is 3 or not. The program returns to step S155 if this value is 3 (i.e., if the point of interest is exactly the final point on the contour loop) and proceeds to step SS162 if this value is not 3. It is determined at step S162 whether the value of the unprocessed contour-point number is positive or not. If it is positive, it is judged that the point three points prior to the present point is still not the final point on the contour loop and the program proceeds to step S160. If the value is not positive (i.e., if it is 0), the program proceeds to step S163. At step S163, the scrutiny of all contour points on the contour loop ends, the value of area 2090 in FIG. 41 is outputted as the number of contour points outputted as contour points on a contour loop after processing, and the series of processing steps for one contour loop is concluded.

Thus, the processing for sensing and calculating continuous vectors having the same orientation of step S123 is concluded. The results of processing are stored in RAM 76. In this processing, the number of loops and the number of contour points do not increase. Therefore, if the arrangement is such that data from the starting point to the third point of each loop is temporarily saved in a temporary area, the data of first smoothing is itself capable of being made a data area that has been subjected to the present processing.

Next, the CPU 72 performs the second smoothing of step S124 and performs the output of smoothed data of step S125. The details of these processing steps are as described in Example 1 and need not be described again.

Thus, the second example of the outline (vector sensing/elimination) smoothing and zooming unit 4 is realized.

The fact that the equal-slope number is reset to 5 at step S201 or S403 is a result of the fact that when sides having the same slope continue over the next five sides after the slopes of the previous side and present side change, the center point among the seven points constituting the six sides can be eliminated. If a point is an angular point, the fact that the equal-slope number is reduced by one extra results from the above-mentioned consideration, namely that the number of times sides having the same slope are connected may be reduced.

(Other Examples)

In a case where contour points to be eliminated have not been eliminated even after having been subjected to subsequent second smoothing, in the foregoing embodiment the points are eliminated upon satisfying conditions that become the same as those of the contour shape obtained by second smoothing.

However, in a case where the enlargement magnification is not that great, cases are possible in actual practice in which it will not matter even if some difference in contour shape is allowed. In such case, the value to which the equal-slope number is reset is made not 5 but a smaller number such as 4 or 3 at steps S201 and S403 in the foregoing embodiment, thus making it possible to eliminate more contour points by allowing a slight change in the contour shape. When, if the equal-slope number is set to 4, sides having the same slope over four sides subsequently continue for more than four sides after the slopes of the previous point and present point change, the third point from the side of the starting point among the six points constituting the five sides can be eliminated. If the equal-slope number is set to 3, the point outputted at step S504 is made contour-point data that prevails two points earlier. As a result, when sides having the same slope over three sides subsequently continue for more than three sides after the slopes of the previous point and present point change, the center point among the five points constituting the four sides can be eliminated.

Similarly, it is possible to set the equal-slope number to 2 or 1 and to make the outputted point the contour data prevailing one point earlier, thereby greatly increasing the eliminated points. With regard to contour-point data three points earlier that do not require reference in these cases, the steps relating thereto may be eliminated as a matter of course.

In another example, with regard to contour points between two different angular points, if the slopes of side vectors present between these angular points are all equal, the contour points between these angular points can be eliminated, without causing a change in the contour shape, even if the contour points are subjected to subsequent second smoothing, irrespective of the fact that a number of sides are continuous and there are side vectors of equal slope.

It is determined, for each and every contour loop, whether side vectors between angular points all have equal slopes. If they do, processing may be added to eliminate all contour points present between the angular points. In such case, it is possible to eliminate more contour points than in the foregoing embodiment without causing a change in the contour shape.

In the foregoing, extra contour points are eliminated between first smoothing and second smoothing. However, the invention is not limited to this arrangement.

More specifically, it is permissible to perform the processing for sensing and eliminating continuous vectors having the same orientation after second smoothing.

In this case, irrespective of whether a point is an angular point and a number of sides having equal slopes are connected, if two sides having equal slopes are connected, it is possible to eliminate the point intermediate these two sides. Means for sensing, eliminating, smoothing and zooming outline vectors can be realized by simple processing. On the other hand, the number of contour points that are subjected to second smoothing processing are not reduced. As a consequence, there is no change in the amount of processing at the time of second smoothing.

The outline (vector sensing/elimination) smoothing and zooming is capable of being implemented prior to first smoothing or during first smoothing.

For example, in first smoothing, as described earlier, contour-side vectors (horizontal or vertical vectors) of each item of coarse-contour data are taken as vectors of interest one after another. With regard to each contour-side vector of interest, patterns are divided by combinations of length and orientation of mutually continuous side vectors up to at most three vectors before and after each side of interest (i.e., three vectors before the side of interest, the side of interest itself and three sides after the side of interest, for a total of seven side vectors), and a contour point after first smoothing, which becomes the result of first smoothing with regard to the side of interest, is defined for each case.

Figure 42:
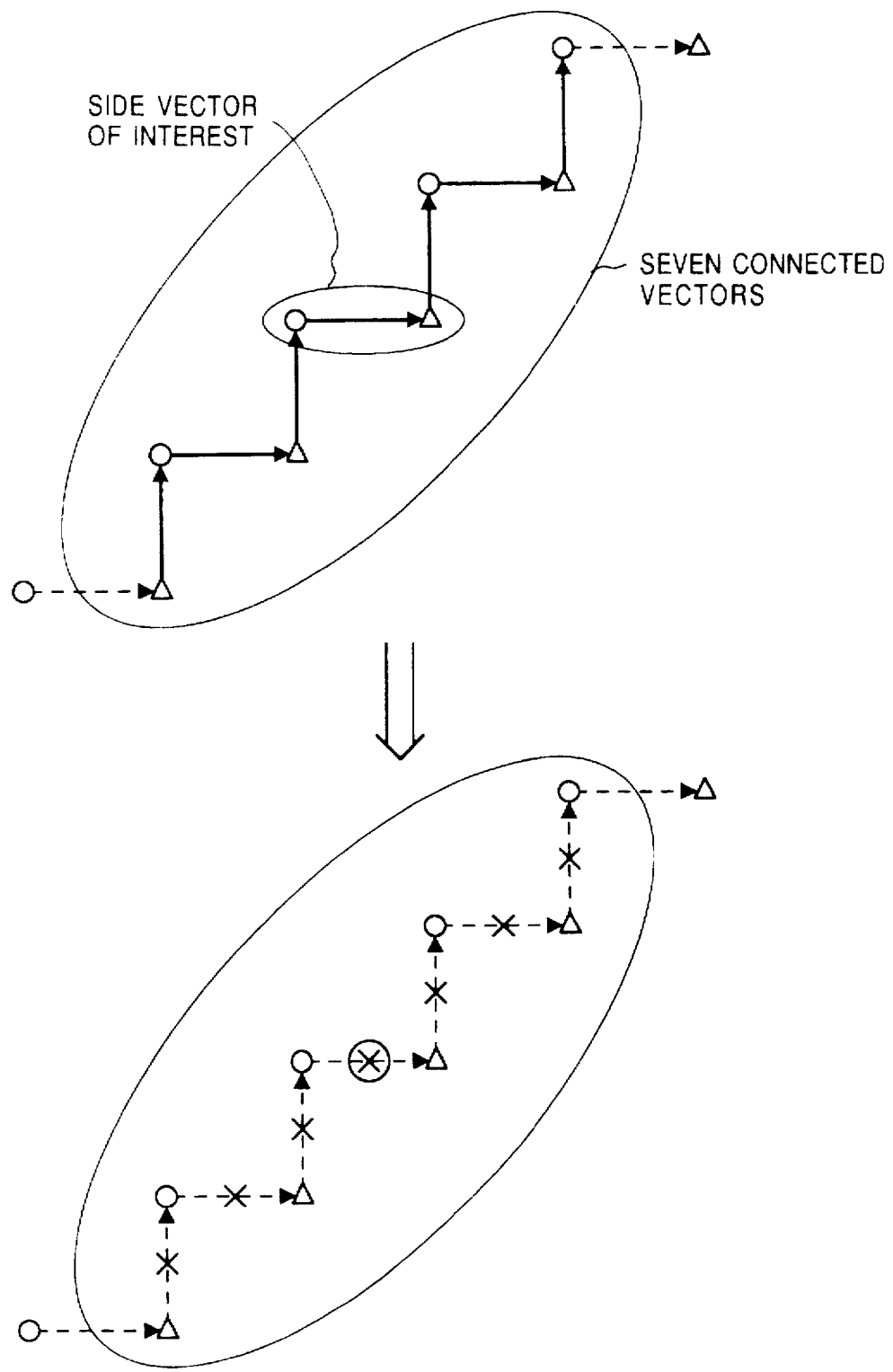
FIG. 42 is a diagram showing another example of a contour vector that is the object of elimination.
Figure 43:
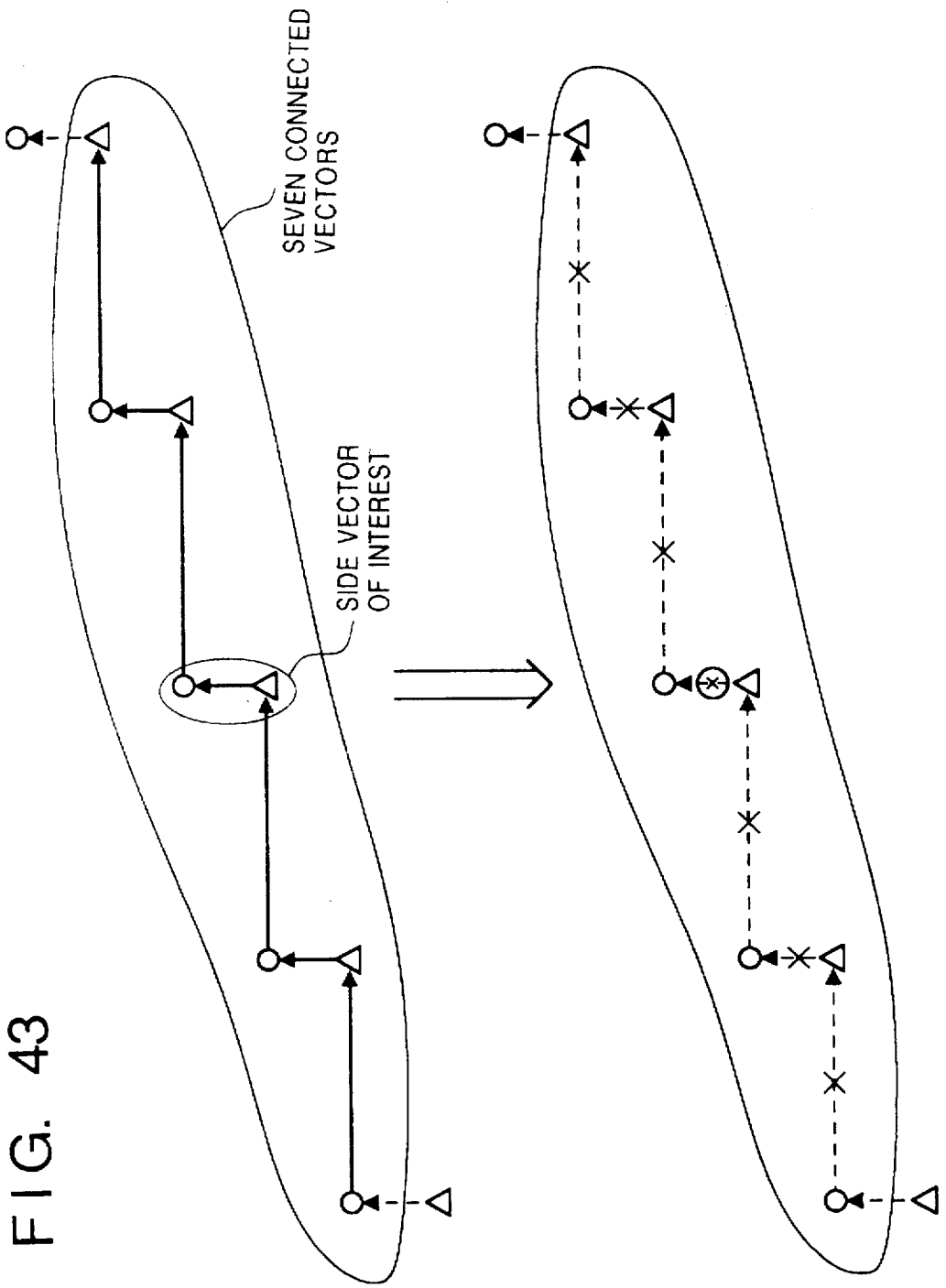
FIG. 43 is a diagram showing another example of a contour vector that is the object of elimination.
Figure 44:
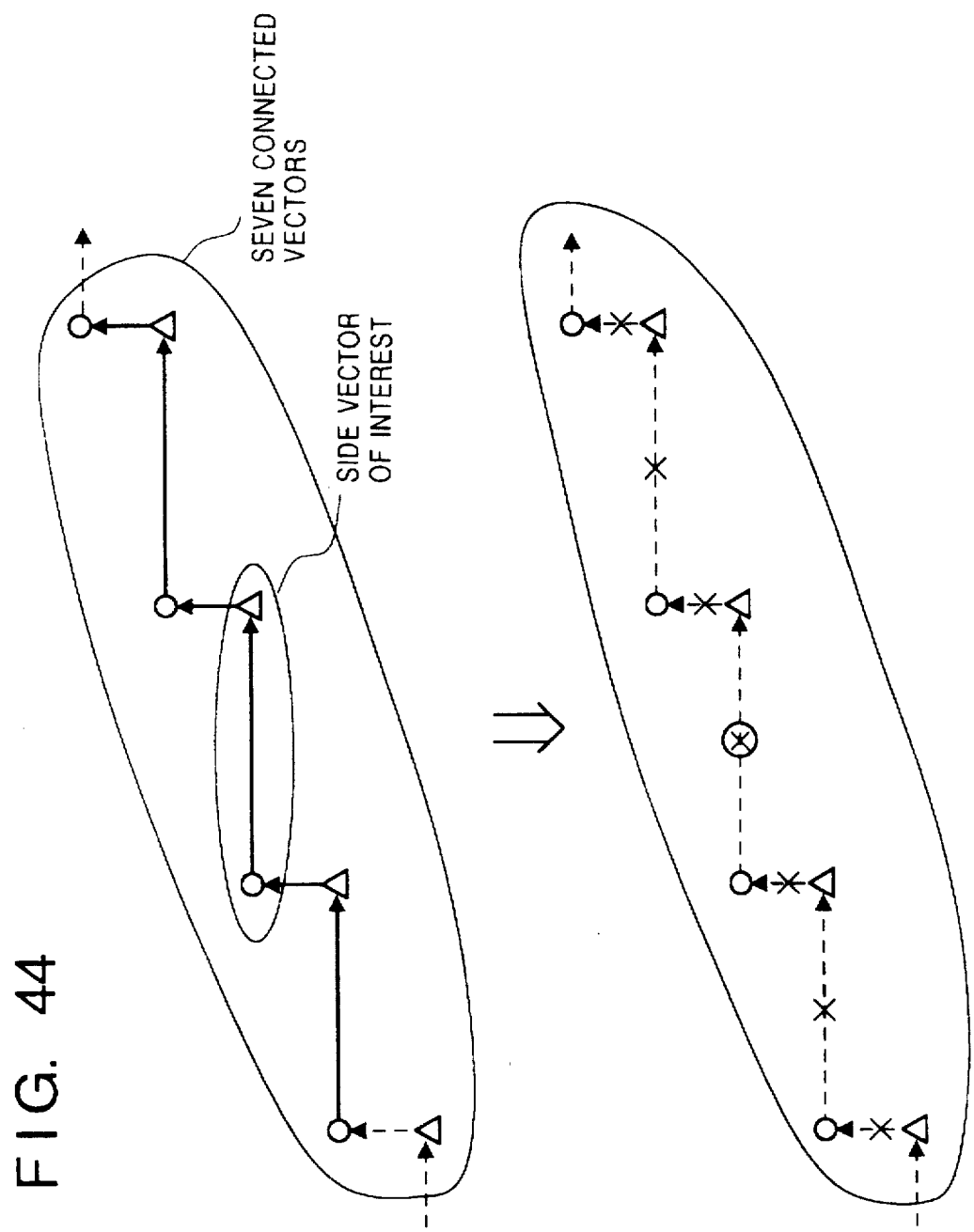
FIG. 44 is a diagram showing another example of a contour vector that is the object of elimination.

In a combination of lengths and orientations of seven mutually continuous contour-side vectors, contour points after first smoothing are seven continuous contour points described in the foregoing embodiment, as illustrated in FIGS. 43 and 44, and it is evident that there are six side vectors formed thereby all of which have the same slope. In other words FIG. 42 shows a case in which the length of the side vector of interest is 1 or 2, three sides before and after this side all have lengths equal to the side vector of interest, the orientations of side vectors two sides before and two sides after the side vector of interest have orientations equal to the orientation thereof and the orientations of vectors three sides before and three sides after the side vector of interest have orientations equal to the orientation thereof. FIG. 43 shows a case in which the length of the side vector of interest is 1, the lengths and orientations of sides vectors two sides before and two sides after are equal to those of the side of interest, the side vectors of the sides before and after have lengths and orientations that are equal to each other and the side vectors of the sides three sides before and three sides after have lengths and orientations that are equal to one another. FIG. 44 shows a case in which the length and orientation of the side vector of interest are equal to those of the side vector two sides before and two sides after, and the lengths of all side vectors of the sides before and after as well as the sides three sides before and three sides after are 1 and the orientations thereof are equal. In a case where these sensors have been sensed, an arrangement may be adopted in which contour points of first smoothing are not defined. That is, an arrangement may be adopted in which processing is advanced upon construing that contour points after first smoothing with respect to the side vector of interest have been eliminated in advance.

Figure 45:
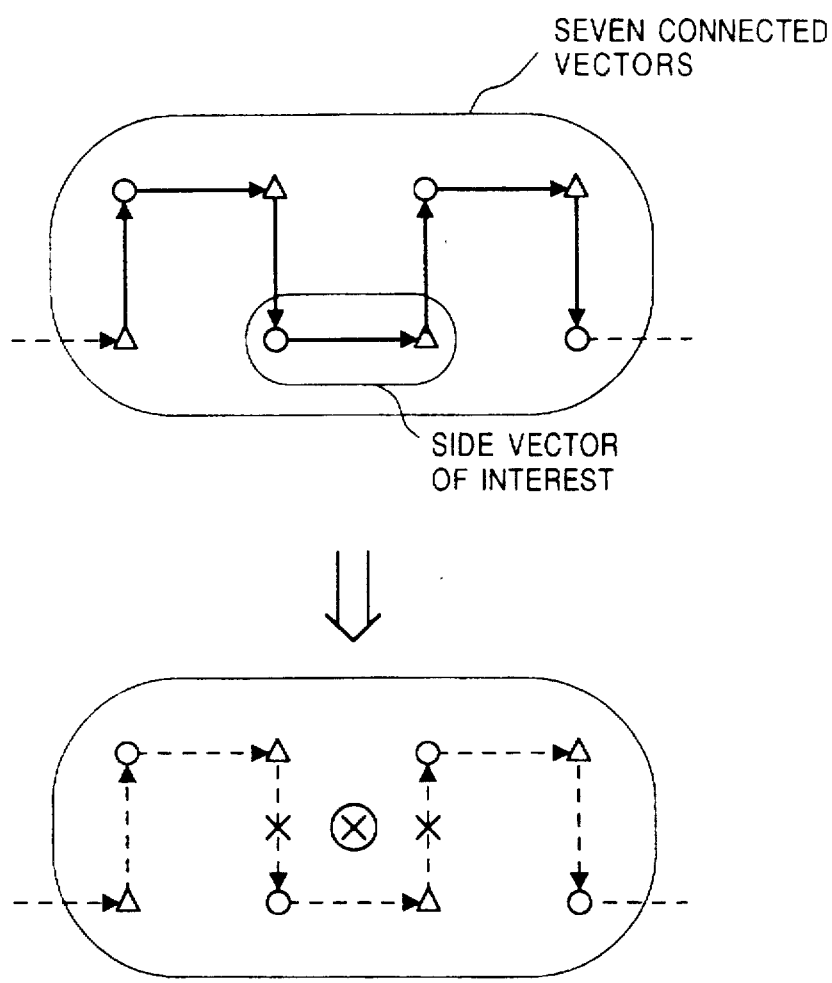
FIG. 45 is a diagram showing another example of a contour vector that is the object of elimination.
Figure 46:
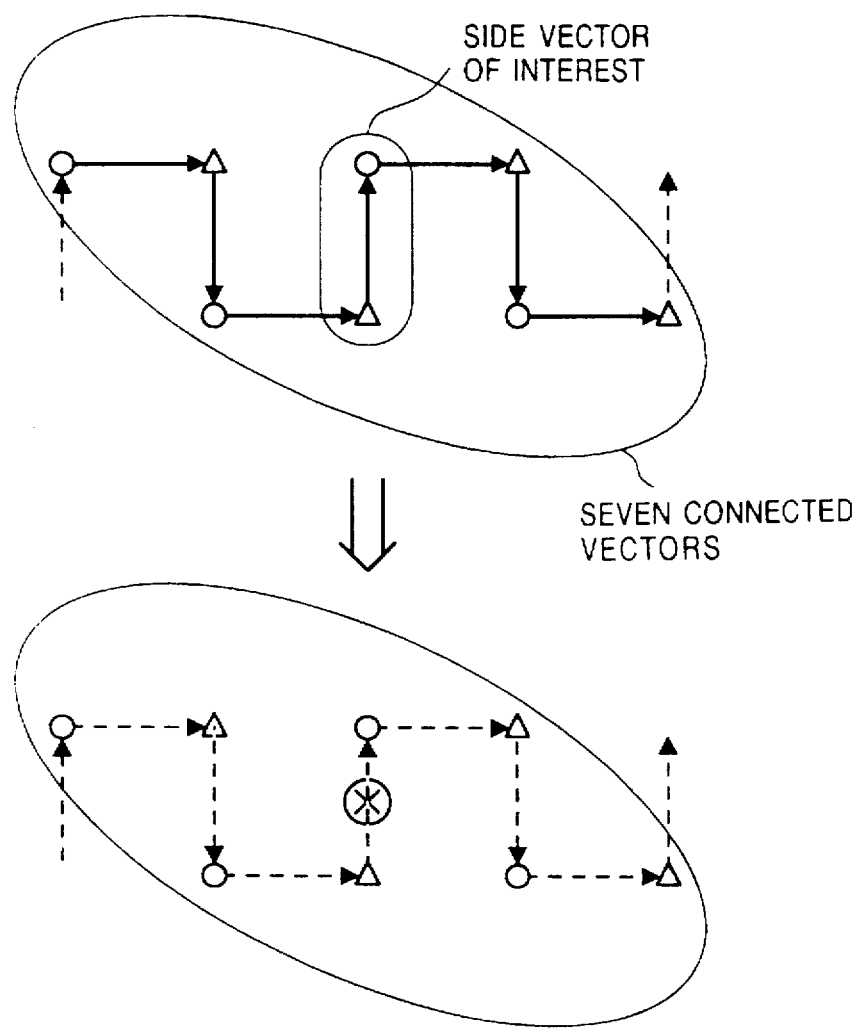
FIG. 46 is a diagram showing another example of a contour vector that is the object of elimination.

In this case also, if some difference in contour shape caused by subsequent processing between a case in which contour points are eliminated and a case in which contour points are not eliminated is allowed, then, in a pattern illustrated in FIG. 45 or 46, for example, elimination of contour points (not defining the contour points) at this time after first smoothing with respect to the side vector of interest is effective. FIG. 45 illustrates a case where the lengths of seven vectors are all 1, the orientations of side vectors two sides before and two sides after the side of interest are equal to that of the side vector of interest, the orientations of the preceding side and of the side three sides after are equal to that of the side vector of interest, and the orientations of the following side and that of the side three sides before are equal to that of the side vector of interest.

FIG. 46 illustrates a case where the lengths of seven vectors are all 1, the orientations of the side vectors two sides before and two sides after are both opposite that of the side vector of interest, and the orientations of the side vectors three sides before, one side before, one side after and three sides after are all equal.

Furthermore, if the number of neighboring sides referred to is not made up to three sides before and after but reference is made to a larger number of sides, it is possible to obtain a larger number of eliminated patterns.

In the description of the foregoing embodiment, the input of the outline (vector sensing/elimination) smoothing and zooming unit 4 is described as being from the binary-image acquisition unit, outline extracting unit or vector-data creating unit preceding it. However, the invention is not limited to this arrangement. For example, a similar contour vector extracted outside the apparatus may be obtained via a well-known interface realized by an I/O port or the like. Further, contour-vector data stored in the disk device beforehand by other means may be entered by a separate instruction at a later date via a disk I/O or the like.

The output of the outline (vector sensing/elimination) smoothing and zooming unit 4 is described as being applied to the binary-image reproducing unit. However, the invention is not limited to this arrangement. An output circuit may be employed to deliver the output externally of the apparatus via an interface in the format of the contour data or to store the output in a disk device.

As described above, continuous short vectors having the same slope are sensed from the outline extracting unit, (step) to the binary-image reproducing unit (step) in the prior-art examples described above, and means (a step) for connecting these short vectors is provided. By eliminating the number of vectors to be processed from this means (step) onward, the processing time needed for overall processing can be reduced.

Further, the cost of the apparatus can be reduced by reducing the memory capacity needed for processing.

In accordance with the embodiment described above, it is possible to greatly reduce the load of subsequent processing in a case where the contour points of an obtained binary image are delivered to the processing that follows.

(Binary-image reproducing unit, binary-image output unit)

On the basis of contour data after second smoothing transferred via the I/O, for example, the binary-image reproducing unit 5 outputs, in a raster scanning format, binary image data produced by painting an area surrounded by a vector figure expressed by this contour data. The outputted data in the raster scanning format is made visible by the binary-image output unit 6, such as a video printer.

Figure 12:
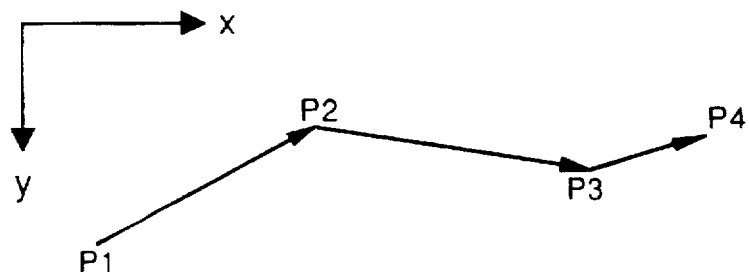
FIG. 12 is a diagram showing part of an outline vector.

In the binary-image reproducing unit 5, an outline vector is adopted as a contour line and an image in which one side of the contour line is painted in black is converted into data having a raster scanning format. To this end, three vectors are required, namely the vector of interest and the vectors immediately preceding it and following it. FIG. 12 illustrates part of a vector constituting an outline. As will be appreciated from FIG. 12, the coordinates of four points P1~P4 are required in the binary-image reproducing unit 5 using three continuous vectors. Therefore, an arrangement is adopted in which the binary-image reproducing unit 5 operates using registers (not shown) for holding the coordinates of these four points. In these four registers, the coordinates entered earliest among the coordinates of the four points are erased whenever the processing regarding the vector of interest ends. At the same time, new coordinates entered sequentially are stored and are used while successively updating the vector of interest. The processing performed by the binary-image reproducing unit 5 may a procedure that is already known. On the basis of raster data obtained by the binary-image reproducing unit 5, the binary-image output unit 6 presents a display on a CRT or causes a printout to be performed by a printer.

(Example of application to facsimile)

Figure 48:
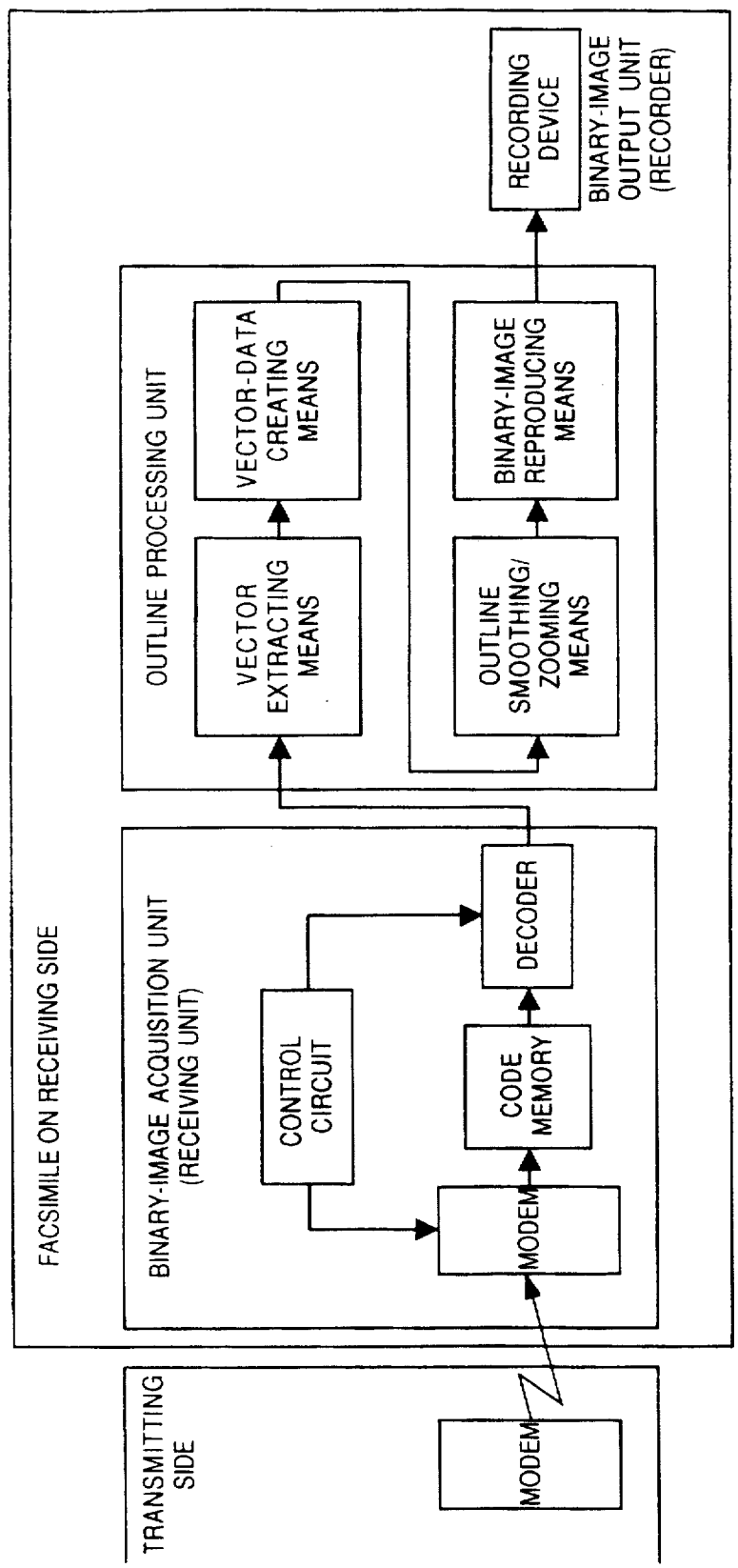
FIG. 48 is a block diagram showing a facsimile apparatus to which the image processing apparatus of this embodiment is applied.
Figure 49:
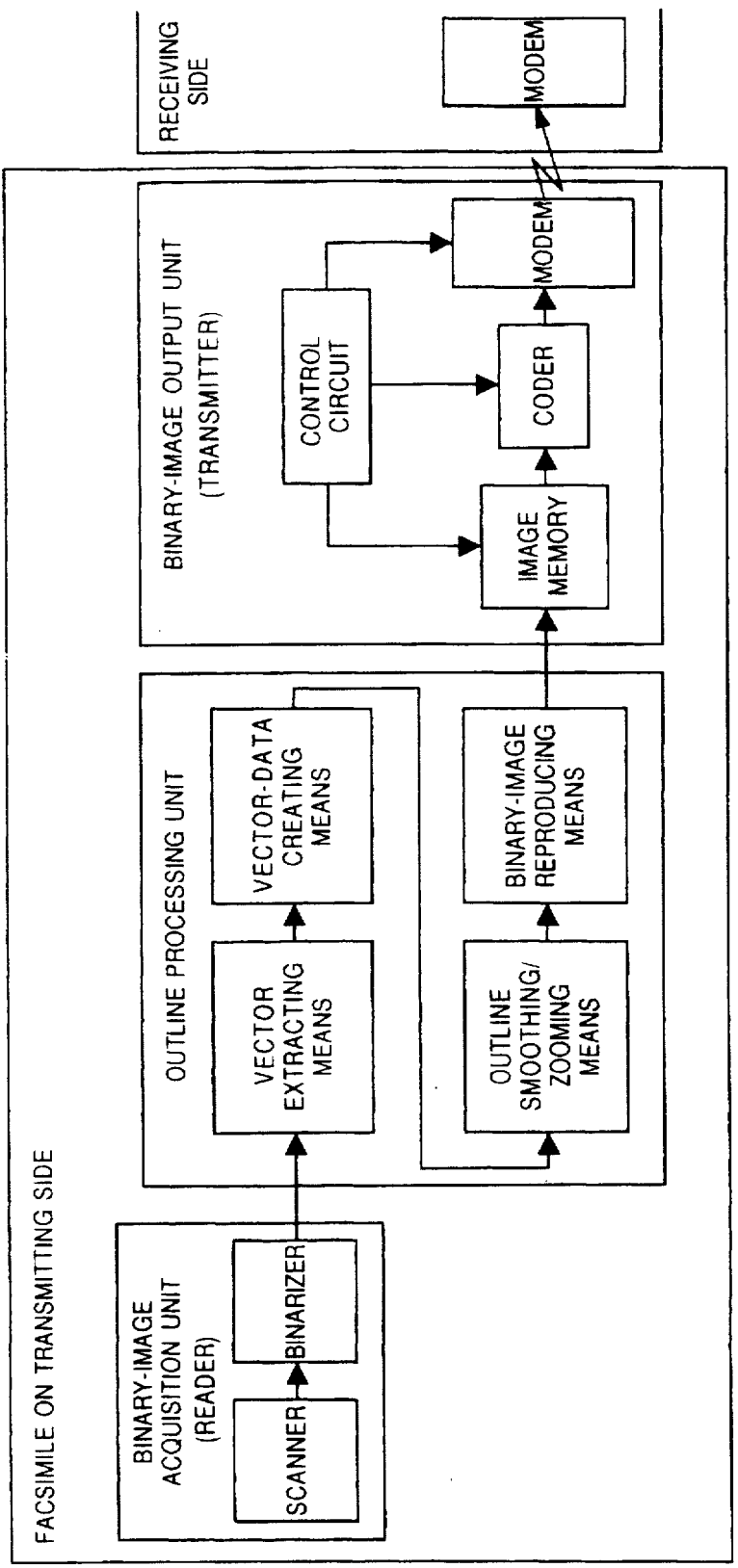
FIG. 49 is a block diagram showing a facsimile apparatus to which the image processing apparatus of this embodiment is applied.
Figure 50:
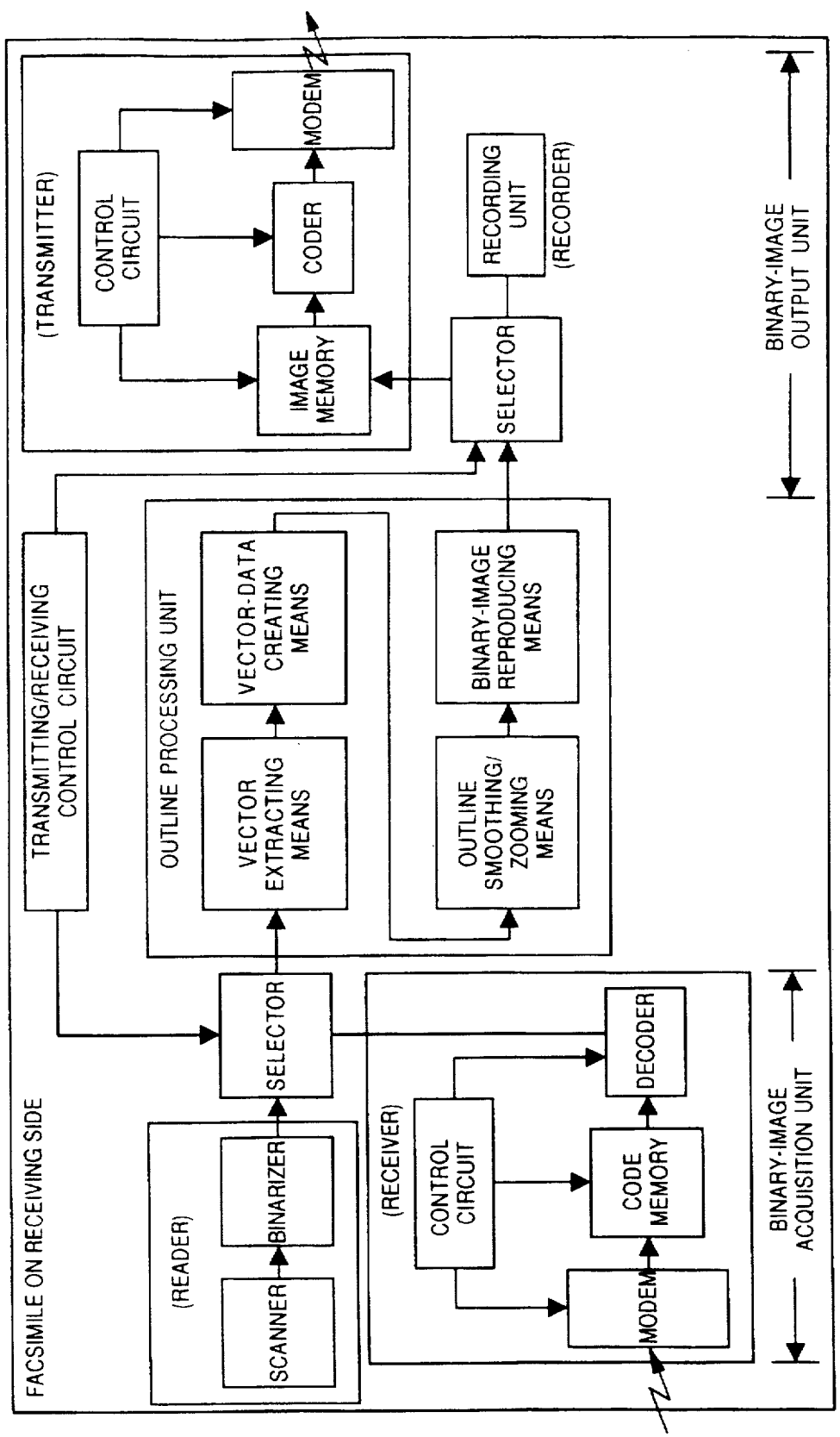
FIG. 50 is a block diagram showing a facsimile apparatus to which the image processing apparatus of this embodiment is applied.

FIGS. 48, 49 and 50 illustrate block diagrams for a case in which this embodiment is applied to a facsimile machine.

FIG. 48 is a block diagram showing this embodiment applied to a facsimile machine on a receiving side. Input binary-image data is created by decoding a transmitted code such an MH code, and outline processing is executed with regard to this data. The binary image reproduced by the outline processing unit is outputted on paper or the like by a recording device or is displayed by a display unit (not shown).

FIG. 49 is a block diagram showing this embodiment applied to a facsimile machine on a transmitting side. Input image data is created by binarizing an image signal which has entered from a scanner or the like, and outline processing unit is executed with regard to this data. The binary image reproduced by the outline processing unit is stored in an image memory and transmitted upon being converted to a code such as an MH code by a coder.

FIG. 50 is a block diagram showing a case in which the embodiment is applied to an input image both transmitted and received. Though this is a combination of the two examples mentioned above, a selector is controlled by a transmitting/receiving control circuit, and the origin of an input to and the destination of an output from the outline processing are decided depending upon transmission and reception. Accordingly, a reading unit can be selected as the binary-image acquisition unit, and the binary-image output means can be constructed (or selected) as a recording device. In this case, it is possible to realize a digital copier (or copy mode) having a zoom function.

The present invention can be applied to a system constituted by a plurality of devices or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   input means for inputting image data;
   extracting means for extracting contour vectors, which are formed from alternating horizontal and vertical vectors connected to each other, based on the inputted image data; and
   means for storing coordinate data and differential data determined based on the extracted contour vectors, the coordinate data indicating a start point which has a coordinate in a horizontal direction and a coordinate in a vertical direction, and the differential data having only one of a difference in a horizontal direction representing a horizontal vector and a difference in a vertical direction representing a vertical vector.

2. An image processing apparatus according to claim 1, further comprising:
   means for reproducing image data based on the coordinate data and the differential data; and
   means for outputting an image to an output device based on the reproduced image data.

3. An image processing apparatus according to claim 2, wherein the output device includes a printer.

4. An image processing apparatus according to claim 2, wherein the output device includes a display unit.

5. An image processing apparatus according to claim 2, wherein said input means includes a scanner.

6. An image processing apparatus according to claim 1, further comprising means for calculating a difference between the differential data.

7. An image processing apparatus according to claim 1, further comprising means for calculating coordinate data and differential data, the coordinate data indicating a start point which has a coordinate in a horizontal direction and a coordinate in a vertical direction and the differential data having only one of a difference in a horizontal direction representing a horizontal vector and a difference in a vertical direction representing a vertical vector.

8. An image processing apparatus according to claim 1, wherein said storing means stores differential data of a packet size corresponding to a value of the differential data.

* * * * *

UNITED STATES PATENT AND TRADEMARK OFFICE
CERTIFICATE OF CORRECTION

PATENT NO. : 5,757,961
DATED : May 26, 1998
INVENTOR(S) : JUNICHI YAMAKAWA, ET AL.

It is certified that error appears in the above-identified patent and that said Letters Patent is hereby corrected as shown below:

On the title page:

REFERENCES CITED [56]

U.S. PATENT DOCUMENTS

Insert: --5,347,598   9/1994    Ogawa
         5,150,431   9/1992    Yoshida et al.
         5,073,960   12/1991   Nakai et al.
         4,597,101   06/1986   Kishimoto et al.
         4,375,654   03/1983   Evans et al.
         4,307,377   12/1981   Pferd et al.--

OTHER PUBLICATIONS

Insert: --Kim et al., "Contour Coding Based on the Decomposition of Line Segments," Pattern Recognition Letters, Vol. 11, No. 3, 3/90, pp. 191-195.--.

Signed and Sealed this

Second Day of March, 1999

Attest:

Q. TODD DICKINSON

*Attesting Officer*  *Acting Commissioner of Patents and Trademarks*

UNITED STATES PATENT AND TRADEMARK OFFICE
CERTIFICATE OF CORRECTION

PATENT NO. : 5,757,961　　　　　　　　　Page 1 of 3
DATED : May 26, 1998
INVENTOR(S) : JUNICHI YAMAKAWA, ET AL It is certified that error appears in the above-identified patent and that said Letters Patent is hereby corrected as shown below:

Title Page:

REFERENCES CITED [56]

U.S. PATENT DOCUMENTS

| Insert: | --5,347,598 | 9/1994 | Ogawa |
|---|---|---|---|
| | 5,150,431 | 9/1992 | Yoshida et al. |
| | 5,073,960 | 12/1991 | Nakai et al. |
| | 4,597,101 | 06/1986 | Kishimoto et al. |
| | 4,375,654 | 03/1983 | Evans et al. |
| | 4,307,377 | 12/1981 | Pferd et al.-- |

OTHER PUBLICATIONS

Insert: --Kim et al., "Contour Coding Based on the Decomposition of Line Segments," Pattern Recognition Letters, Vol. 11, No. 3, 3/90, pp. 191-195.--.

UNITED STATES PATENT AND TRADEMARK OFFICE
CERTIFICATE OF CORRECTION

PATENT NO. : 5,757,961
DATED : May 26, 1998
INVENTOR(S) : JUNICHI YAMAKAWA, ET AL.

It is certified that error appears in the above-identified patent and that said Letters Patent is hereby corrected as shown below:

COLUMN 11

Line 17, "illustrately" should read --illustrating--.

COLUMN 12

Line 13, delete indentation.

COLUMN 14

Line 11, "difference." should read --different.--.

COLUMN 17

Line 2, "have" should read --having--.

COLUMN 20

Line 35, "point is" should read --point in--.
    Line 49, "no an" should read --not an--.

COLUMN 21

Line 5, "In the" should read --If the--.

COLUMN 23

Line 35, "sides" should read --side--.

UNITED STATES PATENT AND TRADEMARK OFFICE
CERTIFICATE OF CORRECTION

PATENT NO. : 5,757,961
DATED : May 26, 1998
INVENTOR(S) : JUNICHI YAMAKAWA, ET AL.

It is certified that error appears in the above-identified patent and that said Letters Patent is hereby corrected as shown below:

COLUMN 24

Line 30, "unit." should read -- unit--.

COLUMN 25

Line 5, "may" should read --may be--.
Line 17, "an" should read --as an--.

Signed and Sealed this

First Day of June, 1999

Attest:

Attesting Officer

Q. TODD DICKINSON

Acting Commissioner of Patents and Trademarks